United States Patent
Williams et al.

(10) Patent No.: US 12,163,017 B2
(45) Date of Patent: *Dec. 10, 2024

(54) HOT-MELT PRESSURE SENSITIVE ADHESIVE COMPOSITION AND USES THEREOF

(71) Applicant: Nautilus Solutions, LLC, Thorofare, NJ (US)

(72) Inventors: Charles Terrell Williams, Bristol, PA (US); Edward Ewart La Fleur, Holland, PA (US)

(73) Assignee: Nautilus Solutions, Inc., Thorofare, NJ (US)

( * ) Notice: Subject to any disclaimer, the term of this patent is extended or adjusted under 35 U.S.C. 154(b) by 776 days.

This patent is subject to a terminal disclaimer.

(21) Appl. No.: 17/076,651

(22) Filed: Oct. 21, 2020

(65) Prior Publication Data

US 2021/0115238 A1     Apr. 22, 2021

Related U.S. Application Data

(63) Continuation of application No. PCT/US2020/056543, filed on Oct. 20, 2020.
(Continued)

(51) Int. Cl.
*C08L 27/18*     (2006.01)
*C08G 73/02*     (2006.01)
(Continued)

(52) U.S. Cl.
CPC ............ *C08L 27/18* (2013.01); *C08G 73/026* (2013.01); *C09J 7/24* (2018.01); *C09J 127/18* (2013.01);
(Continued)

(58) Field of Classification Search
CPC combination set(s) only.
See application file for complete search history.

(56) References Cited

U.S. PATENT DOCUMENTS

| 4,867,889 A | 9/1989 | Jacobson |
| 9,320,826 B2 | 4/2016 | Lee et al. |

(Continued)

FOREIGN PATENT DOCUMENTS

| CN | 104672396 B | 6/2017 |
| CN | 105709607 B | 5/2018 |

(Continued)

OTHER PUBLICATIONS

Ma, "pH-Responsive Controlled-Release Fertilizer with Water Retention via Atom Transfer Radical Polymerization of Acrylic Acid on Mussel-Inspired Initiator", J. Agric. Food. Chem. 2013, 61, 5474-5482 (Year: 2013).*

(Continued)

*Primary Examiner* — Nicole M. Buie-Hatcher
(74) *Attorney, Agent, or Firm* — Hoffmann & Baron, LLP

(57) ABSTRACT

Pressure sensitive macromolecular adhesive polymers and compositions capable of integrating fluoropolymeric properties with a catechol-amine functionality to form an adhesive system that allows bonding between metallic substrates and fluoropolymers are disclosed. Also disclosed are core-shell polymeric particles comprised of a core and a shell comprising a thermoplastic polydopamine polymer that may be prepared as a colloidal suspension and used as a hot-melt pressure sensitive adhesive capable of binding low surface energy materials, such as polyolefins and fluoropolymers, to diverse materials including metals.

27 Claims, 10 Drawing Sheets

Related U.S. Application Data

(60) Provisional application No. 62/961,145, filed on Jan. 14, 2020, provisional application No. 62/924,136, filed on Oct. 21, 2019.

(51) Int. Cl.
  *C09J 7/24* (2018.01)
  *C09J 127/18* (2006.01)

(52) U.S. Cl.
  CPC ..... *C08L 2207/53* (2013.01); *C09J 2400/163* (2013.01); *C09J 2427/006* (2013.01); *C09J 2451/00* (2013.01)

(56) References Cited

U.S. PATENT DOCUMENTS

| | | | |
|---|---|---|---|
| 9,765,818 B2 | 9/2017 | Astner et al. | |
| 9,770,418 B2 | 9/2017 | Rahimipour et al. | |
| 9,943,487 B2 | 4/2018 | White et al. | |
| 10,119,567 B2 | 11/2018 | Hardgrave et al. | |
| 10,294,567 B2 | 5/2019 | Ma et al. | |
| 11,499,076 B2 * | 11/2022 | Williams | B32B 15/20 |
| 2009/0052822 A1 | 2/2009 | Hardgrave et al. | |
| 2014/0271774 A1 * | 9/2014 | Drumheller | A61L 31/10 |
| | | | 522/167 |
| 2015/0010709 A1 | 1/2015 | Beckford et al. | |
| 2015/0274892 A1 * | 10/2015 | Messersmith | A61P 31/04 |
| | | | 424/443 |
| 2017/0095558 A1 | 4/2017 | Xu et al. | |
| 2017/0247631 A1 | 8/2017 | Kim et al. | |
| 2018/0134917 A1 | 5/2018 | Mekhilef et al. | |
| 2018/0355271 A1 | 12/2018 | Kim | |
| 2019/0008965 A1 | 1/2019 | Messersmith et al. | |
| 2019/0079014 A1 | 3/2019 | Duan et al. | |
| 2019/0203771 A1 | 7/2019 | Jaeger | |
| 2019/0273287 A1 | 9/2019 | Merlo et al. | |

FOREIGN PATENT DOCUMENTS

| | | | | |
|---|---|---|---|---|
| CN | 110317558 A | 10/2019 | | |
| WO | 2012125693 A2 | 9/2012 | | |
| WO | WO-2014118266 A1 * | 8/2014 | | A61L 24/06 |
| WO | 2014132012 A1 | 9/2014 | | |
| WO | WO-2015068503 A1 * | 5/2015 | | A61L 24/046 |

OTHER PUBLICATIONS

Harwood, "Electron Exchange Polymers. IX. Synthesis of Polymers of 2,5-Dihydroxypenylalanine and of 3,4-Dihydroxoyphenylalanine", J. Am. Chem. Soc. 1957, 79, 16, 4360-4365 (Year: 1957).*
PDA Kinetics, GGB Bearing Technology, 3 pages.
Min Zhang, et al., "Preparation of IDA-Cu functionalized core saellite Fe304/polydopamine/Au magnetic nanocomposites and thier application for depletion of abundant protein in bovine blood", Journal of Materials Chemisrty, vol. 20, No. 47, Jan. 1, 2010 (Jan. 1, 2010), pp. 10696-10704, XP055037168, ISSN: 0959-9428, DOI: 10.1039/c0jm01366f.
PCT/US23/14975 International Search Report and Written Opinion mailed Jun. 23, 2023, Applicant: Nautilus Solutions, LLC, 24 pgs.
EP 20879940.3 Partial European Search Report mailed Oct. 2, 2023, 21 pgs.
Lee et al. "Mussel-Inspired Surface Chemistry for Multifunctional Coatings," National Institutes of Health-Author Manuscript, Dec. 12, 2008, 10 pgs.
Jeffrey Norris, "Fetal surgery stands to advance from new glues inspired by mussels," Berkeley News, Jun. 30, 2016, downloaded from https://news.berkeley.edu/2016/06/30/fetal-surgery-stands-to-advance-from-new-glues-inspired-by-mussels/, 6 pgs.
Messersmith Research Group, Youtube video from UC Berkeley News about "Mussels inspire surgical glue Invention," website: https://bioinspiredmaterials.berkeley.edu/, 5 pgs., Jan. 4, 2022.
Messersmith Research Group, "Mussel-Inspired Adhesives," downloaded on Jan. 4, 2022 from https://bioinspiredmaterials.berkeley.edu/research/mussel-inspired-adhesives/, 3 pgs.
Ggb, "DP4 and DP4-B Metal-Polymer Self-Lubricating Lead Free Bearing Solutions," Brochure downloaded on Jan. 4, 2022 from https://www.ggbearings.com/sites/default/files/2021-12/GGB-DP4-and-DP4-B-Metal-Polymer-Self-Lubricating-Lead-Free-Bearing-Solutions-Brochure-English.pdf, 56 pgs.
Anderson, et al., Oxidation of 3,4-Dihydroxyphenylacetaldehyde, a Toxic Dopaminergic Metabolite, to a Semiquinone Radical and an ortho-Quinone, The Journal of Biological Chemistry, vol. 286, No. 30, pp. 26978-26986, Jul. 29, 2011, 10 pages.
Bai, et al., Synthesis of a diamine cross-linker containing Diels-Alder . . . epoxy monomer, Polymer Chemistry, 2013, 4, pp. 724-730, 7 pages.
Ball, Polydopamine Nanomaterials: Recent Advances in Synthesis Methods and Applications, Frontiers in Bioengineering and Biotechnology, Aug. 17, 2018, vol. 6, Article 109, 12 pages.
Barua, et al., Biocompatible high performance hyperbranched epoxy/clay nanocomposite as an implantable material, Biomed. Mater. 9 (2014) 025006, 15 pages.
Batul, et al., Synthesis of Polydopamine Nanoparticles for Drug Delivery Applications, Microscopy and microanalysis, Aug. 2018, 3 pages.
Coskun, et al., Biofunctionalized conductive polymers enable efficient $CO_2$ electroreduction, Sci. Adv. 2017; 3:e1700686, Aug. 4, 2017, 9 pages.
Ding, et al., Mussel-inspired polydopamine for bio-surface functionalization, Biosurf Biotribol, Dec. 2016, 121-136, 25 pages.
Dreyer, et al., Elucidating the Structure of Poly(dopamine), Langmuir 2012, 28, 6428-6435, 8 pages.
Garcia, et al., Recyclable, Strong Thermosets and Organogels via Paraformaldehyde Condensation with Diamines, Science, vol. 344, May 16, 2014, 5 pages.
Gazzotti, et al., One-Pot Synthesis of Sustainable High-Performance Thermoset by Exploiting Eugenol Functionalized 1, 3-Dioxolan-4-one, ACS Sustainable Chem. Eng. 2018, 6, pp. 15201-15211, 11 pages.
Hamlin, et al., Toward a Unified Mechanism for Oxoammonium Salt-Mediated Oxidation Reactions: A Theoretical and Experimental Study Using a Hydride Transfer Model, J. Org. Chem. 2015, 80, 8150-8167, 18 pages.
Higginson, et al., Supporting Information, Bioinspired Design Provides High-Strength Benzoxazine Structural Adhesives, Angewandte Chemie, 2019, 121 pages.
Higginson, et al., Bioinspired Design Provides High-Strength Benzoxazine Structural Adhesives, Angew. Chem. Int. Ed. 2019, 58, pp. 12271-12279, 9 pages.
Hu, et al., Investigation of Dopamine Analogues: Synthesis, Mechanistic Understanding, and Structure-Property Relationship, 201 American Chemical Society, Langmuir 2016, 32, 9873-9882, 10 pages.
Kang, et al., Core-Shell Polymeric Microcapsules with Superior Thermal and Solvent Stability, ACS Appl. Mater. Interfaces 2015, 7, pp. 10952-10956, 5 pages.
Kasemset et al., Effect of polydopamine deposition conditions on fouling resistance, physical properties, and permeation properties of reverse osmosis membranes in oil/water separation, Journal of Membrane Science 425-426 (2013) 208-216, 9 pages.
Koh, et al., Fracture Toughness and Elastic Modulus of Epoxy-Based Nanocomposites with Dopamine-Modified Nano-Fillers, Materials 2017, 10, 776, www.mdpi.com/journall/materials, 16 pages.
Lee, et al., Mussel-Inspired Surface Chemistry for Multifunctional Coatings, Science 318, 426 (2007), 6 pages.
Liu, et al., Polydopamine and Its Derivative Materials: Synthesis and Promising Applications in Energy, Environmental, and Biomedical Fields, Chem. Rev. 2014, 114, 5057-5115, 59 pages.
Makuraza, et al., Vibrational and Electronic Spectra of Natural Dyes Constituents for Solar Cell Application: DFT and TDDFT Study, International Journal of Materials Science and Applications 2015; 4(5): 314-324, 11 pages.
Miller, Dissertation, Assessment of Fouling in Native and Surface-Modified Water Purification Membranes, The University of Texas at Austin, May 2013, 421 pages.

(56) References Cited

OTHER PUBLICATIONS

Mrowczynski, et al., Chemistry of Polydopamine Analogues, Polymer International, Jul. 2016, 13 pages.

Nishida, et al., Potential of Oxidative polymerization coating of cellulose nano-fiber by dopamine, IOP Conference Series: Materials Science and Engineering 368 (2018) 012043, 12 pages.

PCT, Invitation to Pay Additional Fees and, Where Applicable, Protest Fee, for International Application No. PCT/US20/56543, 25 pages, Dec. 22, 2020.

Ryu, et al., Polydopamine Surface Chemistry: A Decade of Discovery, ACS Appl. Mater Interfaces. Mar. 2018 207; 10(9): 7523-7540, 37 pages.

Salomaki, et al., Effects of pH and Oxidants on the First Steps of Polydopamine Formation: A Thermodynamic Approach, J. Phys. Chem. B 2018, 122, pp. 6314-6327, 14 pages.

Solano, Melanin and Melanin-Related Polymers as Materials with Biomedical and Biotechnological Applications—Cuttlefish Ink and Mussel Foot Proteins as Inspired Biomolecules, Int. J. Mol. Sci. 2017, 18, 1561, 18 pages.

Karger-Kocsis, Special Issue: Recent Advances in Applied Polymer Science, J. Appl. Polym. Sci. 2018, 33 pages.

Uysal, et al., Synthesis and characterization of dopamine substitute tripodal trinuclear [(salen/salophen/salpropen)M] (M=CR(III), Mn(III), Fe(III) ions) capped s-triazine complexes: Investigation of their thermal and magnetic properties, Journal of Molecular Structure 1109 (2016) pp. 119-126, 8 pages.

Wacker, et al., Harnessing the Chemical Diversity of the Natural Product Magnolol . . . Antioxidant Activity, Biomacromolecules 2019, 20, pp. 109-117, 9 pages.

Watanabe, et al., Surface texturing of natural 'urushi' thermosetting polymer thin films, Polymer Journal (2014) 46, pp. 216-219, 4 pages.

Zhao, et al., Dopamine-Mediated Pre-Crosslinked Cellulose/Polyurethane Block Elastomer for the Preparation of Robust Biocomposites, ACS Omega 2018, 3, pp. 10657-1067, 11 pages.

PCT/US2020/056543 International Search Report and Written Opinion mailed Mar. 31, 2021, 12 pages.

Tokura et al. "Fabrication of Defined Polydopamine Nanostructures by DNA Origami-Templated Polymerization," Angewandte Chemie International Edition, vol. 57, Jan. 29, 2018, pp. 1587-1591.

Tokura et al. "Supporting Information: Fabrication of Defined Polydopamine Nanostructures by DNA Origami-Templated Polymerization," Angewandte Chemie International Edition, vol. 57, Jan. 29, 2018, 17 pgs.

\* cited by examiner

FT IR spectra for Tapes and cured coatings of the colloidal disperson

HOT-MELT PRESSURE SENSITIVE ADHESIVE COMPOSITION AND USES THEREOF

This application claims the benefit of U.S. Provisional Patent Application No. 62/924,136, filed Oct. 21, 2019, and U.S. Provisional Patent Application No. 62/961,145, filed Jan. 14, 2020; this application is also a continuation of International Application No. PCT/US20/56543, filed Oct. 20, 2020, which claims the benefit of U.S. Provisional Patent Application No. 62/924,136, filed Oct. 21, 2019, and U.S. Provisional Patent Application No. 62/961,145, filed Jan. 14, 2020. International Application No. PCT/US20/56543 and U.S. Provisional Patent Application No. 62/961,145, filed Jan. 14, 2020, are incorporated by reference in their entirety.

FIELD

The present disclosure relates to novel thermoplastics and thermoplastic compositions that can serve as pressure sensitive macromolecular adhesive polymers capable of integrating fluoropolymer properties with the catechol-amine functionality to form an adhesive system that allows bonding between substrates (surfaces of articles) including metallic materials and low surface energy materials (e.g., fluoropolymers or their composites such as polyimide fluoropolymer composites). The disclosure also relates to the design, synthesis, and application of core-shell colloidal polymeric materials that function as hot-melt pressure sensitive adhesives (e.g., for interfacial bonding of materials including fluoropolymers and/or composites comprising fluoropolymers), methods of making the core-shell polymeric materials, and composites that comprise hot-melt pressure sensitive adhesives comprising the core-shell polymeric particles.

BACKGROUND

The coupling of low surface energy polymers (e.g., polymer film), such as polytetrafluoroethylene (PTFE), to each other and/or to high energy polar surfaces such as metals requires coupling or bonding agents (adhesives) that inherently incorporate bonding capabilities that range from weak dispersion forces to strong covalent interaction. The unique polarity of catechol molecules favors and enhances the coupling mechanism for adhesion of a fluoropolymer film to the surface of a metal substrate. This contrasts with a more typical coupling between metals and fluoropolymers that is achieved by mechanical means, such as the application of a metal powder such as bronze or the use of a primer, followed by successive application of polymer adhesive films. Moreover, because of the low surface energy and reactivity of fluoropolymers such as PTFE, a fluoropolymer functionalization step (e.g., exposure to oxygen plasma) is often necessary for the promotion of substantial surface adhesion.

A close look at the naturally occurring phenomena exhibited by mussels, which adhere to the surface of metallic and non-metallic substrates, reveals the possibility of leveraging their biological mechanism of adhesion to promote the effective coupling of metallic and organic functional groups in difficult and non-compatible systems. One aspect of the present disclosure, which is inspired by natural phenomena, is directed to pressure sensitive macromolecular adhesive polymers having catechol-amine functionalities that can bind low surface energy materials, such as fluoropolymer, as an adhesive system. Such systems could allow bonding between diverse substrates including metallic substrates and low energy polyolefins or fluoropolymer or their composites including those used in tribological applications.

SUMMARY

This disclosure describes, among other things, novel dopamine-based thermoplastic polymers (polydopamine polymers) and their use. Polydopamine polymers may be prepared by an in-situ polymerization reaction of dopamine in the presence of one or more carboxylic acid(s). The polymerization reaction may be conducted in the presence of materials (e.g., in the form of particles, tubes, sheets or films) onto which the dopamine-based polymers can be deposited and/or grafted, depending on the nature of the materials, forming a partial or complete layer on the surface(s) of the materials.

One aspect of this disclosure is directed to a method of preparing a dopamine-based thermoplastic polymer, the method comprising contacting dopamine and/or dopamine analogs with one or more carboxylic acids in the presence of a redox initiator (such as elemental oxygen) that oxidizes all or part of the dopamine or dopamine analogs to quinol or semiquinones. The reaction may be carried out in a basic aqueous buffer solution (such as a tris-(hydroxymethyl) aminomethane buffered solution) optionally comprising a water miscible organic solvent such as an alcohol or ketone; the reaction forming a polymer comprising polymerized monomers of dopamine quinone, semiquinone, semiquinone ester, quinol, or quinol esters of the dopamine and/or dopamine analogs. A related aspect relates to the product formed by such a process.

A portion of this disclosure is directed to the formation of core-shell particles produced by the introduction of particles into the polymerization of dopamine and/or dopamine analogs, where the particle functions as a core upon which a shell layer of dopamine-based thermoplastic polymer becomes deposited (the polydopamine polymer forms a shell on the particle which serves as a core). Thermoplastic shell layers of polydopamine polymers can be formed upon a variety of core materials including, but not limited to, inorganic materials (e.g., metal or metalloid oxides) or core polymers (also referred to as core polymeric materials, e.g., either non-fluorinated or fluorinated thermoset plastics, or non-fluorinated or non-fluorinated thermoplastics). Core polymers include, but are not limited to, materials such as vinylidene fluoride polymers or copolymers, vinyl chloride copolymers, and polytetrafluoroethylene (PTFE) in the form of sheets or particles. Solution-phase polymerization of dopamine in the presence of one or more types of core particles can result in the formation of a suspension (e.g., colloidal suspension) of core particles with a shell layer of dopamine-derived polymer deposited, partially grafted, or fully grafted on the particles' surfaces. The composite core-shell polymer particles may be designed to function as hot-melt pressure sensitive adhesive compositions for coupling, among other things, low surface energy polymeric substrates such as PTFE and/or polyolefin with high surface energy metallic surfaces.

The core of a core-shell particles may constitute about 45% to about 90% of the total weight of the core-shell particle, and the shell about 10% to about 55% of the total weight of the particle on a dry weight basis. Dopamine and/or dopamine analogs may constitute up to about 70% (e.g. from 20%-35%, 35%-50%, 50%-60%, or 60%-70%) of the weight of the shell on a dry weight basis.

The disclosure also describes core-shell particles and suspensions of core-shell particles comprising a core and a shell, wherein: a) the core is comprised of about 45 percent to about 100 percent of core polymer material on a dry weight basis; and b) the shell is comprised of about 10 to about 55 percent on a dry weight basis of dopamine monomers polymerized with one or more carboxylic acids and/or one or more carboxylic acid anhydrides to form a shell polymer; wherein the core-shell polymeric particles are thermoplastic and display hot-melt pressure sensitive adhesive properties. From 0 to 100 percent of the polymer forming the shell may be grafted (covalently bound) to the polymer forming the core (e.g., covalently bound to the backbone of the core polymer material).

An aspect of the disclosure is directed to core-shell particles having a core particle that is comprised of a) about 90 to about 95 percent of one or more polymerized olefins (e.g., vinyl monomers and/or fluorinated olefin monomers such as in a PTFE core particle) on a dry weight basis, and b) up to about 10 percent of divinyl, trivinyl or tetravinyl monomers (e.g., allyl methacrylate, ethylene glycol dimethacrylate or trimethylolpropane trimethylate), or a mixture thereof, on a dry weight basis; and a shell that comprises about 10 to about 55 percent on a dry weight basis of dopamine monomers polymerized with one or more carboxylic acids and/or one or more carboxylic acid anhydrides to form a shell polymer; wherein the core-shell polymeric particles are thermoplastic and display hot-melt pressure sensitive adhesive properties. From 0 to 100 percent (e.g., from 0 to 10, from 10 to 30, from 30 to 60, from 60 to 80 or from 80 to 100 percent) of the polymer forming the shell may be grafted (covalently bound) to the polymer forming the core (e.g., covalently bound to the backbone of the core polymer material).

Another aspect of the disclosure is directed to core-shell particles having a core particle that is comprised of a) about 70 to about 100 percent of one or more polymerized olefins (e.g., vinyl monomers and/or fluorinated olefin monomers such as in a PTFE core particle) on a dry weight basis, and b) up to about 30 percent of divinyl, trivinyl or tetravinyl monomers (e.g., allyl methacrylate, ethylene glycol dimethacrylate or trimethylopropane trimethylate), or a mixture thereof, on a dry weight basis; and a shell that comprises about 10 to about 55 percent on a dry weight basis of dopamine monomers polymerized with one or more carboxylic acids and/or one or more carboxylic acid anhydrides to form a shell polymer; wherein the core-shell polymeric particles are thermoplastic and display hot-melt pressure sensitive adhesive properties. From 0 to 100 percent (e.g., from 0 to 10, from 10 to 30, from 30 to 60, from 60 to 80 or from 80 to 100 percent) of the polymer forming the shell may be grafted (covalently bound) to the polymer forming the core (e.g., covalently bound to the backbone of the core polymer material).

The core particle may comprise a polymeric material (a "core polymer") that comprises, consists essentially of, or consists of a thermoplastic particle, such as a thermoplastic fluoropolymer (e.g., polytetrafluoroethylene (PTFE)) particle. In such embodiments, the core polymer material may have a glass transition temperature ranging from −103° C. to 200° C. (e.g., −103° C. to −50° C., −50° C. to 0° C., 0° C. to 50° C., 50° C. to 100° C., 100° C. to 150° C., or 150° C. to 200° C.).

The shell may comprise dopamine HCl monomers polymerized with (in the presence of) one or more carboxylic acids and/or one or more carboxylic acid anhydrides to form a shell polymer. The shell polymer of a core-shell particle may also comprise a polydopamine polymer that is a copolymer or heteropolymer comprising dopamine analogue.

The polydopamine polymers forming the shell may be partially or fully grafted onto the core or core polymer thereby forming covalent attachments between the core and shell of the core-shell polymeric particles.

The particle size distribution of the core-shell polymeric particles may be bimodal or multimodal. In an embodiment the distribution is bimodal and the diameter measurement of the core-shell polymeric particles has a peak in the range of 0.01 μm to 0.5 μm, and a peak in the range of 0.5 μm to 1.0 μm.

This disclosure also describes hot-melt pressure sensitive adhesive coatings comprising core-shell polymeric particles. Such pressure sensitive adhesives comprising core-shell particles can function to join the surfaces of various materials such as metals and low surface energy polymers (e.g., PTFE, expanded-PTFE, FEP or expanded-FEP) under severe thermal and/or mechanically abrasive environments at temperatures ranging from ambient (about 20° C.) to 360° C. (e.g., from 200° C. to 300° C., from 230° C. to 330° C., or from 300° C. to 350° C.), and/or pressures ranging from sub-atmospheric (e.g., 0.1 Pa (or less)) to 22 MPa (e.g., less than 0.1 Pa, 0.1 Pa to 100 Pa, 100 Pa to 100,000 Pa, 0.1 MPa to 1 MPa, or 1 MPa to 22 MPa), where "Pa" is a Pascal and MPa is a mega Pascal.

Also described herein are methods of making polydopamine polymers (e.g., esterified polydopamine polymers) and the use of such polymers as primers and/or adhesives between diverse materials including polymers (thermoset and/or thermoplastic polymers), metals, glasses, ceramics, metal oxides, metalloid oxides and the like. The polydopamine polymers and core-shell particles comprising a shell of polydopamine polymer find particular application as an adhesive in demanding applications including, but not limited to, the manufacture of bearings and tribological materials where plastic/polymeric components (e.g., fluoropolymer and perfluoropolymers) need to be secured to other materials including metals or metal alloys). The polydopamine polymers and core-shell particles comprising a shell of polydopamine polymer may also be used to secure plastics and polymers to metals and other surfaces in applications such as wire/conductive surface insulation (e.g., polyimide-fluoropolymer composites).

BRIEF DESCRIPTION OF THE DRAWINGS

FIG. 3.

DETAILED DESCRIPTION

I. Definitions

Figure 1:
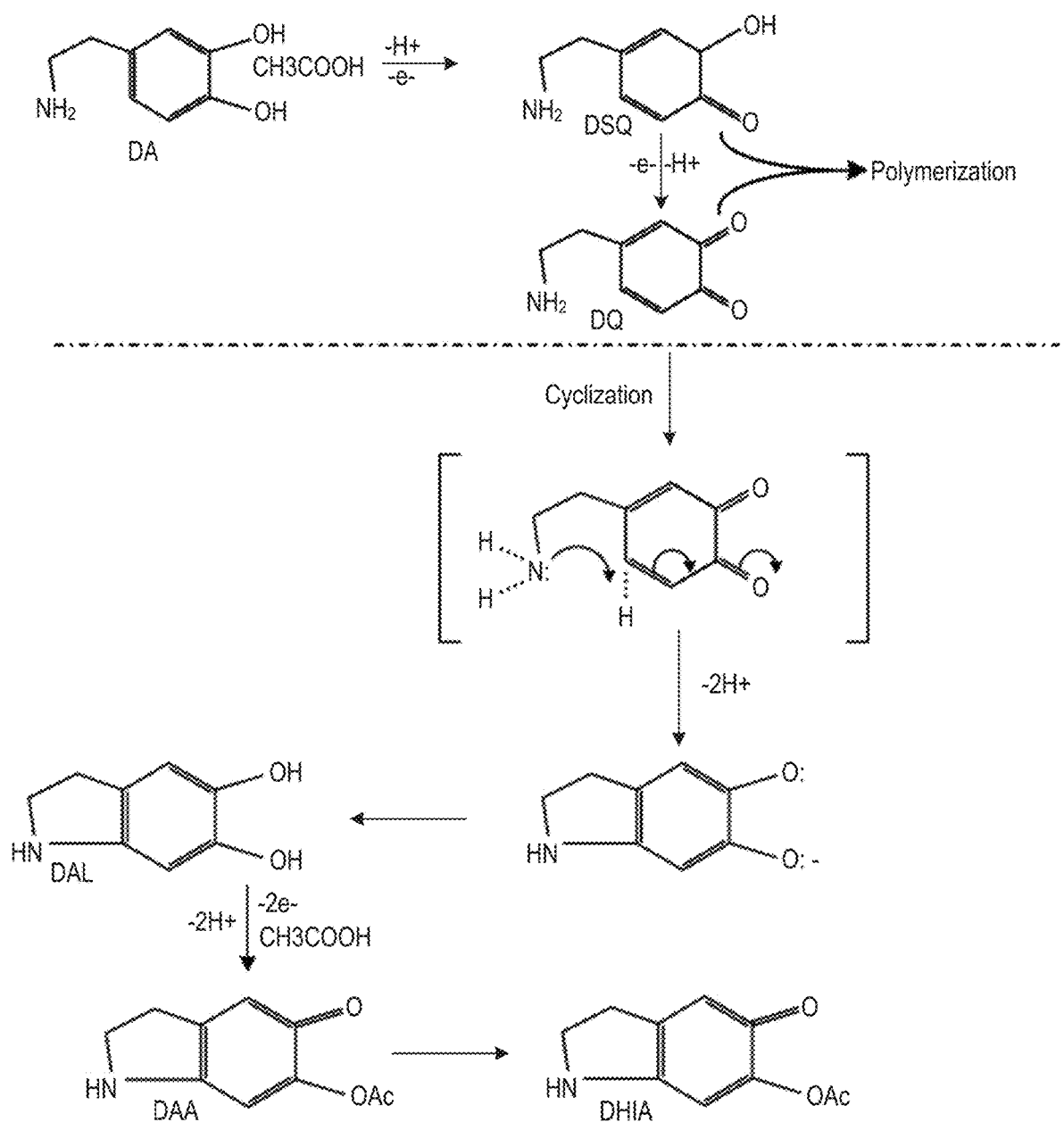
FIG. 1 shows a schematic of the steps in the oxidation process of dopamine hydrochloride. The scheme shows oxidation of dopamine to dopamine semiquinone ("DSQ") and dopaquinone ("DQ"), either one or both of which can act as monomers in the polymerization reaction. Conversion of DQ into various indolines and indoles such as DAL (leukoaminochrome or 5,6-dihydroxyindoline), DAA (6-hydroxy-1,2,3,6-tetrahydro-5H-indol-5-one acetate) and dihydroxy indole acetate (DHIA) is shown below the horizontal line (■ - ■ - ■ -). "OAc" stands for an esterified carboxylic acid (e.g., acetate). Exemplary carboxylic acids that may become esterified to the monomers and the polymers produced therefrom (see, e.g., FIGS. 2, 3A and 3B) include those of the form R1C(O)OH or R1R2CHC(O)OH, where R1 and R2 are defined below; amino acids; and ethylenically unsaturated carboxylic acids including vinyl carboxylic acids.

Unless stated otherwise, all weights are given on a dry weight basis.

Colloid or colloidal suspension as used herein means a mixture in which microscopically dispersed particles are suspended throughout another substance in the liquid state. The term "colloidal suspension" refers to the overall mixture. A colloid has a dispersed phase (the suspended particles) and a continuous phase (the medium of suspension) that generally arise by phase separation. The dispersed phase of a colloidal suspension does not appreciably settle out or separate from the mixture over at least a week or more at about 20° C.

Suspension as used herein means a heterogeneous mixture that contains solid particles sufficiently large to separate by sedimentation (substantially settling out of solution e.g. in a week at about 20° C.).

Polydopamine polymer(s) as used herein refers to thermoplastic polymers of dopamine and/or dopamine analogs formed in the presence of carboxylic acids (see, e.g., FIG. 2 or FIG. 3), including polydopamine homopolymers, polydopamine heteropolymers, polydopamine copolymers (copolymers of dopamine and other monomers), and esters of the foregoing with carboxylic acids (sometimes referred to as esterified polydopamine, polydopamine esters, or esterified polydopamine polymers).

Tribological surface as used herein means a surface that reduces friction, reduces wear and/or provides lubrication.

Substantially free, as used to describe compositions, means less than about 1% by weight.

II. Detailed Description

The performance of polymers designed to function efficiently as hot-melt pressure sensitive adhesives (PSAs)

necessitates a combination of polymeric structures that possess a macromolecular ensemble providing mechanical attributes that can be summarized into two broad categories: properties that provide for the adhesion between the polymer and the surfaces of diverse substrates, and properties providing the strength of the polymer chains as measured by the viscoelastic response under load. It is conceivable that the interfacial interaction between adhesive polymers and substrates can be enhanced by the presence of a distribution of polymer chains (e.g., varying in length to form high and low molecular weight polymer components). The ability of the polymeric material to withstand extensive plastic deformation for a considerable duration of time before failure requires a high molecular weight component that not only bears the applied stress but is not prone to be compromised by the plasticization effect of the low molecular component that occupies the contiguous special domain Given that hypothetical model, the importance of designing contiguous interfacial polymeric ensembles of highly interwoven stacks of molecular architecture is necessary for an efficient and effective PSA.

Described herein are novel core-shell colloidal particles and suspensions of core-shell particles in which the particle core may be designed/selected to function as a deformable pressure sensitive matrix (e.g., a thermoplastic such as a thermoplastic fluoropolymer) that supports a pliable polydopamine polymer (e.g., a fully or partially esterified polydopamine heteropolymer) shell. The shell inter-facially bonds to various materials including low surface energy polymers (such as fluoropolymers, polyolefins, and similar polymeric materials) and metal substrates (such as iron, aluminum, copper, titanium, magnesium, and alloys thereof including steel, bronze, and brass). For example, the core-shell colloidal particles and suspensions of core-shell particles may be used to bond fluoropolymers to alloys used for aerospace applications, including aluminum alloys suitable for making aerospace structural components like integral wing spars, ribs and webs. Although capable of bonding material with low surface energies (e.g., fluoropolymers and polyolefins) to materials with high surface energies (e.g., metals, alloys, various ceramics etc.), the PSA described herein may also be utilized to join articles with low surface energy surfaces (e.g., two PTFE articles), as well as to join intermediate and/or high surface energy materials (e.g., two different metals or metals and glasses).

A. Polymerization Reactions for Forming Dopamine Polymers

The thermoplastic polydopamine polymers (e.g., dopamine-based polymers) described herein can be prepared in solution and may be coated and/or grafted onto materials present in the solution (e.g., in the polymerization reaction). The thermoplastic polymers may be prepared by a method comprising contacting dopamine and/or dopamine analogs with one or more carboxylic acids in the presence of a redox initiator (such as elemental oxygen) in a basic buffer solution (such as tris-(hydroxymethyl)aminomethane), thereby forming a polymer comprising polymerized monomers of dopamine quinone, semiquinone, semiquinone ester, quinol, or quinol esters of the dopamine and/or dopamine analogs.

While not wishing to be bound by any specific theory, the method may be understood as the formation of polydopamine polymers initiated by contacting dopamine and/or dopamine analogs with a redox initiator (such as elemental oxygen) in a basic buffer solution (such as tris-(hydroxymethyl)aminomethane), thereby forming one or more monomers comprising quinones (dopaquinone), semiquinones (dopamine semiquinone, semiquinone esters) and/or analogs thereof. Once initiated, the reaction proceeds by the pendant alkyl amine group of a molecule of any one of the one or more monomers adding to another monomer thereby forming dimers comprising two monomers that have been covalently linked by a pendant alkyl amine group of a monomer. The dimers are extended to form oligomers by, for example, either (a) the pendant alkyl amine group of a molecule of any one of the one or more monomers or the alkyl amine of a molecule of a dimer reacting with another dimer molecule to extend the length of the dimer, or (b) the pendant alkyl amine of a molecule of any of the dimers reacting with a molecule of a monomer. The oligomers are extended to form polydopamine polymers by, for example, either (a) the pendant alkyl amine groups of a molecule of any one of the one or more monomers reacting with an oligomer molecule to form a polydopamine polymer, (b) the pendant alkyl amine of a molecule of oligomer reacting with a molecule of a monomer to form a polydopamine polymer, and/or (c) the pendant alkyl amine of a molecule of an oligomer reacting with a molecule of oligomer to form a polydopamine polymer.

As discussed below, monomers other than dopamine, dopamine analogs, their oxidation products and carboxylic acid esters thereof may be incorporated into the oligomers and polydopamine polymers during the process. The resulting polymers, termed "polydopamine polymers" because of the presence of monomers arising from dopamine or dopamine analogs, display thermoplastic properties, being meltable for multiple cycles (e.g., at least 5, at least 10, or at least 20 cycles). That behavior contrasts with the thermoset properties associated with similar polymers incorporating dopamine prepared in the absence of organic acids (e.g., carboxylic acids) such as in the presence of inorganic acids (e.g., sulfuric, hydrochloric, phosphoric acids and/or the like) as such polymers cannot be melted for multiple cycles.

Figure 2:
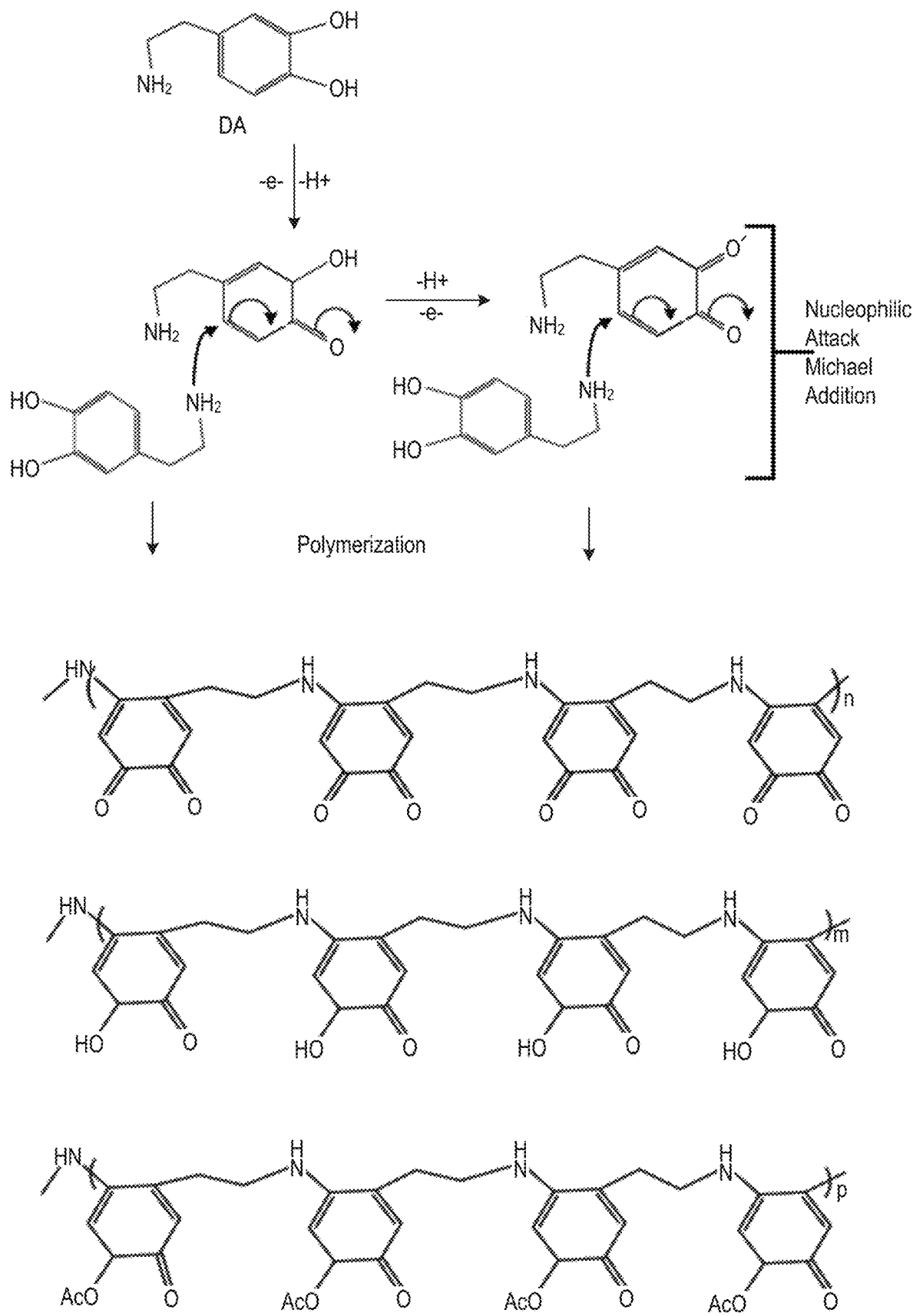
FIG. 2 depicts the reaction scheme for the conversions of dopamine to form poly(1,2 benzoquinone ethyl amine), poly(1,2-hydroxy benzoquinone ethyl amine), and poly(1,2 methyl acetate benzoquinone ethyl amine) The reaction depicts the oxidation of dopamine to dopamine semiquinone, followed by oxidation to dopamine quinone. Polymerization is understood to occur by a Michael addition type reaction where a pendant amine group acts as a nucleophile adding to the quinone or semiquinone ring (the attacking nucleophilic amine is shown as part of a dopamine molecule but could also be from the semiquinone, quinone or partially polymerized molecule. Polymerization continues by successive Michael additions. The polymers are shown as the polydopamine quinone (uppermost polymer), dopamine semiquinone formed by reduction and protonation of the semiquinone (middle polymer), and the esterified polydopamine semiquinone (e.g., polydopamine acetate, lower polymer). The polymer chains may comprise a mix of quinone, semiquinone, and esterified quinone units depending on the oxidation state of the system and how completely the semiquinone becomes esterified. The value of n, m and p are not fixed for this figure, but rather are intended to show the polymer units can repeat (repeating units do not necessarily come in groups of four monomers. OAc is as defined in FIG. 1.

The polymerization of dopamine and/or dopamine analogs as described herein may be understood to be initiated by the oxidation (e.g., by molecular oxygen) and deprotonation of dopamine to form dopamine semiquinone which undergoes further oxidation/deprotonation to form dopamine quinone. Under the reaction conditions disclosed herein using a stable basic buffer (e.g., about pH 8.5 or in a pH range from about 8.5 to about 10.0), the semiquinone may also undergo esterification by carboxylic acids (or their anhydrides) added to the reaction to form a semiquinone ester. Dopamine and oxidized dopamine monomers (semiquinones and quinones) are understood to react with each other via nucleophilic attack of their pendant alkyl amine groups on the quinone or semiquinone groups thereby forming an amine linkage. This reaction is deemed favorable when the aqueous media is strongly basic and favors formation of macromolecular amino quinone-ester oligomers (e.g., semiquinone esters). When the reaction is conducted in an aqueous media the polymer may form a colloidal suspension, particularly where a colloidal suspension of particles (e.g., colloidal PTFE) is present in the reaction. When the colloidal reaction mixture is heated to about 220° C., the reaction proceeds to generate esters of the monomers by virtue of the presence of the carboxylic acid(s). The polydopamine esterified with acetic acid (—OAc) molecules is shown in FIG. 2. In addition to using molecular oxygen as an initiator, the reaction can be carried out with iron sulphate plus copper sulphate solution and tert-butyl hydroperoxide as an oxidant at ambient conditions (about 20° C.-30° C. and 760 mm Hg).

By way of example, the oxidation of dopamine hydrochloride by the dissolved oxygen present in an aqueous medium containing aqueous TRIS (hydroxymethyl)aminomethane (e.g., 0.3005 mols, in about 0.3 L buffered with 0.06 mols of acetic acid to yield a pH of 8.5) and dopamine hydrochloride (e.g., at a concentration of 0.3005 mol (1.0 M)) in the presence of an abundance of perfluorinated particles (e.g., PTFE-particles) promotes oligomerization and polymerization to form a polydopamine-acetate heteropolymer because of the high concentration of dopamine hydrochloride, as compared to the use of low concentrations (0.1 mM or less) of dopamine that favor intramolecular cyclization particularly in the absence of carboxylic acid. Under the reaction conditions employed herein the yield of leucodopaminechrome and related indolines and indoles (see, e.g., the compounds formed by cyclization in FIG. 1) from intramolecular cyclization of dopamine quinone (DQ) is low because of the energy required to form the strained five-member pyrrole (2,3-dihydropyrrole) ring in those molecules. That boundary to the formation of the cyclized products is indicated by the dashed line across FIG. 1.

The thermoplastic polydopamine polymers prepared by the processes described herein may be employed, for example, as a thermoplastic (e.g., for molding articles), as a primer, or as an adhesive when formed or coated onto the surface of materials of all sizes and shapes including sheets. The need to provide uniform coatings of the polydopamine polymers is particularly important where the polymer is to be used as an adhesive layer applied to low surface energy materials such as fluoropolymer films. As such, it is desirable to provide uniform coatings devoid of visible surface imperfections such as pinholes and/or that do not undergo dewetting exposing the underlying substrate (e.g., a substrate fluoropolymer such as PTFE sheets/films). Preferably, there are no holes in the coating that expose an area of a substrate, such as a hole exposing more than 0.1 mm square or 0.05 mm square of a sheet on which the adhesive layer is applied. It is understood that not all of a substrate, such as the edges, needs to be coated with an adhesive layer and such uncoated areas are not considered when accessing surface uniformity/imperfections. For the purpose of attaining uniform coatings of the polydopamine polymers on diverse substrates, including those with surfaces having low surface energy such as polyolefins and fluoropolymers (e.g., PTFE or FEP), it has been found that formation of core-shell particles having a shell of polydopamine polymer(s) on particles (e.g., particles of thermoplastics such as PTFE) is beneficial. As discussed above, such core-shell particles can be formed by polymerization of dopamine salts (e.g., HCl salts) with carboxylic acids carried out in the presence of suitable particulate materials that serve as a core (e.g., particles of polymeric materials) upon which a shell comprising polydopamine polymers may be deposited and/or grafted. Aqueous dispersions/suspensions of such core-shell particles represent compositions that can be spread uniformly on low surface energy materials such as PTFE sheets or films (compare FIG. 8 or FIG. 9 with FIG. 10). Core-shell particles can be concentrated or collected from the polymerization reaction by methods such as centrifugation and/or filtration. The same methods can be used to exchange the liquids in which the core-shell particles are suspended for use as adhesive compositions (e.g., aqueous adhesive compositions). Drying of the compositions (e.g., aqueous compositions) to remove most (e.g., substantially all) of the bulk water provides an adhesive coating comprising the core-shell particles. The dried adhesive composition may comprise: less than 15%, less than 10%, less than 7.5%, less than 5%; less than 2.5% or less than 1% water and/or other solvents on a weight basis. The dried adhesive composition once reconstituted with water or other solvents may also retain its uniformity of coating over the substrate.

When the preparation of the polydopamine polymers is conducted in the presence of particles or materials in shapes/forms other than particles, the synthesis consists of a two-step process: obtaining/introducing the particles or other materials into the polymerization reaction and initiation of the polydopamine polymerization reaction. While materials of many shapes may be employed, the process will be discussed in the context of particulate materials used to form core-shell particles where the core results from the introduced particles and where the polydopamine polymer(s) form the shell. Typically, a suspension, or a colloidal suspension, of core-shell particles is synthesized utilizing a colloidal suspension of core particles. Beginning with a high solid content suspension or colloidal suspension of core particles (e.g., core polymer particles such as PTFE), the shell (e.g., poly(dopamine-acetate)) is deposited upon and/or incorporated into (e.g., grafted on) the surface of the core particles by oxidative reaction of the dopamine monomer in the presence of one or more carboxylic acid(s) and a redox initiator such as elemental oxygen in a basic solution such as tris-(hydroxymethyl)aminomethane.

The efficiency of the redox synthesis technique provides a method for the in-situ generation of both low (about 10,000 to about 20,000 Daltons) and high molecular weight (about 100,000 to about 6,000,000 Daltons) components that, as previously discussed, may be advantageous to the function of a PSA. The absence of high concentrations of sodium or ammonium persulfates, encountered in thermal dopamine polymerization processes, also makes polydopamine polymers synthesized by the redox process less susceptible to the manifestation of colloidal instability brought on by the presence of a high concentration of sodium and other ions. The performance of PSA compositions prepared in the presence of high concentrations of ions (e.g., sodium ions) is also compromised by sorption of moisture, which is promoted by the presence of sodium ions, as a consequence of exposure to high relative humidity conditions. The presence of high concentrations of ionic species also induces the generation of ionic cross-links, which can have a deleterious effect on the mechanical properties of polydopamine polymers and PSA core-shell polymeric particles formed with those polymers.

The initiation of polymerization may be driven by a redox mixture of Cu and Fe salts, and hydrosulfite anions (e.g., copper hydrosulfite and iron hydrosulfite) in the presence of peroxide or oxygen. Redox initiation by a mixed metal system of Cu/Fe and hydrosulfite and a persulfate represents a unique technique in making high molecular weight emulsion polymers. The use of tris-(hydroxymethyl)-aminomethane hydrochloride buffer solution and mixed iron/copper initiators/catalyst results in polymer emulsions with different particle sizes as compared to polymerization with peroxide or oxygen. For example, core-shell particles prepared in tris-(hydroxymethyl) aminomethane hydrochloride buffer solution in the presence of peroxide or oxygen (in the absence of Fe/Cu catalyst) may have bimodal or multimodal size distribution (diameter distribution). In an embodiment, the core-shell particles have a peak in the size range of 0.01 µm to 0.5 µm, and a peak in the range of 0.5 µm to 1.0 µm. In contrast, core-shell polymeric particles prepared using an Fe/Cu catalyst system tend to be unimodal, having a single maximum in the particle size distribution (diameter distribution). Such methods use of low levels of Fe/Cu reagents, and yet provide rapid polymerization rates. In one aspect, this disclosure demonstrates that a redox catalyst mixture comprising Cu and Fe cations and hydrosulfite anions, without persulfate, can initiate polymerization of dopamine and dopamine analog monomers. A cyclic voltammetry study of different combinations of the reagents suggests that the transfer of electrons which are responsible for initiation of polymerization can take place in the absence of persulfate according to the following mechanism:

$$Fe^{2+} + Cu^{2+} => Fe^{3+} + Cu^{+}$$

$$2Fe^{3+} + S_2O_4^{2-} + 4OH^- => 2SO_3^{2-} + 2H_2O + 2Fe^{2+}$$

Amines can be used as a catalyst for the decomposition of the initiators such as oxygen or peroxide, thereby initiating the polymerization reaction. Examples of such amines include TRIS (hydroxymethyl aminomethane), hydroxylamine, tetraammonium hydroxide, diethylenetriamine, triethylenetetramine, diethylaminopropylamine, bis(p-aminocyclohexyl) methane, metaphenylenediamine, isophorone diamine, n-aminoethylpiperazine, methylenediamine, 2-ethyl-4-methyl imidazole, and 4,4'-diaminodiphenlsulfone.

Efficient formation of polydopamine polymers in the presence of low surface energy substrates such as PTFE particles using aqueous media may be accomplished using β-cyclodextrin (e.g., about 0.1 to 2 percent based on the weight of the dopamine monomers) and one or more carboxylic acids. β-cyclodextrin added to the reaction mixture may function to transport monomers across the interface between water and the surface of core particles prepared from low surface energy polymers that may be hydrophobic. Surfactants, which may act as emulsifiers, can be added to keep the reaction mixture homogeneous and, like β-cyclodextrin, may assist in transporting dopamine monomers across the water interface with the core particles.

Figure 3A:
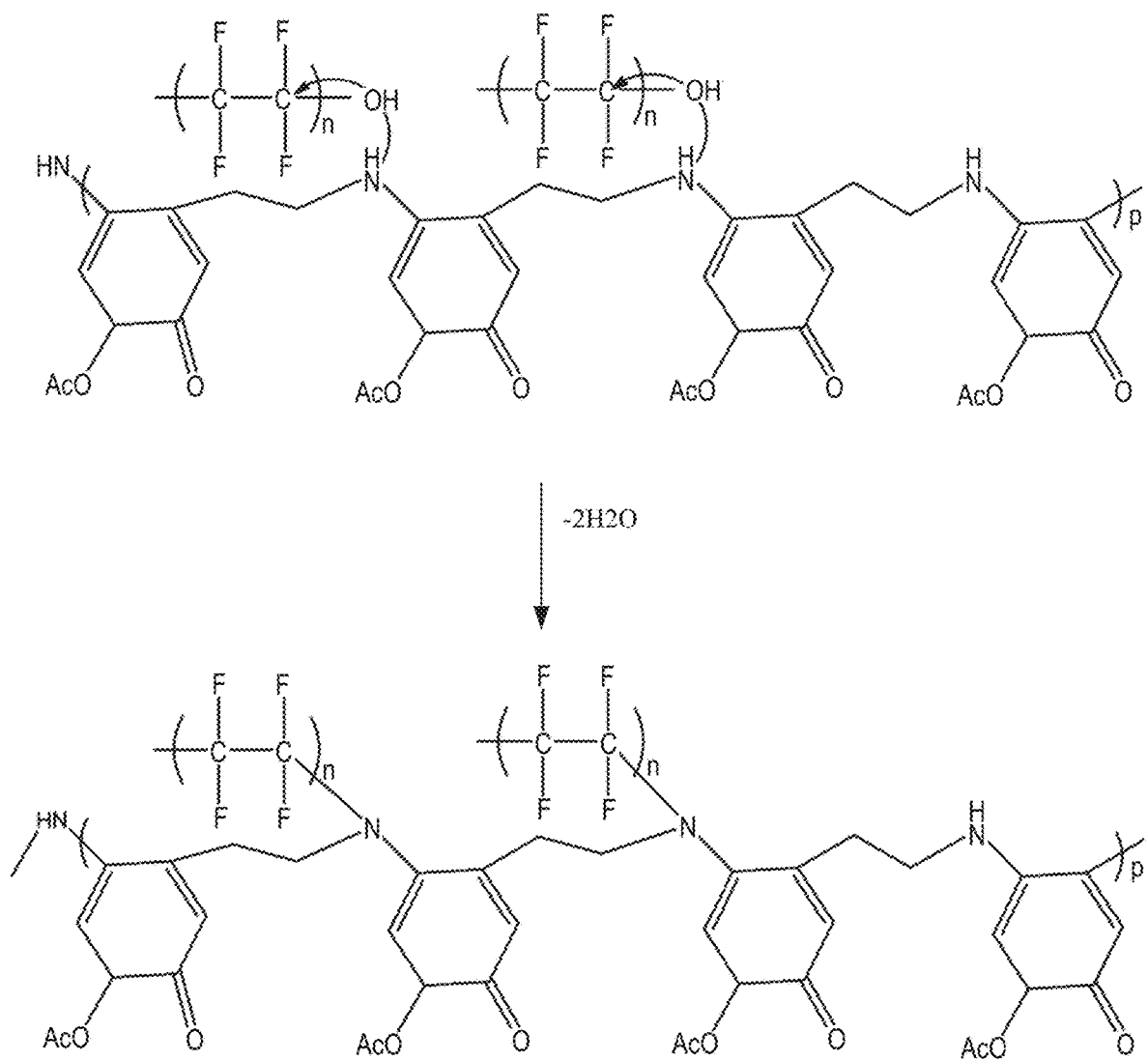
FIG. 3A shows a schematic of the molecular structure of the graft core-shell polymer structure.
Figure 3B:
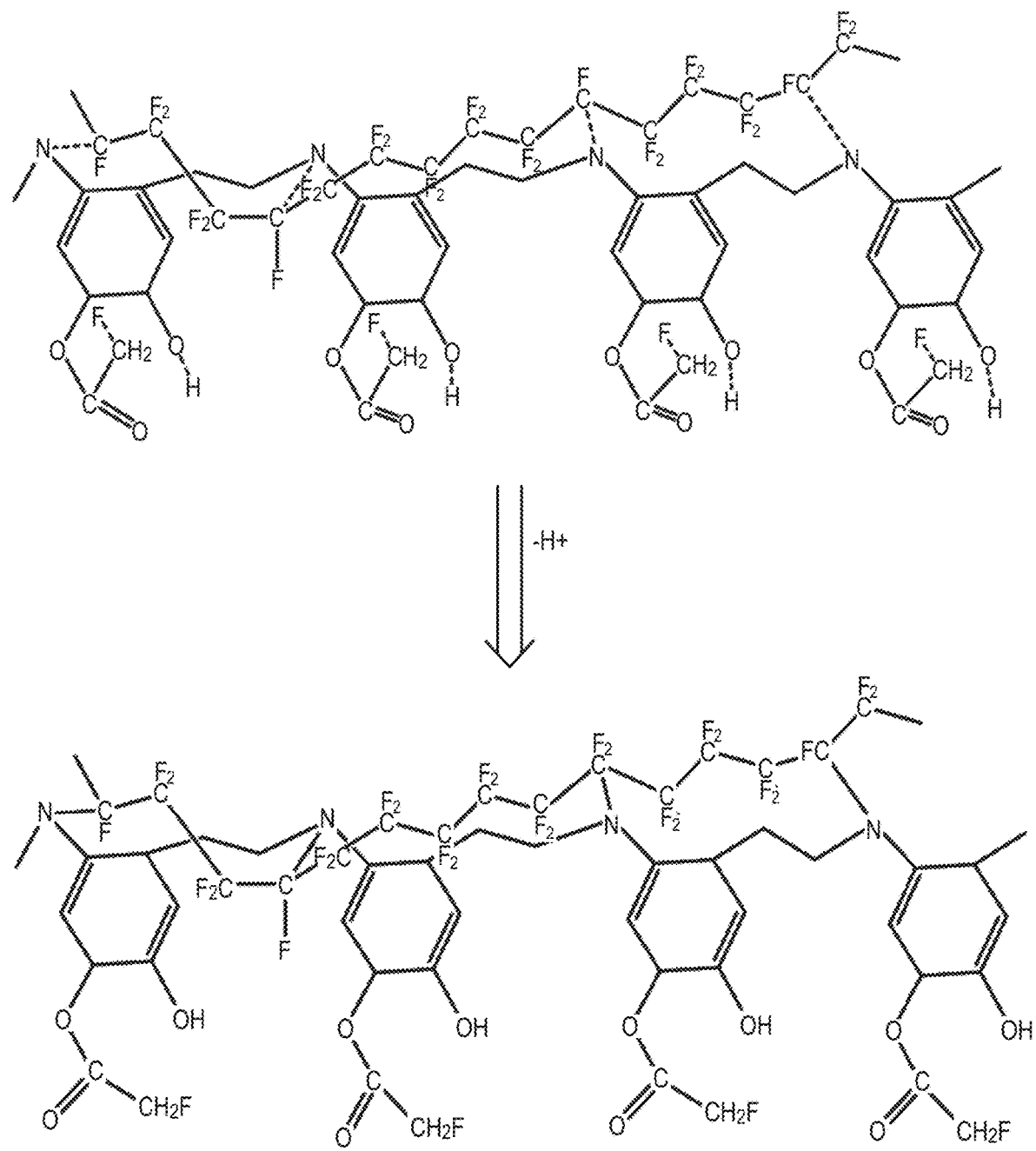
FIG. 3B shows an alternate view of a core-shell polymer grafted on a fluoropolymer. The vertical arrow indicates the application of heat to the polymerized dopamine resulting in equilibration of molecular forms.
Figure 4:
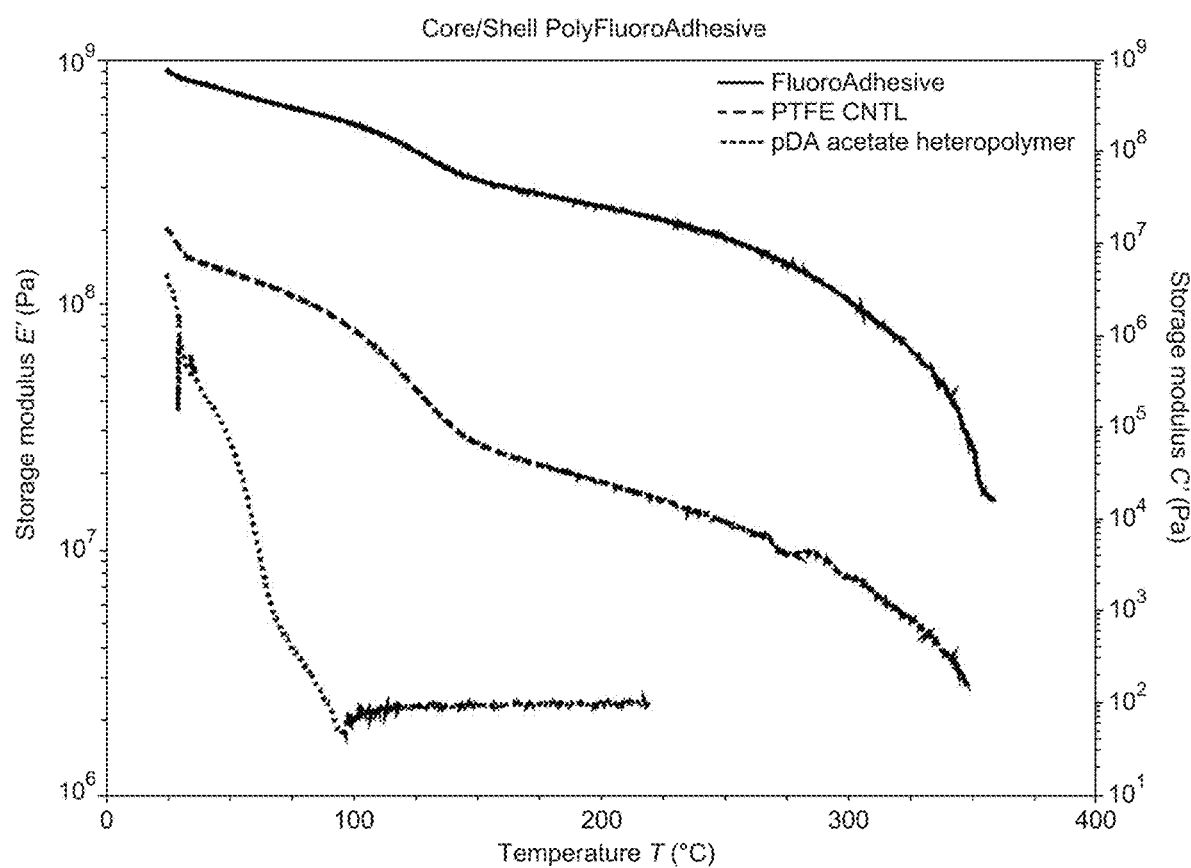
FIG. 4 illustrates Dynamic Mechanical Analysis (DMA) spectra recorded for polydopamine polymers prepared in the presence of acetic acid (acetate esterified polydopamine or polydopamine acetate, pDA, . . . ), solid polytetrafluoroethylene (PTFE) particles (- - - -), and core-shell particles prepared from the acetate esterified polydopamine and the PTFE particles ("FluoroAdhesive" shown as a solid line, ---). The spectra show that the viscoelastic modulus of the core-shell polymer is significantly greater than the individual component (PTFE and poly(dopamine-acetate) systems.
Figure 5:
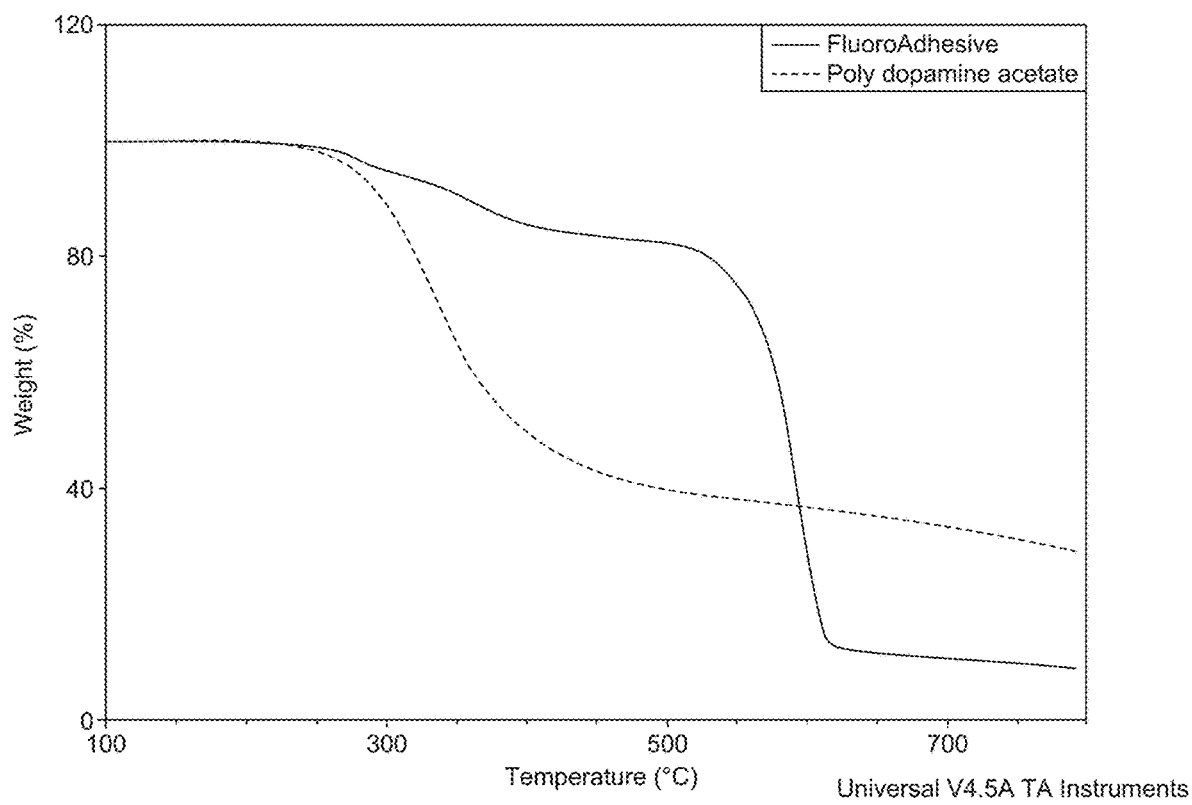
FIG. 5 illustrates thermogravimetric analysis (TGA) thermograms for a sample of a hot-melt FluoroAdhesive core-shell particle composition with a PTFE core and acetate esterified polydopamine (polydopamine acetate, pDA) shell and a sample of polydopamine acetate. The TGA thermogram shows evidence of weight loss and/or microscopic rearrangements, which can be attributed to the presence of three distinct types of polymer chains bearing comparatively different chemical and physical functional interactions which are identified by the thermogram. It is notable that the features of the thermogram for the shell polymer (polydopamine acetate) are distinctly different from those recorded for the core-shell graft copolymer. As shown, by comparison, the core-shell polymer exhibits superior thermal stability, with respect to weight loss.
Figure 6:
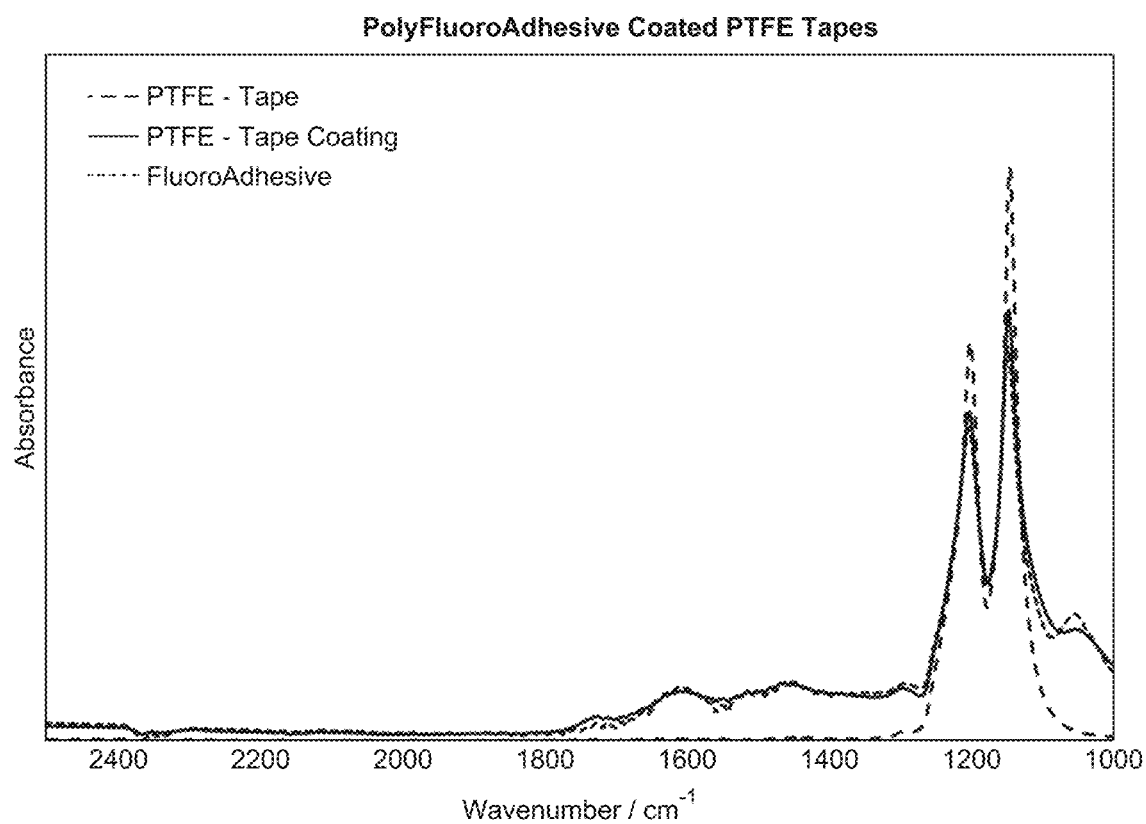
FIG. 6 depicts FT IR absorbance spectra for PTFE tapes and cured coatings of the colloidal dispersion along with control samples. Control PTFE film ("PTFE-Tape"), a control sample of the colloidal dispersion of core-shell polymer particles (PTFE core with poly(dopamine-acetate) shell) ("FluoroAdhesive"), and the PTFE film that is coated with the aqueous colloidal dispersion of core-shell particles ("PTFE-Tape Coating") are displayed. The characteristic strong C—F stretch bands 1202 and 1146 cm-1 evidence the presence of the fluoro-constituents. The characteristic acyl functionality absorbance band appears as a broad peak at about 1730 cm-1. This band is very likely the manifestation of the presence of the C=O stretch of the carboxyl functionality of the acyl moiety. Indole and indolequinone moieties may be present in residual amounts (e.g., 5% or 1% or less of the total dopamine monomers polymerized into the polymer). The characteristic band that is revealed in the spectrum for the residual indole is centered at 1608 cm-1. This band is the signature stretching frequency for the indole functionality. Another characteristic broad peak is at 1508 cm-1. This peak is characteristic of the residual indolequinone functionality. The band at approximately 1050 cm-1 is a representation of the secondary branching at the a-carbon of a cyclic secondary amine. The intensity of this band, which is due to —C—N stretch, is markedly reduced most likely due to the presence of the electron withdrawing —C=O group(s) at the para position, which affects the resonance contribution of the aromatic ring (see FIG. 2) and shifts the frequency to the shorter wavelength (high cm-1) values.

The reaction of dopamine monomers (e.g., dopamine hydrochloride) with a carboxylic acid (e.g., acetic acid) in the presence of core particles (e.g., thermoplastic particles such as PTFE particles) under aerobic conditions in an aqueous medium at a buffered pH of about 8.5 catalyzed by redox catalyst (such as molecular oxygen or other peroxide initiators) generates a mixture of polymeric structures that may be as depicted in FIGS. 2 and 3, with a shell of the heteropolymers shown in FIGS. 3A and 3B formed on the core fluoropolymer particles. When the reaction is conducted employing suspension or colloidal suspension of core particles, the resulting reaction mixture is in the form of a suspension or a colloidal suspension of thermoplastic core-shell particles. Those core-shell particles can be used as an agent that acts, among other things, as a PSA suitable for joining metallic and/or synthetic polymeric surfaces (e.g., fluoropolymers and/or polyolefins). In the case of PTFE core particles, the core-shell particles may be prepared with a water-soluble initiator in the presence of an anionic surfactant. The resulting core-shell particle-containing suspension may be uniformly coated on (polar and non-polar) surfaces. Once formed, the dopamine heteropolymers, including those incorporated into the shell layer of core-shell particles or coated onto surfaces, can be further modified by heating up to a temperature of 220° C. to remove moisture and enhance the formation of the esterified polymer(s). Such heat treatments result in enhanced thermal durability of the material when used, for example, as a pressure sensitive adhesive. The final esterified dopamine-based polymer, as shown in FIG. 2, is a novel heteropolymer that melts at 104-220° C. and possesses a molecular weight of approximately 10,000 to 60,000 Daltons. The molecular weight is determined by size exclusion chromatography by dissolving the polymer in a suitable solvent. When formed as a coating or shell, and particularly when grafted as a shell onto fluoropolymer particles, the melting, softening, and/or phase transition temperatures can be much higher (see, e.g., the differences between polydopamine aetate and a polydopamine acetate shell grafted onto a PTFE core particle shown in FIGS. 4 and 5).

The molecular structures depicted in FIGS. 2, 3A and 3B represent the components present in the polymerization of dopamine in the presence of one or more carboxylic acids, with the structures in FIGS. 3A and 3B grafted to a fluoropolymer comprising a fluoroalkyl (in this instance perfluoroalkyl) chain.

Figure 7:
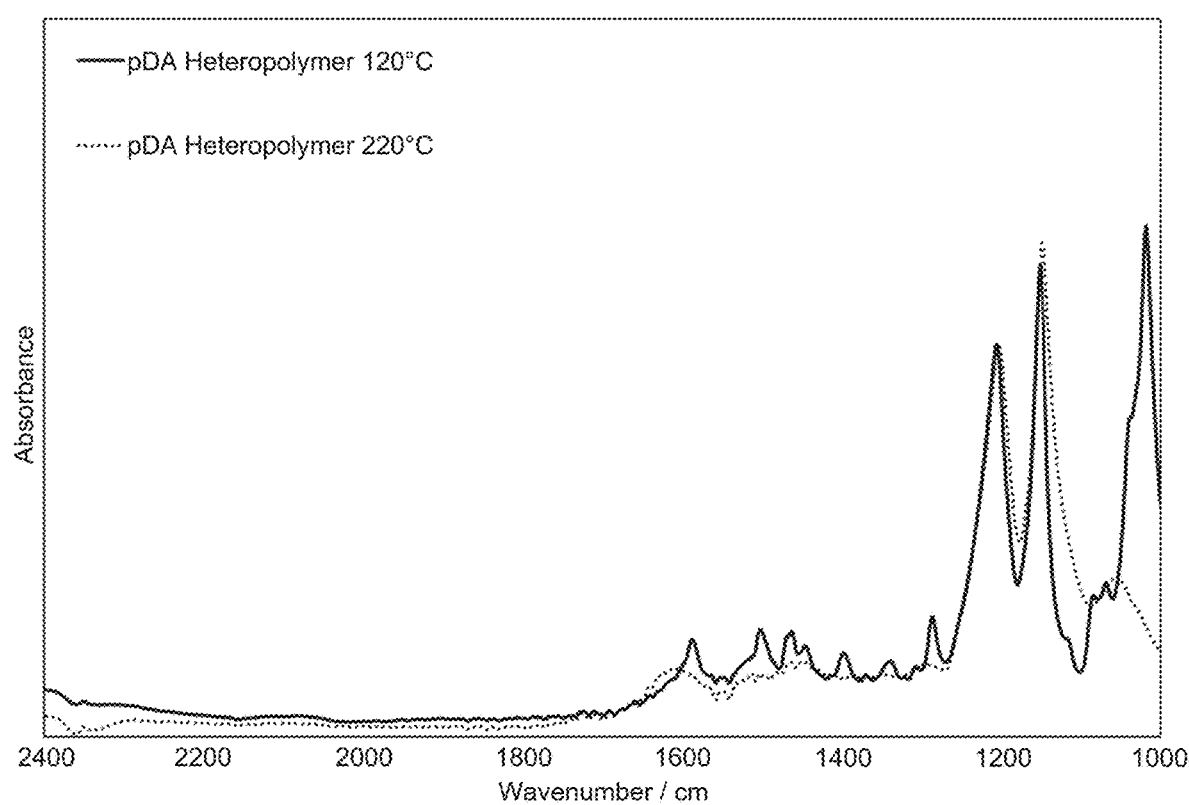
FIG. 7 depicts IR Spectra of poly(dopamine-acetate)-PTFE core-shell particle compositions treated at two different temperatures.

An evaluation of the IR spectra as depicted in FIG. 7, which shows an FT-IR spectrum of poly(dopamine-acetate)-PTFE core-shell particle compositions treated at two different temperatures, reveals that the aromatic conjugated carbonyls of the quinone moiety, revealed in the polymeric structures disclosed herein, have a band at 1300-1230 cm-1 as a result of the phenyl C—C stretch. This elucidates and supports the occurrence of the bands observed in the spectra.

The secondary aromatic amines have a —CNH bending absorption near 1510 cm-1, which as shown in the spectra (FIG. 7) is near the 1500 cm-1 aromatic band. Solid state phenols are known to exhibit IR absorption at 1390-1330 cm-1 of medium intensity and 1260-1180 cm-1 (broad intensity band) resulting from OH deformation and C—O stretch. The occurrence of the broad absorbance at 1342-1320 cm-1 and 1315-1250 cm-1 are likely due to the —CNH group attached to the quinone structure. The carbon-nitrogen stretching vibration also gives rise to a strong intensity band at 1050 cm-1.

The broad band resulting from —OH stretching at 3373 cm-1 is not shown. The —OH moiety is converted to acetate or another ester where a hydroxyl group (—OH) reacts with a carboxylic acid or acid anhydride (e.g., acetic acid) present in the reaction mixture. The 1050 cm-1 band that occurs prior to the second step heating of the core-shell coating solution to 220° C. may be due to the presence of —C—O—H groups resulting from the hydrolysis of the sulfate ester end groups present in PTFE. See FIG. 3A and FIG. 3B.

1. Dopamine and Other Monomers for Preparation of Polydopamine Polymers

The polydopamine polymers described herein may be prepared with dopamine. Alternatively, they may be prepared with one or more dopamine analogs or mixtures comprising one or more dopamine analogs and dopamine Dopamine analogs include, but are not limited to, dopamine substituted with one or more independently selected lower alkyl groups (methyl, ethyl, propyl, isopropyl, n-butyl, sec-butyl, or isobutyl) and/or halogen atoms (Cl, F, or Br) at any one or more of the dopamine ring C3 position, dopamine ring C6 position, or alkyl side chains. Dopamine analogs and mixtures of dopamine analogs, including mixtures with dopamine itself, may be used in place of dopamine, including in the compositions and methods recited in the claims.

In addition to dopamine and/or dopamine analogs, a variety of ethylenically unsaturated molecules may be included in the dopamine polymerization reaction, including ethylenically unsaturated carboxylic acids. Ethylenically unsaturated molecules may be incorporated into the dopamine polymer through the above-described redox reactions. Ethylenically unsaturated carboxylic acids (e.g., with vinyl groups) may also be incorporated into the dopamine polymer through esterification reactions and/or redox reactions as described in the subsequent section, thereby leading to esterified dopamine polymers that may include crosslinks, cyclization of the polymer chains, free carboxyl groups and alkene substituents (e.g., vinyl groups) appended to semiquinone groups.

Among the ethylenically unsaturated molecules that may be incorporated into polydopamine polymers are those set forth in Groups A-E that follow. Typically, such molecules or mixtures of such molecules (selected independently from any of Groups A-E) will be present in an amount less than 20% (e.g., less than 15%, less than 10%, less than 7.5%, less than 5%, less than 2.5% or less than 1%) by weight of the polydopamine polymer(s) on a dry weight basis (e.g., in a range selected from 0.1-20%, 0.1%-1%, 1%-2.5%, 2.5%-5%, 5%-7.5%, 7.5%-10%, 10%-15%, and 15%-20%). In an embodiment, the total weight of molecules recited in Groups A-E is greater than zero and less than 2.5% based on the total weight of the polydopamine polymer(s) (e.g., the shell of core-shell particles).

Group A: ethylenically unsaturated carboxylic acids and their esters such as acrylic acid (AA), methacrylic acid (MAA), methyl acrylate (MA), ethyl acrylate (EA), propyl acrylate (PA), butyl acrylate (BA) hexafluorobutyl acrylate (F6BA), 2-ethylhexyl acrylate (2EHA), methyl methacrylate (MMA), ethyl methacrylate, propylmethacrylate, butyl methacrylate (BMA), poly (ethylene glycol[200/400] monomethacrylate and mixtures thereof;

Group B: vinyl compounds such as ethylene, propylene, butadiene (BD), substituted butadienes such as alkylbutadiene-isoprene, allyl acrylate, allyl methacrylate (ALMA), vinyl chloride (VC), vinyl acetate (VA), styrene (ST), p-methylstyrene (PMS), 4-vinylpyridine (4 VP), 2-vinylpyridine (2 VP), N-vinylpyrrolidone (NVP), styrene sulfonic acid (SSA) and mixtures thereof;

Group C: unsaturated amides such as acrylamide, methacrylamide, N-methylolacrylamide and mixtures thereof;

Group D: other unsaturated monomers containing nitrogen or silicon such as dimethylaminoethyl acrylate, trimethylvinylsilane, methacryloxypropyltrimethoxysilane (MATS) and mixtures thereof;

Group E: copolymerizable surfactant as exemplified by perfluoro(4-methyl-3,6-dioxaoct-7-ene)sulfonic acid.

The above-mentioned molecules, and mixtures thereof, must be chemically and physically compatible with one another as well as with the other components under the reaction conditions.

2. Carboxylic Acids

Polymerization of dopamine and dopamine analogs in the presence of carboxylic acids (e.g., alkyl carboxylic acids) gives rise to polydopamine polymers that display thermoplastic as opposed to thermoset characteristics. The resulting polymers may be esterified at one or more positions by a variety of carboxylic acids Amino carboxylic acids and ethylenically unsaturated carboxylic acids such as vinyl carboxylic acids or mixtures of any one or more, two or more, or three or more thereof (e.g., mixtures of alkyl, amino and unsaturated carboxylic acids) may be employed in the polymerization reactions.

Some exemplary carboxylic acids that may be employed in the polymerization reaction and become esterified to the monomers and/or polymers include those of the form R1C(O)OH or R1R2CHC(O)OH, where R1 and R2 are each selected independently from the group consisting of: —H; phenyl; benzyl; —(CH2)nCH3 where n is 0-16; amino acids; ethylenically unsaturated carboxylic acids; and vinyl carboxylic acids; wherein any one or more of the esterified carboxylic acids may be substituted with one or more functionalities selected from the group consisting of: —F, —Cl, —Br, —OH, carboxy, amino, nitro, methyl, ethyl, and propyl. Some specific acids (structures shown as their anions) that may be esterified include formic acid, acetic acid, fluoroacetic acid, difluoroacetic acid, trifluoroacetic acid, cis-9-octadecatrienoic acid, cyclo-C6H11COO—, C6H5CH2COO—, C6H5COO—, o-CH3C6H4COO—, m-CH3C6H4COO—, o-BrC6H4COO—, p-BrC6H4COO—, p-CH3C6H4COO—, o-ClC6H4COO—, m-ClC6H4COO—, p-ClC6H4COO—, m-BrC6H4COO—, o-O2NC6H4COO—, m-O2NC6H4COO—, p-O2NC6H4COO—, o-C6H4(COO—)2, m-C6H4(COO—)2, p-C6H4(COO—)2, p-HOC6H4COO—, o-H2NC6H4COO—, m-H2NC6H4COO—, p-H2NC6H4COO—, o-CH3OC6H4COO—, m-CH3OC6H4COO—, and p-CH3OC6H4COO—.

Some suitable alkyl carboxylic acids that may be employed in the polymerization reaction include one or more lower alkyl carboxylic acids, including mixtures comprising one or more of methanoic acid (formic acid), ethanoic acid (acetic acid), fluoroacetic acid, difluoroacetic acid, trifluoroacetic acid, propanoic acid, and butanoic acid. Some suitable amino acids that may be employed in the polymerization reaction include, but are not limited to, the common alpha amino acids: alanine, arginine asparagine, aspartic acid, cysteine, glutamine, glutamic acid, glycine, histidine, isoleucine, leucine, lysine, methionine, phenylalanine, proline, serine, threonine, tryptophan, tyrosine and valine (of the D and/or L configuration). In an embodiment the polymerization reaction employs one or more carboxylic acid selected from the group consisting of methanoic acid, ethanoic acid, propanoic acid, butanoic acid, 2-methylpropanoic acid, pentanoic acid, hexanoic acid, octanoic acid, decanoic acid, ethanedioic acid, propanedioic acid, butanedioic acid, pentanedioic acid, hexanedioic acid, 2-hydroxyethanoic acid, 2-hydroxypropanoic acid, propenoic acid (acrylic acid), benzenecarboxylic acid, benzene-1,2-dicarboxylic acid, 2-hydroxybenzenecarboxylic acid, 4-methylpentanoic acid, 5,5-dimethyl-3-oxohexanoic acid, 3-amino-5-heptenoic acid, 3-chlorohexanoic acid, and 2-aminopentanoic acid.

Some suitable ethylenically unsaturated carboxylic acids (e.g., vinyl carboxylic acids) that may be employed in the polymerization reaction include those listed in the preceding section directed to Dopamine and Other Monomers for Preparation of Polydopamine Polymers. As described in that section, in addition to being incorporated into the polymer chain, ethylenically unsaturated carboxylic acids may become esterified to monomers and/or the polymer resulting from the polymerization reaction.

3. Core Particles

Core-shell particles, including those in the form of aqueous colloidal suspensions, each comprise a core particle. The core particles used in a synthesis may be of a single type or a mixture of two, three or more types of core particles having different chemical compositions and/or sizes. Core particles may be polymeric (e.g., thermoplastic or thermoset plastic), non-metallic inorganic materials, or mixtures thereof. Core particles may be of a size that gives rise to a suspension, or small enough to form a colloidal suspension. In some embodiments the core particles may be from 10 nm (nanometers) to 100 nm, 100 nm to 1 micron (μm), or 1 μm to 10 μm. In an embodiment, the particle size of PTFE and other fluoropolymer particles may be about 0.05 μm to about 1.0 μm (e.g., about 0.1 μm to 0.5 μm). The solid content of the aqueous suspension or colloidal suspension of core particles introduced into the polymerization reaction may be about 10 to about 40 percent by weight (e.g., from about 20 to about 40 percent by weight).

A variety of polymeric core particles may be employed to prepare particles having a core-shell morphology suitable, for example, for use as a component of a pressure sensitive adhesive. Suitable core particles include one (a single type of polymeric particles) or a mixture (e.g., two or more types) of polymeric particles comprised of thermoplastic(s) or thermoset plastic(s). In an embodiment, the core-shell particles comprise core particles comprised of one or more polymers (e.g., organic polymers). In an embodiment, the core-shell particles comprise core particles comprised of one or more thermoplastics. In an embodiment, the core-shell particles comprise core particles comprised of one or more thermoset plastics.

In an embodiment, the core of a core-shell particle may be comprised of 90% to 100% by weight of monofunctional vinyl monomers polymerized with 0% to 10% by weight of divinyl, trivinyl, tetravinyl monomers or mixtures of the thereof.

Some suitable polymeric materials that may be employed to prepare core particles (core polymers) include, but are not limited to:
 i) butadiene-styrene methyl methacrylate and homopolybutadiene particles,
 ii) polyvinyl chloride and vinyl chloride vinyl acetate copolymer particles,
 iii) acrylic homo and copolymer particles,
 iv) vinylidene chloride copolymer particles,
 v) polyethylene and ethylene copolymer particles,
 vi) polytetrafluoroethylene particles,
 vii) fluorinated ethylene copolymer particles,
 viii) polyacrylamide and polyacrylamide derivative particles,
 ix) acrylamide copolymer and derivative particles,
 x) polycarbonate polymer and copolymer particles,
 xi) polysulfone polymer and copolymer particles,
 xii) epoxy polymer and copolymer particles, and
 xiii) polyurethane polymer and copolymer particles.

Each of the core polymers listed above, which may be prepared from one or more ethylenically unsaturated monomers, may be copolymerized with one or more additional ethylenically and/or polyethylenically unsaturated monomers including, but not limited to, those comprising alcohols, diols (e.g., vicinal diols), carboxyl, ester, amide, or epoxy groups. Examples of additional polyethylenically unsaturated monomers include: divinyl benzene, allyl methacrylate, poly(propylene glycol)diacrylate, dipropylene glycol diacrylate, triethylene glycol dimethacrylate, polyethylene glycol 200 dimethacrylate, 1,3-butanediol dimethacrylate, 1,4-butanediol dimethacrylate, glycerol dimethacrylate, trimethylol-propanetrimethacrylate and diurethanedimethacrylate in an amount of about 0.1 to about 20 weight percent. In an embodiment, the core-shell particles comprise core particles comprised of one or more fluoropolymers (including perfluoropolymers). In an embodiment, the core-shell particles comprise core particles comprised of one or more perfluoropolymers.

The core-shell particles may comprise core particles that are comprised of one or more fluoropolymers selected from the group consisting of: perfluoroalkoxy alkanes; polytetrafluoroethylenes; fluorinated ethylene propylene and/or its copolymers; perfluoromethylvinylethers; perfluoro elastomers; ethylene tetrafluoroethylenes; polyvinylidene fluorides; fluoroelastomers; vinylidene fluoride-hexafluoropropylene fluoroelastomers; vinylidene fluoride-hexafluoropropylene/tetrafluoro ethylene/hexafluoropropylene fluoroelastomers; and combinations thereof.

In an embodiment, the core-shell particles comprise core particles comprised of polytetrafluoroethylene. The core-shell particles may comprise core particles comprised of one or more polytetrafluoroethylenes (e.g., PTFE having different molecular weights). In an embodiment, at least one of the core particles is comprised of fluorinated ethylene propylene (FEP) and/or its copolymers.

Core particles employed for the preparation of particles having core-shell morphology may comprise materials other than or in addition to polymers (e.g., organic polymers). By way of example, the core-shell particles comprise core particles comprised of inorganic materials.

In an embodiment, the core-shell particles comprise core particles comprised of one or more metal oxides. For example, the core-shell particles may comprise core particles comprised of alumina (aluminum oxide ($Al_2O_3$)) which may be in the form of fumed alumina.

In an embodiment, the core-shell particles comprise core particles comprised of one or more metalloid oxides. For example, the core-shell particles may comprise core particles comprised of silica (silicon dioxide (SiO2)) which may be fumed silica.

4. Core-Shell Particles Formed in Polymerization Reactions and Compositions Comprising Core-Shell Particles The core-shell emulsion polymerization techniques described herein may be employed so that the properties desired (e.g., to create a hot melt PSA) can be engineered into a single particle platform. One aspect of the invention provides the flexibility of an aqueous colloidal core-shell particulate system in which the particle core is optionally a thermoplastic copolymer and the shell is formed in a polymerization reaction yielding polydopamine polymers (e.g., polydopamine-acetate polymers), with the resulting core-shell particle providing the attributes of a hot-melt pressure sensitive adhesive.

One aspect of the disclosure is directed to aqueous dispersions comprised of core-shell particles, the core-shell particles comprising:
 a polymeric core comprising from about 40 to about 95 percent by weight of the dry particle, wherein the polymeric core is comprised of:
  (i) about 90 to about 100 percent on a dry weight basis of a core polymer comprised of one or more olefins (e.g., vinyl monomers and/or fluorinated olefin monomers such as a PTFE core particle); and
  (ii) up to about 5 percent on a dry weight basis of a core polymer of a multifunctional monomer that acts as a reactive link for grafting the shell polymer;
 a shell comprising from about 5 to about 60 percent based on a dry weight basis of the particle wherein the shell is comprised of:
  (i) a thermoplastic shell polymer that is formed from the reaction of dopamine hydrogen chloride with a carboxylic acid or mixture of carboxylic acids; and
  (ii) about 0.1 to about 2 percent of β-cyclodextrin on a dry weight basis based on the weight of the shell polymer present in the core-shell particles.

Such aqueous dispersions may comprise from about 60% to about 90% water by weight (e.g., 60%-70%, 70%-75%, 75%-80% or 80%-90% water by weight) and from about 10% to about 40% (e.g., 10%-20%, 20%-25%, 25%-30% or 30%-40% water by weight) core-shell particles.

In some core-shell particles, including those used in aqueous compositions, the core comprises from about 45% to about 90% of the core-shell particle's weight and the shell comprises from about 10% to about 55% of the core-shell particle's weight on a dry weight basis. The weight of the shell includes the weight of cyclodextrin and surfactants/emulsifying agents. Cyclodextrin and surfactants, if present, may comprise, for example, about 0.1% to about 2% by weight of the shell polymer. As an example, a shell comprises a) about 20% to about 70% dopamine, b) about 10% to about 25% acetic acid, and c) about 20% to about 60% Tris buffer.

Drying of compositions (e.g., aqueous compositions) to remove most (e.g., substantially all) of the bulk solvent (e.g., water where the composition is aqueous) provides an adhesive coating comprising the core-shell particles. The dried adhesive composition may comprise: less than 15%, less than 10%, less than 7.5%, less than 5%; less than 2.5% or less than 1% water and/or other solvents on a weight basis. The dried adhesive composition, once reconstituted with water or other solvents, may also retain its uniformity of coating over the substrate.

In one embodiment core-shell particles, including those used in aqueous compositions, have a core particle that comprises a) about 45% to about 90% on a dry weight basis of the total weight of the core-shell particle; and b) a polymerized shell (grafted fully or partially on the core) that comprises about 10% to about 55% of the core-shell particle on a dry weight basis, of which dopamine constitutes about 20% to about 70% on a dry weight basis.

In another embodiment, the core-shell particles include the following features:
(i) a polymeric core comprising a fluoropolymer such as PTFE; and/or
(ii) a polymeric shell comprising a mixture of poly(1,2 benzoquinone ethyl amine), poly(1,2-hydroxy benzoquinone ethyl amine) and poly(1,2 methyl acetate benzoquinone ethyl amine), one or more of which are covalently linked to the fluoropolymer core particle.

The polymers of the shell may be covalently linked to the fluoropolymer of the core particle through the nitrogen atoms(s) of the shell polymer.

Hot-melt pressure sensitive adhesive coatings can be prepared from suspensions of core-shell polymeric particles, including those described immediately above. The suspensions can be aqueous suspensions (e.g., aqueous suspensions or aqueous colloidal suspensions).

Thermogravimetric measurements (TGA) of the core-shell particles record the weight loss that occurs upon heating a particle sample in air or in an inert atmosphere such as nitrogen. This measurement yields a quantitative response to any weight loss that is associated with the liberation of volatile components that occurs during a transition in temperature. The changes in weight can be attributed to the rupture and/or formation of diverse physical and chemical bonds at elevated temperatures that can promote the formation of higher molecular weight products. TGA measurements also yield information on the thermal stability of the material over a range of temperatures.

Dynamic Mechanical Analysis (DMA) measurements were conducted using the procedure and conditions outlined in ASTM D4065-12. The DMA measurements of the transitions associated with the movements of polymer chains under conditions that induce thermal and mechanical stresses reveal the influence that the shell's polymer has on the core-shell structure and on the thermal properties of the polymer composite. DMA measurement, which employs a strip of polymeric material constrained to flex at a rate of 1 Hz, records the resonant frequency and mechanical damping of the material. The data recorded from this measurement quantifies, by known mechanical damping, the amount of energy dissipated by the sample as it oscillates, while the resonant frequency yields the value of the Youngs Modulus (elastic) or stiffness. From the DMA measurements, the loss modulus and storage modulus can be determined and recorded. DMA analysis of core-shell particles having a shell of esterified polydopamine polymer and a PTFE core indicates that the elastic modulus of the PTFE core is significantly enhanced by apparent covalent coupling with the polydopamine polymer.

5. Interaction of Polydopamine Polymers with Core Particles and Other Materials

Polydopamine polymers contacted with or formed upon materials (e.g., as shells on core particles or on other materials such as sheets, films, or ribbons of materials such as fluoropolymers) can interact with and/or become bound to the particles or other materials through a variety of stabilizing interactions. The interactions may include, for example: adsorption of groups present in the polydopamine polymer(s) upon the surface of core particles and other materials, chemical bond formation between groups present in the polydopamine polymer(s) and groups present in or on the surface of core particles and other materials; dipole-dipole, hydrogen bonds and/or dispersion interactions between groups present in the polydopamine polymer(s) and the groups present on or in the core particles or other materials; and intercalation of groups present in the polydopamine polymer(s) and the surface of core particles or other materials.

The adsorbed groups are typically emulsifiers (e.g., surfactants/detergents) that have been employed in monomer emulsification. Common emulsifiers include: non-anionic surfactants (e.g., Tergitol), sodium lauryl sulfate, ammonium salts of sulfated nonylphenoxypoly(ethyleneoxy)ethanol, sodium diisopropyl naphthalene sulfonate and alkylamine-guanidine polyoxyethanol.

B. Applications of the Polydopamine Polymers and Core-Shell Particles Comprising Those Polymers The thermoplastic polydopamine polymers described herein find a variety of uses as plastic materials, as primers for diverse surfaces, and as adhesives. The thermoplastic esterified dopamine polymers and core-shell particles incorporating those polymers as shell layers may be formed into a variety of articles including but not limited to films, sheets, ribbons, fibers, filaments, webs of fibers and the like. Those articles may be used for a number of purposes including as adhesive layers, primers, polymers for additive manufacturing, etc.

The thermoplastic polydopamine polymers may advantageously be incorporated into the shell of core-shell particles, which find use as pressure sensitive hot-melt adhesives. In embodiments where the core is a fluoropolymer (e.g., PTFE), the elastic modulus of the core particle is enhanced in the presence of the thermoplastic polydopamine polymer shell.

Core-shell particles having a thermoplastic polydopamine polymer shell and fluoropolymer core find particular use in the preparation of adhesives for binding low surface energy materials such as polyolefins and fluoropolymers with high surface energy substrates such as glasses, ceramics, metals and metal alloys. The adhesive properties of the thermoplastic polydopamine polymers, especially when serving as the shell of a core-shell particle are particularly suitable for the preparation of bearings and tribological surfaces where a low surface energy material is bonded to a metal or metal alloy structure.

In one embodiment, a fluoropolymer (e.g., FEP or PTFE) film, sheet, or ribbon can be coated on one side with the colloidal polymers (suspension of core-shell colloidal particles), heated to a temperature up to 220° C. if desired, and packaged for distribution. The distributed materials find use, among other things, as adhesive materials applied by heat pressing the film, sheet, or ribbon onto a surface. The adhesive materials may be employed to secure tribilogical and other materials, or as decorative and/or protective (e.g., water resistant) coatings.

As a means of producing materials having a coating of core-shell particles that can serve as an adhesive, a suspension (e.g., colloidal suspension) of the core-shell particles of this disclosure can be applied to the surface of an article such as a sheet, film, or ribbon (e.g., a sheet of polymeric material or section of a woven or non-woven textile). The application may be conducted by a curtain coating technique (or other technique such as spraying, rolling, spin coating etc.). Curtain coating techniques differ from a Gravure roll coating in that a film, ribbon, sheet, or textile is conveyed through a falling curtain of the aqueous fluid that is continuously metered onto article(s), such as articles in the form of a sheet, film, or ribbon. The thickness of the film applied is determined by the speed of the conveyor, the rate of delivery of the aqueous solution onto the moving substrate, and the Mayer rod(s) (if employed).

Aqueous compositions (e.g., suspensions or colloidal suspensions of core-shell particles) of the present disclosure can also be applied to a plastic sheet, film, or ribbon by the Gravure roll coating technique. This technique is applicable for aqueous colloidal suspensions that have a viscosity of about 10 to about 100 mPas at room temperature (20° C.). The Gravure technique is capable of coating a substrate at a speed of 900 meters per minute at a coating thickness that ranges from 1 to 50 µm. The application can be carried out by both the direct Gravure coating or offset Gravure coating techniques.

The application of suspensions or colloidal suspensions of core-shell particles on an article may be followed by a drying step in an oven at a preset temperature (e.g., a temperature up to 220° C.). After drying, coated articles in the form of flexible ribbons, films, or sheets may be spooled into a dispensing roll for use in the preparation of tribiological layers, for example, for bearings. Sheets, films, and ribbons may be, for example, polymeric (for example, see the list of fluoropolymers that follows) or metallic (e.g., such as steel, aluminum, copper, titanium, magnesium, bronze, brass, and alloys for aerospace applications). For example, see the list that follows of alloys and superalloys, especially aluminum alloys that are suitable for making aerospace structural components like integral wing spars, ribs and webs.

C. Materials and Substrates

Although the polydopamine polymers described herein are in and of themselves thermoplastics, they find additional uses including as coatings and primers. Polydopamine polymers, along with core-shell particles comprising those polymers as shell layers, can also act as a hot-melt pressure sensitive adhesive capable of binding to diverse materials including polymers (e.g., organic polymers such as fluoropolymers), ceramics, glasses, and metals including metal alloys. The polydopamine polymers and core-shell particles comprising those polymers as shell layers may be applied to any of those diverse materials to form an adhesive layer. Alternatively, any of those diverse materials may be adhered to an adhesive layer formed on all or part of the surface of an article (e.g., a substrate such as a sheet, wire, tube, tribological material support).

Among the diverse materials that can be coated with the hot-melt pressure sensitive adhesive or bound by the adhesive once formed on a surface are polymers including thermoplastics and thermoset plastics. Included in those polymers are all of the above-listed polymers that may serve as core particles and composites comprising those polymers. Such polymers include polyolefins and fluoropolymers (including perfluoropolymers). By way of example fluoropolymers include, but are not limited, to: perfluoroalkoxy alkanes (PFA or PFAs when plural); polytetrafluoroethylene (PTFE); fluorinated ethylene propylene (FEP) and its copolymers; expanded-polytetrafluoroethylene (ePTFE or EPTFE); expanded-fluorinated ethylene propylene (eFEP or EFEP); perfluoromethylvinylether (PMVE); perfluoro elastomers (e.g., FFKM, which are copolymers of tetrafluoroethylene and a perfluorinated ether such as PMVE sold under the tradenames TECNOFLON® or TECNOFLON® PFR and branded as KALREZ®, CHEMRAZ® and PERLAST®) or combinations thereof. The fluoropolymers that may be employed include, but are not limited to, ethylene tetrafluoroethylene (ETFE); polyvinylidene fluoride (PVDF); fluoroelastomers (FKM and FEPM, sold under the tradenames VITON®, TECNOFLON®); vinylidene fluoride-hexafluoropropylene fluoroelastomer (VF2/HFP); vinylidene fluoride-hexafluoropropylene/tetra-fluoro ethylene/hexafluoropropylene fluoroelastomer (VF2/tetrafluoro ethylene/HFP) terpolymer; or combinations thereof. Fluoropolymer composites, including but not limited to, PTFE combined with filler materials such as carbon, graphite, fibers (such as E glass and polyimides), and MoS2 (such as MoS2 filled PTFE/PEEK), may be utilized in an object (a surface, an interface, or a composite), or components thereof.

Included in the materials that can be coated with the hot-melt pressure sensitive adhesives or bound by the adhesives once formed on a surface are metals and metal alloys. Metals that can be utilized include iron, aluminum, copper, cobalt, chromium, tungsten, vanadium, titanium, magnesium, nickel, and alloys thereof such as steel, bronze, brass, and super alloys. In an embodiment the alloys are aerospace aluminum alloys that typically include alloying elements of copper, magnesium, manganese, silicon, tin and/or zinc. Also included are a diverse group of materials collectively known as "super alloys" that generally display excellent mechanical strength, resistance to thermal creep deformation, good surface stability, and resistance to corrosion or oxidation (e.g., iron, chromium and nickel super alloys, or cobalt, chromium and nickel super alloys).

In addition to polymeric materials and metals, glasses (e.g., soda-lime, borosilicate, fused silica, aluminosilicate, and lead glass) and ceramics including nitrides and carbides (e.g., kaolins, alumina, silicon nitride, silicon carbide, tungsten carbide, and the like) may be used.

III. Certain Embodiments

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, and/or process step or steps, to the objective, spirit and scope of the present invention. All such modifications are intended to be within the scope of the claims appended hereto.

1. A method of preparing a thermoplastic polydopamine polymer comprising:
    contacting monomers of dopamine and/or dopamine analogs with one or more carboxylic acids in the presence of a redox initiator (such as elemental oxygen) in a basic buffer solution (such as tris-(hydroxymethyl) aminomethane), permitting the monomers to undergo a polymerization reaction thereby forming a polymer comprising polymerized quinone, semiquinone, semiquinone ester (bearing an esterified carboxylic acid), quinol, and/or quinol esters (bearing one or more esterified carboxylic acids) of the dopamine or dopamine analogs.

2. The method of embodiment 1, wherein the redox initiator comprises elemental oxygen (e.g., $O_2$).

3. The method of embodiment 1, wherein the redox initiator comprises a peroxide.

4. The method of embodiment 3, wherein the redox initiator comprises an organic peroxide.

5. The method of embodiment 3, wherein the redox initiator comprise an organic peroxide selected from the group consisting of: tert-butyl peroxide (aka tert-butyl hydroperoxide), benzoyl peroxide, acetyl benzoyl peroxide, ascaridole, methyl ethyl ketone peroxide, and methyl isobutyl ketone peroxide.

6. The method of embodiment 3 or 4, wherein the redox initiator comprises tert-butyl peroxide (aka tert-butyl hydroperoxide) or benzoyl peroxide.

7. The method of any one of embodiments 1-6, wherein the contacting step further comprises one or more metal salts.

8. The method of embodiment 7, wherein the metal salts are copper and/or iron salts.

9. The method of embodiment 8, wherein the metal salts are copper and iron salts in the presence of hydrosulfite (e.g., iron hydrosulfite plus copper hydrosulfite) in the presence or absence of persulfate salts.

10. The method of any one of embodiments 1-9, wherein the reaction is conducted in aqueous solution.

11. The method of any one of embodiments 1-10, wherein the basic pH is in a range from about pH 8.0 to about pH 10.5 (e.g., from pH 8.0 to pH 9.0 or pH 9.0 to pH 10.5).

12. The method of any one of embodiments 1-11, wherein the basic buffer comprises an organic or inorganic buffer.

13. The method of any one of embodiments 1-12, wherein the basic buffer comprises an organic buffer.

14. The method of embodiment 13, wherein the basic buffer comprises an organic buffer that does not comprise an amine (e.g., 2-fluorophenol or 3-fluorophenol).

15. The method of embodiment 13, wherein the basic buffer comprises an organic amine buffer.

16. The method of embodiment 15, wherein the organic amine buffer comprises a buffer component selected from the group consisting of: AES (2-aminoethanesulfonic acid, Taurine), AMP (2-amino-2-methyl-1-propanol), AMPD (2-amino-2-methyl-1,3-propanediol, Ammediol), AMPSO (N-(1,1-dimethyl-2-hydroxyethyl)-3-amino-2-hydroxypropanesulfonic acid), CAPS (3-(cyclohexylamino)-propanesulfonic acid), CAPSO (3-(cyclohexylamino)-2-hydroxy-1-propanesulfonic acid), CHES (cyclohexylamino-ethanesulfonic acid), DIPSO (3-[N-bis(hydroxyethyl) amino]-2-hydroxypropanesulfonic acid), glycine, TAPS (3-{[tris(hydroxymethyl)-methyl]-amino}-propanesulfonic acid), TEA (triethanolamine), TES (2-[tris(hydroxymethyl)-methylamino]-ethanesulfonic acid), Tris (tris(hydroxymethyl)-aminomethane), Tricine (N-[tris(hydroxymethyl)-methyl]-glycine), Bicine (N,N'-bis(2-hydroxyethyl)-glycine), HEPES (N-(2-hydroxyethyl)-piperazine-N'-ethanesulfonic acid), HEPPS, EPPS (N-(2-hydroxyethyl)-piperazine-N'-3-propanesulfonic acid), HEPPSO (N-(2-hydroxyethyl)-piperazine-N'-2-hydroxypropanesulfonic acid), and POPSO (piperazine-N,N'-bis(2-hydroxypropane-sulfonic acid)).

17. The method of embodiment 16, wherein the organic amine buffer comprises tris(hydroxymethyl)-aminomethane.

18. The method of embodiment 16, wherein the organic amine buffer comprises tris hydrochloride and/or tris acetate.

19. The method of any one of embodiments 1-18, wherein the basic buffer comprises a volatile buffer system selected from the group consisting of: trimethylamine/hydrochloric acid; ammonia/formic acid; ammonia/acetic acid; N-ethylmorpholine/acetate; ammonium bicarbonate; ammonium carbonate/ammonia; trimethylamine/formic acid; trimethylamine/acetic acid; and trimethylamine/carbonate.

20. The method of any one of embodiments 1-19, wherein the one or more carboxylic acids comprises one or more alkyl carboxylic acids, one or more amino carboxylic acids, one or more ethylenically unsaturated carboxylic acid, or a mixture thereof; wherein any of the one or more carboxylic acids is optionally esterified to a hydroxyl of quinol or semiquinone monomer incorporated into the polymer.

21. The method of embodiment 20, wherein the alkyl carboxylic acid comprises one or more lower alkyl carboxylic acids including a mixture comprising one or more of methanoic acid (formic acid), ethanoic acid (acetic acid), fluoroacetic acid, difluoroacetic acid, trifluoroacetic acid, propanoic acid, and butanoic acid.

22. The method of any one of embodiments 1-21, wherein the polymerization reaction employs one or more carboxylic acids selected from the group consisting of methanoic acid, ethanoic acid, propanoic acid, butanoic acid, 2-methylpropanoic acid, pentanoic acid, hexanoic acid, octanoic acid, decanoic acid, undecanoic acid, tridecanoic acid, tetradecanoic acid, pentadecanoic acid, hexadecanoic acid, heptadecanoic acid, ethanedioic acid, propanedioic acid, butanedioic acid, pentanedioic acid, hexanedioic acid, 2-hydroxyethanoic acid, 2-hydroxypropanoic acid, propenoic acid (acrylic acid), benzenecarboxylic acid, benzene-1,2-dicarboxylic acid, 2-hydroxybenzenecarboxylic acid, 4-methylpentanoic acid, 5,5-dimethyl-3-oxohexanoic acid, 3-amino-5-heptenoic acid, 3-chlorohexanoic acid, and/or 2-aminopentanoic acid.

23. The method of any one of embodiments 1-22, wherein the polymerization reaction comprises a carboxylic acid of the following formula:
    R1C(O)OH or R1R2CHC(O)OH, wherein R1 and R2 are each selected independently from the group consisting of —H; phenyl; benzyl; and —$(CH_2)_n CH_3$ where n is 0-16; and wherein the method optionally comprises a carboxylic acid of the R1C(O)OH or R1R2CHC(O)OH esterified to a semiquinone or quinol hydroxyl.

24. The method of embodiment 23, wherein the esterified carboxylic acid is substituted with one or more functionalities selected from the group consisting of: —F, —Cl, —Br, —OH, carboxy, amino, nitro, methyl, ethyl, and propyl.

25. The method of embodiment 23, wherein the esterified carboxylic acid is selected from the group consisting of formic acid, acetic acid, fluoroacetic acid, difluoroacetic acid, trifluoroacetic acid, cis-9-octadecatrienoic acid, cyclo- $C_6H_{11}COO-$, $C_6H_5CH_2COO-$, $C_6H_5COO-$, o-$CH_3C_6H_4COO-$, m-$CH_3C_6H_4COO-$, o-$BrC_6H_4COO-$, p-$BrC_6H_4COO-$, p-$CH_3C_6H_4COO-$, o-$ClC_6H_4COO-$, m-$ClC_6H_4COO-$, p-$ClC_6H_4COO-$, m-$BrC_6H_4COO-$, o-$O_2NC_6H_4COO-$, m-$O_2NC_6H_4COO-$, p-$O_2NC_6H_4COO-$, o-$C_6H_4(COO-)_2$, m-$C_6H_4(COO-)_2$, p-$C_6H_4(COO-)_2$, p-$HOC_6H_4COO-$, o-$H_2NC_6H_4COO-$, m-$H_2NC_6H_4COO-$, p-$H_2NC_6H_4COO-$, o-$CH_3OC_6H_4COO-$, m-$CH_3OC_6H_4COO-$, and/or p-$CH_3OC_6H_4COO-$.

26. The method of embodiment 23, wherein the one or more unsaturated carboxylic acids comprises vinyl carboxylic acids and/or one or more unsaturated amino carboxylic acids; wherein the unsaturated carboxylic acid(s) are optionally incorporated into the polymer as a monomer during the polymerization reaction, and/or optionally are esterified to a hydroxyl of a semiquinone or a quinol monomer incorporated into the polymer.

27. The method of any one of embodiments 20-26, wherein the polymerization reaction further comprises one or more (e.g., two or more, three or more etc.) ethylenically unsaturated molecules (e.g., monomers and/or organic acids) selected from:
  (a) unsaturated carboxylic acids and their esters such as acrylic acid (AA), methacrylic acid (MAA), methyl acrylate (MA), ethyl acrylate (EA), propyl acrylate (PA), butyl acrylate (BA) hexafluorobutyl acrylate (F6BA), 2-ethylhexyl acrylate (2EHA), methyl methacrylate (MMA), ethyl methacrylate, propylmethacrylate, butyl methacrylate (BMA), poly (ethylene glycol [200/400] monomethacrylate, and/or mixtures thereof;
  (b) vinyl compounds such as ethylene, propylene, butadiene (BD), substituted butadienes such as alkylbutadiene-isoprene, allyl acrylate, allyl methacrylate (ALMA), vinyl chloride (VC monomer or VCM), vinyl acetate (VA monomer or VCM), styrene (ST), p-methylstyrene (PMS), 4-vinylpyridine (4 VP), 2-vinylpyridine (2 VP), N-vinylpyrrolidone (NVP), styrene sulfonic acid (SSA), and/or mixtures thereof;
  (c) unsaturated amides such as acrylamide, methacrylamide, N-methylolacrylamide, and/or mixtures thereof;
  (d) unsaturated monomers containing nitrogen or silicon such as dimethylaminoethyl acrylate, trimethylvinylsilane, methacryloxypropyltrimethoxysilane (MATS) and/or mixtures thereof; and/or
  (e) copolymerizable surfactants such as perfluoro(4-methyl-3, 6-dioxaoct-7-ene)sulfonic acid.

28. The method of any one of embodiments 1-27, comprising one or more carboxylic acids esterified at a quinol or semiquinone hydroxyl group, wherein at least one (e.g., at least two) of the one or more carboxylic acids esterified to the hydroxyl group are selected independently from the group consisting of alanine, arginine asparagine, aspartic acid, cysteine, glutamine, glutamic acid, glycine, histidine, isoleucine, leucine, lysine, methionine, phenylalanine, proline, serine, threonine, tryptophan, tyrosine and valine (of the D and/or L configuration).

29. The method of any one of embodiments 1-28, wherein the polymerization reaction is conducted at a temperature from about 20° C. to about 80° C. (e.g., from about 20° C. to about 30° C., from about 20° C. to about 40° C., from about 20° C. to about 80° C., from about 30° C. to about 80° C., from about 30° C. to about 60° C., or from about 35° C. to about 55° C.).

30. The method of any one of embodiments 1-29, wherein the polymerization is conducted at a pressure from about 400 mm of Hg to about 2,200 mm of Hg (e.g., from about 400 mm of Hg to about 1,500 mm of Hg, from about 600 mm of Hg to about 1,500 mm of Hg, from about 700 mm of Hg to about 800 mm of Hg, or from about 1500 mm of Hg to about 2,200 mm of Hg).

31. The method of any one of embodiments 1-30, wherein the polymerization is conducted at about 760 mm of Hg of pressure (e.g., from about 700 to about 800 mm of Hg).

32. The method of any one of embodiments 1-31, wherein at least some of the pendant alkyl amine groups of dopamine react with a dopaquinone, dopamine semiquinone, semiquinone ester and/or their analogs at a C5 position.

33. The method of any one of embodiments 1-32, comprising (e.g., consisting essentially of, or consisting of) contacting monomers of one or more dopamine or dopamine analogs, wherein the C5 position is otherwise unsubstituted (bears a hydrogen).

34. The method of any one of embodiments 1-33, comprising polymerized monomers of one or more dopamine or dopamine analogs having substituted quinone, semiquinone and/or esterified semiquinone groups joined by ethyl amine groups (see, e.g., FIG. 2).

The methods of preparing a polydopamine polymer according to embodiments 1-34 can be conducted upon a material, such as a polymeric particle (e.g., a low energy polymer such as PTFE) to form coated materials including core-shell particles. Accordingly, the disclosure includes methods of preparing coated materials including core-shell particles. The disclosure also includes products made by the processes (methods) of embodiments 1-34. Products made by such processes include, but are not limited to, those set forth in embodiments 35-88, which follow.

35. A thermoplastic polydopamine polymer prepared by a process (polymerization reaction) comprising:
  contacting monomers of dopamine (e.g., dopamine salts such as dopamine HCl) and/or dopamine analogs with one or more carboxylic acids in the presence of a redox initiator (such as elemental oxygen) in a basic buffer solution (such as tris-(hydroxymethyl)aminomethane), thereby forming a polymer comprising polymerized quinone, semiquinone, semiquinone ester (bearing an esterified carboxylic acid), quinol, and/or quinol esters (bearing one or more esterified carboxylic acids) of the dopamine or dopamine analogs, and allowing polymerization of the monomers thereby forming the polymer.

36. The polydopamine polymer of embodiment 35, wherein the redox initiator comprises elemental oxygen (e.g., $O_2$).

37. The polydopamine polymer of embodiment 35, wherein the redox initiator comprises a peroxide.

38. The polydopamine polymer of embodiment 37, wherein the redox initiator comprises an organic peroxide.

39. The polydopamine polymer of embodiment 38, wherein the redox initiator comprise an organic peroxide selected from the group consisting of: tert-butyl peroxide (aka tert-butyl hydroperoxide), benzoyl peroxide, acetyl benzoyl peroxide, ascaridole, methyl ethyl ketone peroxide, and methyl isobutyl ketone peroxide.

40. The polydopamine polymer of embodiment 37 or 38, wherein the redox initiator comprises tert-butyl peroxide (aka tert-butyl hydroperoxide) or benzoyl peroxide.

41. The polydopamine polymer of any one of embodiments 35-40, wherein the contacting step further comprises one or more metal salts.

42. The polydopamine polymer of embodiment 41, wherein the metal salts are copper and/or iron salts.

43. The polydopamine polymer of embodiment 42, wherein the metal salts are copper and iron salts in the presence of hydrosulfite anions (e.g., iron hydrosulfite plus copper hydrosulfite) in the presence or absence of persulfate salts.

44. The polydopamine polymer of any one of embodiments 35-43, wherein the reaction is conducted in an aqueous solution.

45. The polydopamine polymer of any one of embodiments 35-44, wherein the basic pH is in a range from about pH 8.0 to about pH 10.5 (e.g., from pH 8.0 to pH 9.0 or from pH 9.0 to pH 10.5).

46. The polydopamine polymer of any one of embodiments 35-45, wherein the basic buffer comprises an organic or inorganic buffer.

47. The polydopamine polymer of any one of embodiments 35-46, wherein the basic buffer comprises an organic buffer.

48. The polydopamine polymer of embodiment 47, wherein the basic buffer comprises an organic buffer that does not comprise an amine (e.g., 2-fluorophenol or 3-fluorophenol).

49. The polydopamine polymer of embodiment 47, wherein the basic buffer comprises an organic amine buffer.

50. The polydopamine polymer of embodiment 49, wherein the organic amine buffer comprises a buffer component selected from the group consisting of: AES (2-aminoethanesulfonic acid, Taurine), AMP (2-amino-2-methyl-1-propanol), AMPD (2-amino-2-methyl-1,3-propanediol, Ammediol), AMPSO (N-(1,1-dimethyl-2-hydroxyethyl)-3-amino-2-hydroxypropanesulfonic acid), CAPS (3-(cyclohexylamino)-propanesulfonic acid), CAPSO (3-(cyclohexylamino)-2-hydroxy-1-propanesulfonic acid), CHES (cyclohexylaminoethanesulfonic acid), DIPSO (3-[N-bis(hydroxyethyl)amino]-2-hydroxypropanesulfonic acid), glycine, TAPS (3-{[tris(hydroxymethyl)-methyl]-amino}-propanesulfonic acid), TEA (triethanolamine), TES (2-[tris(hydroxymethyl)-methylamino]-ethanesulfonic acid), Tris (tris(hydroxymethyl)-aminomethane), Tricine (N-[tris(hydroxymethyl)-methyl]-glycine), Bicine (N,N'-bis(2-hydroxyethyl)-glycine), HEPES (N-(2-hydroxyethyl)-piperazine-N'-ethanesulfonic acid), HEPPS, EPPS (N-(2-hydroxyethyl)-piperazine-N'-3-propanesulfonic acid), HEPPSO (N-(2-hydroxyethyl)-piperazine-N'-2-hydroxypropanesulfonic acid), and POPSO (piperazine-N,N'-bis(2-hydroxypropanesulfonic acid)).

51. The polydopamine polymer of embodiment 50, wherein the organic amine buffer comprises tris(hydroxymethyl)-aminomethane.

52. The polydopamine polymer of embodiment 50, wherein the organic amine buffer comprises tris hydrochloride and/or tris acetate.

53. The polydopamine polymer of any one of embodiments 35-52, wherein the basic buffer comprises a volatile buffer system selected from the group consisting of: trimethylamine/hydrochloric acid; ammonia/formic acid; ammonia/acetic acid; N-ethylmorpholine/acetate; ammonium bicarbonate; ammonium carbonate; trimethylamine/formic acid; trimethylamine/acetic acid, and trimethylamine/carbonate.

54. The polydopamine polymer of any one of embodiments 35-53, wherein the one or more carboxylic acids comprises one or more alkyl carboxylic acids, one or more amino carboxylic acids, one or more ethylenically unsaturated carboxylic acid, or a mixture thereof; wherein any of the one or more carboxylic acids is optionally esterified to a hydroxyl of a quinol or semiquinone monomer incorporated into the polymer.

55. The polydopamine polymer of embodiment 54, wherein the alkyl carboxylic acid comprises one or more lower alkyl carboxylic acids including a mixture comprising one or more of methanoic acid (formic acid), ethanoic acid (acetic acid), fluoroacetic acid, difluoroacetic acid, trifluoroacetic acid, propanoic acid, and butanoic acid.

56. The polydopamine polymer of any one of embodiments 35-55, wherein the polymerization reaction employs one or more carboxylic acids selected from the group consisting of methanoic acid, ethanoic acid, propanoic acid, butanoic acid, 2-methylpropanoic acid, pentanoic acid, hexanoic acid, octanoic acid, decanoic acid, undecanoic acid, tridecanoic acid, tetradecanoic acid, pentadecanoic acid, hexadecanoic acid, heptadecanoic acid, ethanedioic acid, propanedioic acid, butanedioic acid, pentanedioic acid, hexanedioic acid, 2-hydroxyethanoic acid, 2-hydroxypropanoic acid, propenoic acid (acrylic acid), benzenecarboxylic acid, benzene-1,2-dicarboxylic acid, 2-hydroxybenzenecarboxylic acid, 4-methylpentanoic acid, 5,5-dimethyl-3-oxohexanoic acid, 3-amino-5-heptenoic acid, 3-chlorohexanoic acid, and/or 2-aminopentanoic acid.

57. The polydopamine polymer of any one of embodiments 35-56, wherein the polymerization reaction comprises a carboxylic acid of the following formula:
  R1C(O)OH or R1R2CHC(O)OH, wherein R1 and R2 are each selected independently from the group consisting of —H; phenyl; benzyl; —$(CH_2)_n CH_3$ where n is 0-16; and wherein the polydopamine polymer optionally comprises a carboxylic acid of the R1C(O)OH or R1R2CHC(O)OH esterified to a semiquinone or quinol hydroxyl.

58. The polydopamine polymer of embodiment 57, wherein at least one of the esterified carboxylic acid is substituted with one or more functionalities selected from the group consisting of: —F, —Cl, —Br, —OH, carboxy, amino, nitro, methyl, ethyl, and propyl.

59. The polydopamine polymer of embodiment 57, wherein the esterified carboxylic acid is selected from the group consisting of formic acid, acetic acid, fluoroacetic acid, difluoroacetic acid, trifluoroacetic acid, cis-9-octadecatrienoic acid, cyclo-$C_6H_{11}COO$—, $C_6H_5CH_2COO$—, $C_6H_5COO$—, o-$CH_3C_6H_4COO$—, m-$CH_3C_6H_4COO$—, o-$BrC_6H_4COO$—, p-$BrC_6H_4COO$—, p-$CH_3C_6H_4COO$—, o-$ClC_6H_4COO$—, m-$ClC_6H_4COO$—, p-$ClC_6H_4COO$—, m-$BrC_6H_4COO$—, o-$O_2NC_6H_4COO$—, m-$O_2NC_6H_4COO$—, p-$O_2NC_6H_4COO$—, o-$C_6H_4(COO$—$)_2$, m-$C_6H_4(COO$—$)_2$, p-$C_6H_4(COO$—$)_2$, p-$HOC_6H_4COO$—, o-$H_2NC_6H_4COO$—, m-$H_2NC_6H_4COO$—, p-$H_2NC_6H_4COO$—, o-$CH_3OC_6H_4COO$—, m-$CH_3OC_6H_4COO$—, and/or p-$CH_3OC_6H_4COO$—.

60. The polydopamine polymer of embodiment 54, wherein the one or more unsaturated carboxylic acids comprise vinyl carboxylic acids and/or one or more unsaturated amino carboxylic acids; wherein the unsaturated carboxylic acids are optionally incorporated into the polymer as monomers during the polymerization reaction, and/or optionally are esterified to a hydroxyl of a semiquinone or a quinol monomer incorporated into the polymer.

61. The polydopamine polymer of any one of embodiments 54-60, wherein the polymerization reaction further comprises one or more ethylenically unsaturated molecules selected from the group consisting of:

(a) unsaturated carboxylic acids and their esters such as acrylic acid (AA), methacrylic acid (MAA), methyl acrylate (MA), ethyl acrylate (EA), propyl acrylate (PA), butyl acrylate (BA) hexafluorobutyl acrylate (F6BA), 2-ethylhexyl acrylate (2EHA), methyl methacrylate (MMA), ethyl methacrylate, propylmethacrylate, butyl methacrylate (BMA), poly (ethylene glycol [200/400] monomethacrylate, and/or mixtures thereof;

(b) vinyl compounds such as ethylene, propylene, butadiene (BD), substituted butadienes such as alkylbutadiene-isoprene, allyl acrylate, allyl methacrylate (ALMA), vinyl chloride (VCM), vinyl acetate (VAM), styrene (ST), p-methylstyrene (PMS), 4-vinylpyridine (4 VP), 2-vinylpyridine (2 VP), N-vinylpyrrolidone (NVP), styrene sulfonic acid (SSA), and/or mixtures thereof;

(c) unsaturated amides such as acrylamide, methacrylamide, N-methylolacrylamide, and/or mixtures thereof;

(d) unsaturated monomers containing nitrogen or silicon such as dimethylaminoethyl acrylate, trimethylvinylsilane, methacryloxypropyltrimethoxysilane (MATS) and/or mixtures thereof; and (e) copolymerizable surfactant such as perfluoro(4-methyl-3, 6-dioxaoct-7-ene)sulfonic acid.

62. The polydopamine polymer of any one of embodiments 35-61, wherein the polydopamine polymer comprises one or more carboxylic acids esterified at quinol or semiquinone hydroxyl group, and wherein at least one (e.g., at least two) of the one or more carboxylic acids esterified to the polydopamine polymer is selected independently from the group consisting of alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine and valine (of the D and/or L configuration).

63. The polydopamine polymer of any one of embodiments 35-62, wherein the polymerization reaction is conducted at a temperature from about 20° C. to about 80° C. (e.g., from about 20° C. to about 30° C., from about 20° C. to about 40° C., from about 20° C. to about 80° C., from about 30° C. to about 80° C., from about 30° C. to about 60° C., or from about 35° C. to about 55° C.).

64. The polydopamine polymer of any one of embodiments 35-63, wherein the polymerization is conducted at a pressure from about 400 mm of Hg to about 2,200 mm of Hg, (e.g., from about 400 mm of Hg to about 1,500 mm of Hg, from about 600 mm of Hg to about 1,500 mm of Hg, from about 700 mm of Hg to about 800 mm of Hg, or from about 1,500 mm of Hg to about 2,200 mm of Hg).

65. The polydopamine polymer of any one of embodiments 35-64, wherein the polymerization is conducted at about 760 mm of Hg of pressure (e.g., from about 700 to about 800 mm of Hg).

66. The polydopamine polymer of any one of embodiments 35-65, wherein the pendant alkyl amine groups react with a dopaquinone, dopamine semiquinone, semiquinone ester and/or analog at a C5 position.

67. The polydopamine polymer of any one of embodiments 35-66, wherein the process comprises (e.g., consists essentially of, or consists of) contacting monomers of one or more dopamine or dopamine analogs that are otherwise unsubstituted (bears a hydrogen) at the dopamine ring C5 position.

68. The polydopamine polymer of any one of embodiments 35-67, comprising (e.g., consisting essentially of, or consisting of) polymerized monomers of one or more dopamine or dopamine analogs having 4,5-substituted quinone, semiquinone and/or esterified semiquinone groups joined by ethyl amine groups (see, e.g., FIG. 2).

69. A coated substrate comprising a polydopamine polymer prepared by the process of any one of embodiments 35-68, wherein the polymerization reaction is conducted in an aqueous solution in the presence of a substrate comprising one or more materials and/or core polymers comprising a low surface energy material such as polyolefins and/or fluoropolymers (including perfluoropolymers), wherein the substrate is optionally in the form of particles, sheets, or films, and wherein all or part of the polydopamine polymer becomes deposited or grafted onto the substrate forming a coated substrate.

70. The coated substrate of embodiment 69, wherein the substrate comprises one or more polymers selected from the group consisting of: perfluoroalkoxy alkanes; polytetrafluoroethylenes; fluorinated ethylene propylene and its copolymers; perfluoromethylvinylethers; perfluoro elastomers; ethylene tetrafluoroethylenes; polyvinylidene fluorides; fluoroelastomers; vinylidene fluoride-hexafluoropropylene fluoroelastomers; vinylidene fluoride-hexafluoropropylene/tetrafluoro ethylene/hexafluoropropylene fluoroelastomers; and combinations thereof.

71. The coated substrate of embodiment 69, wherein the substrate comprises a polymeric material selected from the group consisting of:
i) butadiene-styrene methyl methacrylate and homopolybutadienes,
ii) polyvinyl chloride and vinyl chloride vinyl acetate copolymers,
iii) acrylic homo and copolymers,
iv) vinylidene chloride copolymers,
v) polyethylene and ethylene copolymers,
vi) polytetrafluoroethylenes,
vii) fluorinated ethylene copolymers,
viii) polyacrylamide and polyacrylamide derivatives,
ix) acrylamide copolymers,
x) polycarbonate polymer and copolymer,
xi) polysulfone polymer and copolymer,
xii) epoxy polymer and copolymer, and
xiii) polyurethane polymer and copolymer;
any or all of which may be in the form of particles.

72. The coated substrate of embodiment 69, wherein the substrate comprises a fluoropolymer selected from the group consisting of: perfluoroalkoxy alkanes (PFA or PFAs when plural); polytetrafluoroethylene (PTFE); fluorinated ethylene propylene (FEP) and its copolymers; expanded-polytetrafluoroethylene (ePTFE or EPTFE); expanded-fluorinated ethylene propylene (eFEP or EFEP); perfluoromethylvinylether (PMVE); perfluoro elastomers (e.g., FFKM, which are copolymers of tetrafluoroethylene and a perfluorinated ether such as PMVE sold under the tradename TECNOFLON® or TECNOFLON® PFR and branded as KALREZ®, CHEMRAZ® and PERLAST®); ethylene tetrafluoroethylene (ETFE); polyvinylidene fluoride (PVDF); fluoroelastomers (FKM and FEPM, sold under the tradenames VITON®, TECNOFLON®); vinylidene fluoride-hexafluoropropylene fluoroelastomer (VF2/HFP); vinylidene fluoride-hexafluoropropylene/tetrafluoro ethylene/hexafluoropropylene fluoroelastomer (VF2/tetrafluoro ethylene/HFP) terpolymer; and any combinations thereof, any or all of which may be in the form of particles.

73. The coated substrate of any one of embodiments 69-72, wherein the substrate comprises a non-fluorinated or fluorinated thermoset plastic or non-fluorinated or fluorinated thermoplastic such as vinylidene fluoride polymer or copolymer, vinyl chloride copolymer, or polytetrafluoroethylene (PTFE).

74. The coated substrate of any one of embodiments 69-73 in the form of a core-shell particle, wherein the substrate comprises a core polymer in the form of a particle, and the polydopamine polymer is deposited upon, binds to, or is grafted (covalently bound) onto the core polymer substrate as a coating, thereby forming a core-shell polymeric particle. (For example, from 0 to 10, from 10 to 30, from 30 to 60, from 60 to 80 or from 80 to 100 percent of the shell polymer may be grafted onto the core particle.)

75. The core-shell polymeric particle of embodiment 74, wherein the core is a polymeric particle comprised of a polytetrafluoroethylene (PTFE) polymer.

76. The core-shell polymeric particle of embodiment 74 or 75, wherein the shell comprises a polydopamine polymer (e.g., a polydopamine acetate) with a melting point of about 104° C. (e.g., from about 95° C. to about 115° C.) and the core comprises a polymer substrate (such as a PTFE core) with a melting point of about 342° C. (e.g., from about 335° C. to about 350° C.).

77. The core-shell polymeric particle of any one of embodiments 74-76, wherein the melting point of the core-shell polymeric particle is from about 335° C. to about 350° C. (e.g., from about 340° C. to about 344° C.).

78. The core-shell polymeric particles of any one of embodiments 75 or 77, wherein the storage modulus of a composition comprising the core-shell polymeric particles (such as a particle having a shell of esterified polydopamine polymer and a PTFE core), as determined by Dynamic Mechanical Analysis (DMA), is significantly enhanced:
   (a) relative to the polydopamine polymer shell by grafting of the polydopamine polymer onto the PTFE core (e.g., by 5 to 10 fold, 10 to 50 fold, 50 to 100 fold, or greater than about 100 fold, such as up to about 300 fold) over a temperature range from about 25° C. to about 100° C. or from about 100° C. to about 220° C.; and/or
   (b) relative to the core fluoropolymer (e.g., PTFE) by grafting of the polydopamine polymer onto the PTFE core (e.g., by 5 to 10-fold, 10 to 20-fold, or greater than about 20 fold) over a temperature range from about 25° C. to about 100° C. or from about 100° C. to about 220° C. (see, e.g., FIG. 4.)

79. A hot-melt pressure sensitive adhesive comprising a polydopamine polymer prepared by the method of any one of embodiments 1-68, a coated substrate according to any one of embodiments 69-73, or a core-shell polymeric particle according to any one of embodiments 74-78.

80. The hot-melt pressure sensitive adhesive of embodiment 79, comprising:
   (i) a polydopamine polymer layer applied to a substrate (e.g., a fluoropolymer or polyolefin substrate coated on one or both sides with the polydopamine polymer); or
   (ii) a core-shell polymeric particle having a shell of a polydopamine polymer and a fluoropolymer or olefin substrate (e.g., a core-shell particle with a PTFE or polyolefin core and an esterified polydopamine polymer shell).

81. The hot-melt pressure sensitive adhesive of embodiment 79, wherein the hot-melt pressure sensitive adhesive is capable of binding to polymers (e.g., organic polymers including perfluoropolymers, fluoropolymers and polyolefins), ceramics, glasses, metals, metal alloys, and composite materials.

82. The hot-melt pressure sensitive adhesive of any one of embodiments 79-81, comprising core-shell particles, wherein the shells are comprised of a polydopamine acetate polymer.

83. The hot-melt pressure sensitive adhesive of embodiment 82, wherein the polymeric particles of the hot-melt pressure sensitive adhesive can be applied and adhered to a surface of a substrate (such as a sheet, wire, tube, tribological material support), thereby forming an adhesive layer on all or part of the substrate surface or interface.

84. The hot-melt pressure sensitive adhesive of any one of embodiments 79 to 83 comprising core-shell particles, wherein the adhesive strength as determined by ASTM D6862-11 ranges from about 20 to about 89 Newtons (N) (e.g., from about 21 N to about 55 N, from about 55 N to about 90 N, or from about 21.5 N to about 78.7 N).

85. The hot-melt pressure sensitive adhesive of any one of embodiments 79-84, wherein the oligomers and/or the polydopamine polymers are linked to the substrate (e.g., a PTFE core) by covalent bonding.

86. The hot-melt pressure sensitive adhesive of any one of embodiments 79-85, wherein the polymeric particles of the hot-melt pressure sensitive adhesive can function to join the surfaces of substrates (articles) at temperatures ranging from ambient (about 200° C.) to about 360° C. (e.g., from 200° C. to 300° C., from 230° C. to 330° C., or from 300° C. to 350° C.) and/or pressures ranging from sub-atmospheric (e.g., 0.1 Pa (or less)) to 22 MPa (e.g., less than 0.1 Pa, 0.1 Pa to 100 Pa, 100 Pa to 100,000 Pa, 0.1 MPa to 1 MPa, or 1 MPa to 22 MPa).

87. A hot-melt pressure sensitive adhesive composition, comprising a hot-melt adhesive of any one of embodiments 79-86 that contains core-shell polymeric particles (e.g., particles with a polydopamine polymer shell and a fluoropolymer particle core) suspended (e.g., as a colloidal suspension) in an aqueous media optionally comprising an organic solvent miscible with water, said organic solvents including, but not limited to, an alcohol (e.g., methanol, ethanol, propanol, ethylene glycol, 2-ethoxyethanol etc.) or a ketone (e.g., acetone, methyl ethyl ketone, methyl propyl ketone, etc.).

88. The hot-melt pressure sensitive adhesive composition of embodiment 87, wherein the composition forms a uniform coating on a PTFE sheet at 20° C., when the PTFE sheet is oriented horizontally. (The uniform coating may be described as a film that is devoid of visible surface imperfections such as pin holes and/or a coating that exhibits no evidence of surface dewetting. In an embodiment, the uniform coating on the sheet has no holes exposing more than 0.1 mm square (e.g., no more than 0.05 mm square) of the sheet that are uncoated by the adhesive composition (see, e.g., FIG. 10).)

89. The polydopamine polymer, pressure sensitive adhesive, coated substrate, or core-shell polymeric particle, or hot-melt pressure sensitive adhesive of any one of embodiments 35-88, wherein the polydopamine polymer and/or the core-shell particles are soluble in dimethyl sulfoxide (DMSO).

90. A thermoplastic polydopamine polymer comprising polymerized quinones, semiquinones, semiquinone esters, quinols, and/or quinol esters of the dopamine and/or dopamine analogs.

91. The polydopamine polymer of embodiment 90, wherein the quinol esters or semiquinone esters comprise one or more esterified carboxylic acids selected from the group consisting of: one or more alkyl carboxylic acids, one or more amino carboxylic acids, one or more ethylenically unsaturated carboxylic acids, or a mixture of any thereof.

92. The polydopamine polymer of embodiment 91, wherein the one or more alkyl carboxylic acids comprises one or more lower alkyl carboxylic acids including a mixture comprising one or more of methanoic acid (formic acid), ethanoic acid (acetic acid), fluoroacetic acid, difluoroacetic acid, trifluoroacetic acid, propanoic acid, and butanoic acid.

93. The polydopamine polymer of any one of embodiments 90-91, wherein the one or more carboxylic acids are selected from the group consisting of methanoic acid, ethanoic acid, propanoic acid, butanoic acid, 2-methylpropanoic acid, pentanoic acid, hexanoic acid, octanoic acid, decanoic acid, undecanoic acid, tridecanoic acid, tetradecanoic acid, pentadecanoic acid, hexadecanoic acid, heptadecanoic acid, ethanedioic acid, propanedioic acid, butanedioic acid, pentanedioic acid, hexanedioic acid, 2-hydroxyethanoic acid, 2-hydroxypropanoic acid, propenoic acid (acrylic acid), benzenecarboxylic acid, benzene-1,2-dicarboxylic acid, 2-hydroxybenzenecarboxylic acid, 4-methylpentanoic acid, 5,5-dimethyl-3-oxohexanoic acid, 3-amino-5-heptenoic acid, 3-chlorohexanoic acid, and/or 2-aminopentanoic acid.

94. The polydopamine polymer of any one of embodiments 90-91, wherein the one or more carboxylic acids comprise a carboxylic acid of the following formula:
R1C(O)OH or the formula R1R2CHC(O)OH, wherein R1 and R2 are each selected independently from the group consisting of —H; phenyl; benzyl; —(CH$_2$)$_n$CH$_3$ where n is 0-16; and wherein the polydopamine polymer optionally comprises a carboxylic acid of the formula R1C(O)OH or R1R2CHC(O)OH esterified to a semiquinone or quinol hydroxyl.

95. The polydopamine polymer of embodiment 94, wherein at least one of the carboxylic acids is substituted with one or more functionalities selected from the group consisting of: —F, —Cl, —Br, —OH, carboxy, amino, nitro, methyl, ethyl, and propyl.

96. The polydopamine polymer of embodiment 94, wherein the esterified carboxylic acid is selected from the group consisting of formic acid, acetic acid, fluoroacetic acid, difluoroacetic acid, trifluoroacetic acid, cis-9-octadecatrienoic acid, cyclo-C$_6$H$_{11}$COO—, C$_6$H$_5$CH$_2$COO—, C$_6$H$_5$COO—, o-CH$_3$C$_6$H$_4$COO—, m-CH$_3$C$_6$H$_4$COO—, o-BrC$_6$H$_4$COO—, p-BrC$_6$H$_4$COO—, p-CH$_3$C$_6$H$_4$COO—, o-ClC$_6$H$_4$COO—, m-ClC$_6$H$_4$COO—, p-ClC$_6$H$_4$COO—, m-BrC$_6$H$_4$COO—, o-O$_2$NC$_6$H$_4$COO—, m-O$_2$NC$_6$H$_4$COO—, p-O$_2$NC$_6$H$_4$COO—, o-C$_6$H$_4$(COO—)$_2$, m-C$_6$H$_4$(COO—)$_2$, p-C$_6$H$_4$(COO—)$_2$, p-HOC$_6$H$_4$COO—, o-H$_2$NC$_6$H$_4$COO—, m-H$_2$NC$_6$H$_4$COO—, p-H$_2$NC$_6$H$_4$COO—, o-CH$_3$OC$_6$H$_4$COO—, m-CH$_3$OC$_6$H$_4$COO—, and/or p-CH$_3$OC$_6$H$_4$COO—.

97. The polydopamine polymer of embodiment 91, wherein the one or more ethylenically unsaturated carboxylic acids comprise vinyl carboxylic acids and/or one or more unsaturated amino carboxylic acids; wherein the unsaturated carboxylic acids are optionally incorporated into the polymer as monomers during the polymerization reaction, and/or optionally are esterified to hydroxyls of semiquinones or quinol monomers incorporated into the polymer.

98. The polydopamine polymer of any one of embodiments 91-97, wherein the polymerization reaction further comprises one or more ethylenically unsaturated molecules selected from the group consisting of:

(a) unsaturated carboxylic acids and their esters such as acrylic acid (AA), methacrylic acid (MAA), methyl acrylate (MA), ethyl acrylate (EA), propyl acrylate (PA), butyl acrylate (BA) hexafluorobutyl acrylate (F6BA), 2-ethylhexyl acrylate (2EHA), methyl methacrylate (MMA), ethyl methacrylate, propylmethacrylate, (BMA), poly (ethylene glycol[200/400] monomethacrylate, and/or mixtures thereof;

(b) vinyl compounds such as ethylene, propylene, butadiene (BD), substituted butadienes such as alkylbutadiene-isoprene, allyl acrylate, allyl methacrylate (ALMA), vinyl chloride (VCM), vinyl acetate (VAM), styrene (ST), p-methylstyrene (PMS), 4-vinylpyridine (4 VP), 2-vinylpyridine (2 VP), N-vinylpyrrolidone (NVP), styrene sulfonic acid (SSA), and/or mixtures thereof;

(c) unsaturated amides such as acrylamide, methacrylamide, N-methylolacrylamide, and/or mixtures thereof;

(d) unsaturated monomers containing nitrogen or silicon such as dimethylaminoethyl acrylate, trimethylvinylsilane, methacryloxypropyltrimethoxysilane (MATS) and/or mixtures thereof; and (e) copolymerizable surfactants such as perfluoro(4-methyl-3, 6-dioxaoct-7-ene)sulfonic acid.

99. The polydopamine polymer of any one of embodiments 90-98, wherein the polydopamine polymer comprises one or more carboxylic acids esterified to quinol or semiquinone hydroxyl groups, and wherein at least one (e.g., at least two) of the one or more carboxylic acids esterified to the polydopamine polymer is selected independently from the group consisting of alanine, arginine, asparagine, aspartic acid, cysteine, glutamine, glutamic acid, glycine, histidine, isoleucine, leucine, lysine, methionine, phenylalanine, proline, serine, threonine, tryptophan, tyrosine and valine (of the D and/or L configuration).

100. The polydopamine polymer of any one of embodiments 90-99, wherein the C4-O5 bond of at least one (e.g., at least two) dopamine or dopamine analog or their oxidation products and/or esters thereof forms part of the polydopamine polymer backbone.

101. The polydopamine polymer of embodiment 100, comprising (e.g., consisting essentially of, or consisting of) polymerized monomers of one or more dopamine or dopamine analogs having quinone, semiquinone and/or esterified semiquinone groups joined by ethyl amine groups (see, e.g., FIG. 2).

102. A coated substrate comprising the polydopamine polymer of any one of embodiments 90-101, wherein the polydopamine polymer is deposited upon, binds to, or becomes grafted on all or part of a substrate, wherein the substrate comprises one or more materials and/or core polymers that comprise a low surface energy material such as polyolefins and/or fluoropolymers (including perfluoropolymers); and wherein the substrate is optionally in the form of particles.

103. The coated substrate of embodiment 102, wherein the substrate comprises one or more polymers selected from the group consisting of: perfluoroalkoxy alkanes; polytetrafluoroethylenes; fluorinated ethylene propylene and its copolymers; perfluoromethylvinylethers; perfluoro elastomers; ethylene tetrafluoroethylenes; polyvinylidene fluorides; fluoroelastomers; vinylidene fluoride-hexafluoropropylene fluoroelastomers; vinylidene fluoride-hexafluoropropylene/tetrafluoro ethylene/hexafluoropropylene fluoroelastomers; and combinations thereof.

104. The coated substrate of embodiment 102, wherein the substrate comprises a polymeric material selected from the group consisting of:
   i) butadiene-styrene methyl methacrylate and homopolybutadienes,
   ii) polyvinyl chloride and vinyl chloride vinyl acetate copolymers,
   iii) acrylic homo and copolymers,
   iv) vinylidene chloride copolymers,
   v) polyethylene and ethylene copolymers,
   vi) polytetrafluoroethylenes,
   vii) fluorinated ethylene copolymers,
   viii) polyacrylamide and polyacrylamide derivatives,
   ix) acrylamide copolymers,
   x) polycarbonate polymer and copolymer,
   xi) polysulfone polymer and copolymer,
   xii) epoxy polymer and copolymer, and
   xiii) polyurethane polymer and copolymer;
   any or all of which may be in the form of particles.

105. The coated substrate of embodiment 102, wherein the substrate comprises a fluoropolymer selected from the group consisting of: perfluoroalkoxy alkanes (PFA or PFAs when plural); polytetrafluoroethylene (PTFE); fluorinated ethylene propylene (FEP) and its copolymers; expanded-polytetrafluoroethylene (ePTFE or EPTFE); expanded-fluorinated ethylene propylene (eFEP or EFEP); perfluoromethylvinylether (PMVE); perfluoro elastomers (e.g., FFKM, which are copolymers of tetrafluoroethylene and a perfluorinated ether such as PMVE sold under the tradename TECNOFLON® or TECNOFLON® PFR and branded as KALREZ®, CHEMRAZ® and PERLAST®); ethylene tetrafluoroethylene (ETFE); polyvinylidene fluoride (PVDF); fluoroelastomers (FKM and FEPM, sold under the tradenames VITON®, TECNOFLON®); vinylidene fluoride-hexafluoropropylene fluoroelastomer (VF2/HFP); vinylidene fluoride-hexafluoropropylene/tetrafluoro ethylene/hexafluoropropylene fluoroelastomer (VF2/tetrafluoro ethylene/HFP) terpolymer; and any combinations thereof, any or all of which may be in the form of particles.

106. The coated substrate of any one of embodiments 102-105, wherein the substrate comprises non-fluorinated or fluorinated thermoset plastics or non-fluorinated or fluorinated thermoplastics such as vinylidene fluoride polymers or copolymers, vinyl chloride copolymers, or polytetrafluoroethylene (PTFE).

107. The coated substrate of any one of embodiments 102-106, wherein the substrate comprises a core polymer in the form of a particle, and the polydopamine polymer is deposited upon, binds to, or is grafted (covalently bound) onto the core polymer of the substrate, thereby forming a core-shell polymeric particle; and wherein the coated substrate (core-shell particles) is optionally dried (e.g., spray dried, lyophilized etc.).

108. The core-shell polymeric particle of embodiment 107, wherein the core is a polymeric particle comprised of a polytetrafluoroethylene (PTFE) polymer.

109. The core-shell polymeric particle of embodiment 107 or 108, wherein the shell comprises a polydopamine polymer (e.g., a polydopamine acetate) with a melting point of about 104° C. (e.g., from about 95° C. to about 115° C.) and the core comprises a polymer substrate (such as a PTFE core) with a melting point of about 348° C. (e.g., from about 340° C. to about 360° C.).

110. The core-shell polymeric particle of any one of embodiments 107-109, wherein the melting point of the core-shell polymeric particle is from about 340° C. to about 360° C. (e.g., from about 348° C. to about 350° C.).

111. The core-shell polymeric particle of any one of embodiments 108 or 110, wherein the storage modulus of a composition comprising the core-shell polymeric particles (such as a particle having a shell of esterified polydopamine polymer and a PTFE core), as determined by Dynamic Mechanical Analysis (DMA), is significantly enhanced:
   (a) relative to the shell polydopamine polymer by grafting of the polydopamine polymer onto the PTFE core (e.g., by 5 to 10-fold, 10 to 50-fold, 50 to 100-fold, or greater than about 100-fold, such as up to about 300-fold) over a temperature range from about 25° C. to about 100° C. or from about 100° C. to about 220° C.; and/or
   (b) relative to the core fluoropolymer (e.g., PTFE) by grafting of the polydopamine polymer onto the PTFE core (e.g., by 5 to 10-fold, 10 to 20-fold, or greater than about 20-fold) over a temperature range from about 25° C. to about 100° C. or from about 100° C. to about 220° C. (see, e.g., FIG. 4).

112. A hot-melt pressure sensitive adhesive comprising a polydopamine polymer of any one of embodiments 90-101, a coated substrate according to any one of embodiments 102-106, or a core-shell polymeric particle according to any one of embodiments 107-112.

113. A hot-melt pressure sensitive adhesive article comprising:
   (i) a hot-melt pressure sensitive adhesive of embodiment 112 comprising a polydopamine polymer layer applied to a substrate (e.g., a fluoropolymer or polyolefin substrate coated on one or more surfaces with the polydopamine polymer such as a two-sided adhesive tape or sheet); or
   (ii) a hot-melt pressure sensitive adhesive of embodiment 112 comprising a core-shell polymeric particle having a shell of a polydopamine polymer and a fluoropolymer or olefin substrate (e.g., a core-shell particle with a PTFE or polyolefin core and an esterified polydopamine polymer shell).

114. The hot-melt pressure sensitive adhesive of embodiment 112, wherein the hot-melt pressure sensitive adhesive is capable of binding to polymers (e.g., organic polymers including perfluoropolymers, fluoropolymers and polyolefins), ceramics, glasses, metals, metal alloys, and composite materials.

115. The hot-melt pressure sensitive adhesive of any one of embodiments 112-114, comprising a core-shell particle, wherein the shell is comprised of a polydopamine acetate polymer.

116. The hot-melt pressure sensitive adhesive of any one of embodiments 112-115, comprising a core-shell particle, wherein the adhesive strength as determined by ASTM D6862-11, ranges from about 20 to about 89 Newtons (N) (e.g., from about 21 N to about 55 N, from about 55 N to about 90 N, or from about 21.5 N to about 78.7 N).

117. The hot-melt pressure sensitive adhesive of any one of embodiments 112-116, wherein the oligomers and/or the polydopamine polymers are linked to the substrate (e.g., a PTFE core) by covalent bonding.

118. A hot-melt pressure sensitive adhesive composition comprising a hot-melt adhesive of any one of embodiments 112-117 that contains core-shell polymeric particles (e.g., particles with a polydopamine polymer shell and a fluoropolymer particle core) suspended (e.g., as a colloidal suspension) in an aqueous media optionally comprising an organic solvent miscible with water, said organic solvent including, but not limited to, an alcohol (e.g., methanol, ethanol, propanol, ethylene glycol, 2-ethoxyethanol etc.) or a ketone (e.g., acetone, methyl ethyl ketone, methyl propyl ketone, etc.).

119. The hot-melt pressure sensitive adhesive composition of embodiment 118, wherein the composition forms a uniform coating on a PTFE sheet at 20° C., wherein the PTFE sheet is oriented horizontally and no area of the sheet more than 0.1 mm square (preferably 0.05 mm square) is exposed (uncoated with adhesive composition; see, e.g., FIG. 10). (A uniform coating may be described e.g., as a film that is devoid of visible surface imperfections such as pin holes and/or exhibits no evidence of surface dewetting.)

120. The polydopamine polymer, pressure sensitive adhesive, coated substrate, or core-shell polymeric particle, or hot-melt pressure sensitive adhesive of any one of embodiments 90-119, wherein the polydopamine polymer and/or the core-shell particles are soluble in dimethyl sulfoxide (DMSO).

121. A method of forming an adhesive layer or an adhesive article comprising: applying a hot-melt pressure sensitive adhesive of any one of embodiments 79-88 or embodiments 112-120 to all or part of a surface of a substrate (such as a sheet, wire, tube, tribological material support), thereby forming an adhesive layer or an adhesive article comprising the adhesive layer and substrate.

122. A method of adhering (affixing) a surface of a first substrate (article) to a surface of a second substrate (article), the method comprising: applying a hot-melt pressure sensitive adhesive of any one of embodiments 79-88 or embodiments 112-120 to all or part of the surface of the first and/or second substrates thereby forming an adhesive layer; contacting the first and second substrates together at a point where the adhesive layer was applied; and optionally heating one or both of the first and/or second substrates.

123. The method of embodiment 122, wherein the hot-melt pressure sensitive adhesive functions (to keep the surfaces of the first and second substrates joined/affixed to each other) under severe thermal and/or mechanically abrasive environments at temperatures ranging from ambient (about 20° C.) to about 360° C. (e.g., from 200° C. to 300° C., from 230° C. to 330° C., or from 300° C. to 350° C.) and/or pressures ranging from sub-atmospheric (e.g., 0.1 Pa (or less)) to 22 MPa (e.g., less than 0.1 Pa, 0.1 Pa to 100 Pa, 100 Pa to 100,000 Pa, 0.1 MPa to 1 MPa, or 1 MPa to 22 MPa).

124. The method of any one of embodiments 121-123, wherein at least one substrate or article is comprised of a low surface energy polymer (e.g., PTFE, FEP, or a polyolefin).

125. The method of any one of embodiments 121-124, wherein the hot-melt adhesive comprises polydopamine acetate.

126. The method of any one of embodiments 121-124, wherein the hot-melt adhesive comprises a polydopamine acetate graft PTFE hetero-polymer (e.g., in the form of PTFE core particles with a polydopamine acetate grafted shell).

127. A thermoplastic polydopamine polymer, synthesized by a polymerization method comprising the steps of:
i. contacting one or more dopamine and/or dopamine analog monomers (dopamine salts, e.g., dopamine HCl), with one or more carboxylic acids in the presence of a redox initiator (such as elemental oxygen) in a basic buffer solution, thereby forming quinones, semiquinones, and/or semiquinone esters of the monomers; and
ii. allowing all or part of the quinone, semiquinone, and/or semiquinone ester monomers to undergo polymerization, thereby forming the polydopamine polymer;
wherein the polydopamine polymer is optionally formed on a surface of a core particle.

128. A thermoplastic polydopamine polymer, synthesized by a polymerization method comprising the steps of:
i. contacting one or more dopamine and/or dopamine analog monomers (dopamine salts, e.g., dopamine HCl), with one or more carboxylic acids in the presence of an iron sulphate plus copper sulphate solution and tert-butyl hydroperoxide (at ambient conditions, 20° C.-30° C. and 760 mm of Hg) in a basic buffer solution (such as tris-(hydroxymethyl)aminomethane), thereby forming quinones, semiquinones, and/or semiquinone esters of the monomers; and
ii. allowing all or part of the quinone, semiquinone, and/or semiquinone ester monomers to undergo polymerization, thereby forming the polydopamine polymer;
wherein the polydopamine polymer is optionally formed on a surface of a core particle.

129. A thermoplastic polydopamine polymer, synthesized by a polymerization method comprising the steps of:
i. contacting one or more dopamine and/or dopamine analog monomers (dopamine salts, e.g., dopamine HCl), with one or more carboxylic acids in the presence of a mixed metal system of Cu, Fe, hydrosulfite, and persulfate in a basic buffer solution (such as tris-(hydroxymethyl)aminomethane), thereby forming quinones, semiquinones, and/or semiquinone esters of the monomers; and
ii. allowing all or part of the quinone, semiquinone, and/or semiquinone ester monomers to undergo polymerization, thereby forming the polydopamine polymer;
wherein the polydopamine polymer is optionally formed on a surface of a core particle.

130. A thermoplastic polydopamine polymer, synthesized by a polymerization method comprising the steps of:
i. contacting one or more dopamine and/or dopamine analog monomers (dopamine salts, e.g., dopamine HCl), with one or more carboxylic acids in the presence of a redox catalyst mixture of Cu, Fe, and hydrosulfite without persulfate in a basic buffer solution (such as tris-(hydroxymethyl)aminomethane), thereby forming quinones, semiquinones, and/or semiquinone esters of the monomers; and
ii. allowing all or part of the quinone, semiquinone, and/or semiquinone ester monomers to undergo polymerization, thereby forming the polydopamine polymer;
wherein the polydopamine polymer is optionally formed on a surface of a core particle.

131. The thermoplastic polydopamine polymer of any one of embodiments 127-130, wherein the polymerization comprises a nucleophilic attack by a pendant alkyl amine group of a monomer on a quinone, semiquinone or semiquinone ester, thereby forming an amine linkage.

132. The thermoplastic polydopamine polymer of any one of embodiments 127-131, wherein one or more quinol, quinol ester, semiquinones, or semiquinone ester groups present in monomers that have undergone polymerization are further oxidized to semiquinones, semiquinone esters, or quinones.

133. A core-shell particle comprising a polydopamine polymer shell polymerized on the surface of a core particle by the polymerization method of any one of embodiments 127-132, wherein the polymerization is carried out in an aqueous fluid medium optionally in the presence of β-cyclodextrin.

134. A method of preparing a thermoplastic polydopamine polymer comprising:
contacting monomers of dopamine and/or dopamine analogs with one or more carboxylic acids in the presence of a redox initiator in a basic buffer solution, permitting the monomers to undergo a polymerization reaction thereby forming a polydopamine polymer comprising polymerized quinone, semiquinone, semiquinone ester (bearing an esterified carboxylic acid), quinol, and/or quinol esters (bearing one or more esterified carboxylic acids) of the dopamine and/or dopamine analogs.

135. The method of embodiment 134, wherein the redox initiator comprises elemental oxygen.

136. The method of embodiment 134, wherein the redox initiator comprises a peroxide and one or more metal salts.

137. The method of any one of embodiments 134-136, wherein the reaction is conducted in aqueous solution in a pH range from about pH 8.0 to about pH 10.5 and the basic buffer comprises an organic amine buffer.

138. The method of embodiment 137, wherein the organic amine buffer comprises Tris hydrochloride and/or Tris acetate.

139. The method of any one of embodiments 134-138, wherein the polymerization reaction further comprises one or more ethylenically unsaturated molecules selected from:
(a) unsaturated carboxylic acids and their esters;
(b) vinyl compounds;
(c) unsaturated amides;
(d) unsaturated monomers containing nitrogen or silicon; and/or
(e) copolymerizable surfactants.

140. The method of any one of embodiments 134-139, wherein the polymerization reaction is conducted at a temperature from about 20° C. to about 80° C. at a pressure from about 400 mm of Hg to about 2,200 mm of Hg.

141. The method of any one of embodiments 134-140, wherein the polymerization reaction is conducted in an aqueous solution in the presence of a substrate comprising one or more materials and/or core polymers comprising a low surface energy material, wherein the substrate is optionally in the form of particles upon which the polydopamine polymer forms a shell, and wherein all or part of the polydopamine polymer becomes deposited upon, binds to, or becomes grafted onto the substrate forming a coated substrate.

142. The method of embodiment 141, wherein the substrate comprises one or more polymers selected from the group consisting of: perfluoroalkoxy alkanes; polytetrafluoroethylenes; fluorinated ethylene propylene and its copolymers; perfluoromethylvinylethers; perfluoro elastomers; ethylene tetrafluoroethylenes; polyvinylidene fluorides; fluoroelastomers; vinylidene fluoride-hexafluoropropylene fluoroelastomers; vinylidene fluoride-hexafluoropropylene/tetrafluoro ethylene/hexafluoropropylene fluoroelastomers; and combinations thereof.

143. The method of embodiment 141, wherein the substrate comprises a polymeric material selected from the group consisting of:
i) butadiene-styrene methyl methacrylate and homopolybutadienes,
ii) polyvinyl chloride and vinyl chloride vinyl acetate copolymers,
iii) acrylic homo and copolymers,
iv) vinylidene chloride copolymers,
v) polyethylene and ethylene copolymers,
vi) polytetrafluoroethylenes,
vii) fluorinated ethylene copolymers,
viii) polyacrylamide and polyacrylamide derivatives,
ix) acrylamide copolymers,
x) polycarbonate polymer and copolymer,
xi) polysulfone polymer and copolymer,
xii) epoxy polymer and copolymer, and
xiii) polyurethane polymer and copolymer;
any or all of which may be in the form of particles.

144. The method of embodiment 141, wherein the substrate comprises a fluoropolymer selected from the group consisting of: perfluoroalkoxy alkanes (PFA or PFAs when plural); polytetrafluoroethylene (PTFE); fluorinated ethylene propylene (FEP) and its copolymers; expanded-polytetrafluoroethylene (ePTFE or EPTFE); expanded-fluorinated ethylene propylene (eFEP or EFEP); perfluoromethylvinylether (PMVE); perfluoro elastomers; ethylene tetrafluoroethylene (ETFE); polyvinylidene fluoride (PVDF); fluoroelastomers; vinylidene fluoride-hexafluoropropylene fluoroelastomer (VF2/HFP); vinylidene fluoride-hexafluoropropylene/tetrafluoro ethylene/hexafluoropropylene fluoroelastomer (VF2/tetrafluoro ethylene/HFP) terpolymer; and combinations thereof, any or all of which may be in the form of particles.

145. The method of any one of embodiments 141-144, wherein the substrate comprises non-fluorinated or fluorinated thermoset plastics or non-fluorinated or fluorinated thermoplastics.

146. The method of any one of embodiments 141-145, wherein the substrate comprises a core polymer in the form of a particle, and the polydopamine polymer that is deposited upon, binds to, or is grafted (covalently bound) onto the core polymer of the substrate forms a coating, thereby forming a core-shell polymeric particle.

147. The method of embodiment 146, wherein the core is a polymeric particle comprised of a polytetrafluoroethylene (PTFE) polymer.

148. The method of embodiment 146 or 147, wherein the shell comprises a polydopamine acetate polymer with a melting point from about 95° C. to about 115° C. and the core comprises a PTFE polymer with a melting point from about 335° C. to about 360° C.; and wherein the melting point of the core-shell polymeric particle is from about 335° C. to about 360° C.

149. The method of embodiment 147 or 148, wherein a composition comprising the core-shell polymeric particles has a storage modulus as determined by Dynamic Mechanical Analysis (DMA), that is enhanced:
(a) relative to the shell polydopamine polymer by grafting of the polydopamine polymer onto the PTFE polymer of the core by at least 5-fold over a temperature range from about 25° C. to about 100° C. or from about 100° C. to about 220° C.; and/or
(b) relative to the core fluoropolymer by grafting of the polydopamine polymer onto the PTFE core by at least 5-fold over a temperature range from about 25° C. to about 100° C. or from about 100° C. to about 220° C.

150. A thermoplastic polydopamine polymer, coated substrate, or core-shell polymer of any one of embodiments 134-149.

151. A hot-melt pressure sensitive adhesive comprising a substrate having a coating of thermoplastic polydopamine polymer, or a core-shell polymeric particle having a shell of thermoplastic polydopamine of embodiment 150.

152. The hot-melt pressure sensitive adhesive of embodiment 151, wherein the hot-melt pressure sensitive adhesive is capable of binding to polymers, ceramics, glasses, metals, metal alloys, and composite materials.

153. The hot-melt pressure sensitive adhesive of embodiment 151 or 152, comprising a core-shell particle, wherein the shell is comprised of a polydopamine acetate polymer.

154. The hot-melt pressure sensitive adhesive of any one of embodiments 151 to 153, comprising a core-shell particle having an adhesive strength as determined by ASTM D6862-11 that ranges from about 20 to about 89 Newtons (N).

155. A hot-melt pressure sensitive adhesive composition, comprising a hot-melt adhesive of any one of embodiments 151-154 that comprises the core-shell polymeric particles suspended in an aqueous media optionally comprising an organic solvent miscible with water.

156. The hot-melt pressure sensitive adhesive composition of embodiment 155, wherein the composition forms a uniform coating on a PTFE sheet at 20° C. when the PTFE sheet is oriented horizontally and no holes in the coating expose an area of the sheet more than 0.1 mm square of the PTFE sheet.

157. A method of adhering a surface of a first substrate to a surface of a second substrate, the method comprising: applying a hot-melt pressure sensitive adhesive of any one of embodiments 151-156 to all or part of the surface of the first and/or second substrate thereby forming an adhesive layer, contacting the first and second substrates together at a point where the adhesive layer was applied; and optionally heating one or both of the first and/or second substrates.

158. The method of embodiment 157, wherein the hot-melt pressure sensitive adhesive functions to keep the surfaces of the first and second substrates joined/affixed to each other under severe thermal and mechanically abrasive environments at temperatures ranging from about 200° C. to about 360° C. and/or pressures ranging from sub-atmospheric to 22 MPa.

159. A thermoplastic polydopamine polymer synthesized by a polymerization method comprising the steps of:
 i. contacting one or more dopamine and/or dopamine analog monomers with one or more carboxylic acids in the presence of a redox initiator in a basic buffer solution, thereby forming quinone, semiquinone, and/or semiquinone esters of the monomers; and
 ii. allowing all or part of the quinone, semiquinone, and/or semiquinone ester monomers to undergo polymerization thereby forming the polydopamine polymer;
 wherein the polydopamine polymer is optionally formed on a surface of a core particle.

160. A thermoplastic polydopamine polymer, synthesized by a polymerization method comprising the steps of:
 i. contacting one or more dopamine and/or dopamine analog monomers with one or more carboxylic acids in the presence of an iron sulphate plus copper sulphate solution and tert-butyl hydroperoxide (at ambient conditions, about 20° C. to about 30° C. and 760 mm of Hg) in a basic buffer solution, thereby forming quinone, semiquinone, and/or semiquinone esters of the monomers; and
 ii. allowing all or part of the quinone, semiquinone, and/or semiquinone ester monomers to undergo polymerization thereby forming the polydopamine polymer;
 wherein the polydopamine polymer is optionally formed on a surface of a core particle.

161. A thermoplastic polydopamine polymer synthesized by a polymerization method comprising the steps of:
 i. contacting one or more dopamine and/or dopamine analog monomers with one or more carboxylic acids in the presence of a mixed metal system of Cu, Fe, hydrosulfite, and persulfate in a basic buffer solution, thereby forming quinone, semiquinone, and/or semiquinone esters of the monomers; and
 ii. allowing all or part of the quinone, semiquinone, and/or semiquinone ester monomers to undergo polymerization thereby forming the polydopamine polymer;
 wherein the polydopamine polymer is optionally formed on a surface of a core particle.

162. A thermoplastic polydopamine polymer synthesized by a polymerization method comprising the steps of:
 i. contacting one or more dopamine and/or dopamine analog monomers with one or more carboxylic acids in the presence of a redox catalyst mixture of Cu, Fe, and hydrosulfite without persulfate in a basic buffer solution, thereby forming quinone, semiquinone, and/or semiquinone esters of the monomers; and
 ii. allowing all or part of the quinone, semiquinone, and/or semiquinone ester monomers to undergo polymerization thereby forming the polydopamine polymer;
 wherein the polydopamine polymer is optionally formed on a surface of a core particle.

163. The thermoplastic polydopamine polymer of any one of embodiments 159-162, wherein the polymerization comprises a nucleophilic attack by a pendant alkyl amine group of a monomer on a quinone, semiquinone or semiquinone ester, thereby forming an amine linkage.

164. The thermoplastic polydopamine polymer of any one of embodiments 159-163, wherein one or more quinols, quinol esters, semiquinones, or semiquinone ester groups present in monomers that have undergone polymerization are further oxidized to semiquinones, semiquinone esters, or quinones.

165. A core-shell particle comprising a polydopamine polymer shell polymerized on the surface of a core particle by the polymerization method of any one of embodiments 159-164, wherein the polymerization is carried out in an aqueous fluid medium optionally in the presence of β-cyclodextrin.

166. A suspension of core-shell particles comprising a core and a shell:
wherein the suspension comprises up to about 95% by weight of the core-shell polymeric particles based on the weight of the suspension and dry weight of the particles; and wherein
 a) the core is a polymeric particle comprised of one or more polymers or the core is an inorganic particle comprised of one or more non-metallic inorganic materials,
 b) the shell comprises a polydopamine polymer comprised of dopamine monomers polymerized with one or more carboxylic acids and/or carboxylic acid anhydrides, and
 c) 0 to 100 percent of the shell polydopamine polymer is grafted onto the core.

167. The suspension of embodiment 166, wherein the suspension is an aqueous suspension.

168. The suspension of any one of embodiments 166-167, wherein the suspension comprises greater than 5%, greater than 10%, greater than 20%, greater than 30%, or greater than 35% water on a weight basis.

169. The suspension of any one of embodiments 166-168, wherein the suspension comprises less than 65% water on a weight basis.

170. The suspension of any one of embodiments 166-169, wherein the suspension comprises from 5%-65%, 5%-10%, 10%-25%, 25%-50% or 50%-65% water by weight.

171. The suspension of any one of embodiments 166-170, wherein the suspension is a colloidal suspension.

172. The suspension of any one of embodiments 166-171, wherein the core is a polymeric particle.

173. The suspension of any one of embodiments 166-172, wherein the core comprises one or more thermoplastics.

174. The suspension of any one of embodiments 166-173, wherein the core comprises 90%-100% by weight of monofunctional vinyl monomers polymerized with 0% to 10% by weight of divinyl, trivinyl, tetravinyl monomers or mixtures thereof.

175. The suspension of any one of embodiments 166-174, wherein the core is a polymeric particle comprised of one or more fluoropolymers.

176. The suspension of any one of embodiments 166-175, wherein the core is a polymeric particle comprised of one or more polymers selected from the group consisting of: perfluoroalkoxy alkanes; polytetrafluoroethylenes; fluorinated ethylene propylene and its copolymers; perfluoromethylvinylethers; perfluoro elastomers; ethylene tetrafluoroethylenes; polyvinylidene fluorides; fluoroelastomers; vinylidene fluoride-hexafluoropropylene fluoroelastomers; vinylidene fluoride-hex afluoropropylene/tetrafluoro ethylene/ hexafluoropropylene fluoroelastomers; and combinations thereof.

177. The suspension of any one of embodiments 166-176, wherein the core is a polymeric particle comprised of a polytetrafluoroethylene polymer.

178. The suspension of any one of embodiments 166-173, wherein the core polymer of the core-shell polymeric particle comprises one or more polymeric particles selected from the group consisting of:
  i) butadiene-stryrene methyl methacrylate and homopolybutadiene particles,
  ii) polyvinyl chloride and vinyl chloride vinyl acetate copolymer particles,
  iii) acrylic homo and copolymer particles,
  iv) vinylidene chloride copolymer particles,
  v) polyethylene and ethylene copolymer particles,
  vi) polytetrafluoroethylene particles,
  vii) fluorinated ethylene copolymer particles,
  viii) polyacrylamide and polyacrylamide derivative particles,
  ix) acrylamide copolymer and derivative particles,
  x) polycarbonate polymer and copolymer particles
  xi) polysulfone polymer and copolymer particles,
  xii) epoxy polymer and copolymer particles, and
  xiii) polyurethane polymer and copolymer particles.

179. The suspension of any one of embodiments 166-178, wherein the core is a polymeric particle comprised of a polymer material that has a glass transition temperature ranging from −103° C. to 200° C.

180. The suspension of any one of embodiments 166-173, wherein the core is an inorganic particle comprised of one or more non-metallic inorganic materials.

181. The suspension of any one of embodiments 166-173, wherein the core is an inorganic particle comprised of a metal oxide or a metalloid oxide.

182. The suspension of any one of embodiments 166-173, wherein the core is an inorganic particle comprised of silica or alumina.

183. The suspension of any one of embodiments 166-182, wherein the shell comprises from 2% to 100% (e.g., from 2% to 10%, from 10% to 20%, from 20% to 40%, from 40% to 60%, from 60% to 80%, from 80% to 90%, from 90 to 95%, or greater than 95%, of polydopamine polymer on a dry weight basis.

184. The suspension of any one of embodiments 166-183, wherein the polydopamine polymer comprises one or more carboxylic acids esterified to the polydopamine polymer at a quinol or semiquinol (semiquinone) hydroxyl group.

185. The suspension of embodiment 184, wherein each of the one or more carboxylic acids esterified to the polydopamine polymer are selected independently from the group consisting of: $R_1C(O)O-$ or $R_1R_2CHC(O)O-$, where $R_1$ and $R_2$ are each selected independently from the group consisting of —H, phenyl, benzyl; $-(CH_2)_nCH_3$ where n is 0-16; amino acids; ethylenically unsaturated carboxylic acids, and vinyl carboxylic acids;
wherein any one or more of the esterified carboxylic acids may be substituted with one or more functionalities selected from the group consisting of: —F, —Cl, —Br, —OH, carboxy, amino, nitro, methyl, ethyl, and propyl.

186. The suspension of embodiment 184, wherein each of the one or more carboxylic acids esterified to the polydopamine polymer are selected independently from the group consisting of: formic acid, acetic acid, fluoroacetic acid, difluoroacetic acid, trifluoroacetic acid, cis-9-octadecatrienoic acid, cyclo-$C_6H_{11}COO-$, $C_6H_5CH_2COO-$, $C_6H_5COO-$, o-$CH_3C_6H_4COO-$, m-$CH_3C_6H_4COO-$, o-$BrC_6H_4COO-$, p-$BrC_6H_4COO-$, p-$CH_3C_6H_4COO-$, o-$ClC_6H_4COO-$, m-$C_1C_6H_4COO-$, p-$ClC_6H_4COO-$, m-$BrC_6H_4COO-$, o-$O_2NC_6H_4COO-$, m-$O_2NC_6H_4COO-$, p-$O_2NC_6H_4COO-$, o-$C_6H_4(COO-)_2$, m-$C_6H_4(COO-)_2$, p-$C_6H_4(COO-)_2$, p-$HOC_6H_4COO-$, o-$H_2NC_6H_4COO-$, m-$H_2NC_6H_4COO-$, p-$H_2NC_6H_4COO-$, o-$CH_3OC_6H_4COO-$, m-$CH_3OC_6H_4COO-$, and p-$CH_3OC_6H-CO$.

187. The suspension of embodiment 184, wherein each of the one or more carboxylic acids esterified to the polydopamine polymer is selected independently from the group consisting of: alanine, arginine asparagine, aspartic acid, cysteine, glutamine, glutamic acid, glycine, histidine, isoleucine, leucine, lysine, methionine, phenylalanine, proline, serine, threonine, tryptophan, tyrosine valine, methanoic acid, ethanoic acid (acetic acid), fluoroacetic acid, difluoroacetic acid, trifluoroacetic acid, propanoic acid, butanoic acid, 2-methylpropanoic acid, pentanoic acid, hexanoic acid, octanoic acid, decanoic acid, ethanedioic acid, propanedioic acid, butanedioic acid, pentanedioic acid, hexanedioic acid, 2-hydroxyethanoic acid, 2-hydroxypropanoic acid, propenoic acid (acrylic), acrylic esters, benzenecarboxylic acid, benzene-1,2-dicarboxylic acid, 2-hydroxybenzenecarboxylic acid, 4-methylpentanoic acid, 5,5-dimethyl-3-oxohexanoic acid, 3-amino-5-heptenoic acid, 3-chlorohexanoic acid, and 2-aminopentanoic acid.

188. The suspension of embodiment 184, wherein each of the one or more carboxylic acids esterified to the polydopamine polymer is selected independently from the group consisting of: formic, acetic and propanoic acid.

189. The suspension of any one of embodiments 166-188, wherein the particle size distribution of the core-shell polymeric particles is bimodal, and wherein the diameters of the core-shell polymeric particles have a peak in the range of 0.25 μm to 10 μm and a peak in the range of 10 μm to 40 μm.

190. The suspension of any one of embodiments 166-189, wherein the suspension is spread uniformly on substantially planar horizontal fluoropolymer surfaces.

191. The suspension of embodiment 190, wherein the suspension is spread uniformly on a substantially planar horizontal PTFE surface.

192. The suspension of any one of embodiments 166-191, wherein the core comprises a thermoplastic polymer with a glass transition temperature from about −103° C. to 200° C.

193. The suspension of embodiment 192, wherein the core comprises a fluoropolymer with a glass transition temperature from about −103° C. to 200° C.

194. The suspension of embodiment 192, wherein the core comprises a polytetrafluoroethylene polymer with a glass transition temperature from about −103° C. to 200° C.

195. A core-shell particle of any of embodiments 166-194, wherein the core-shell particle is substantially free of water or liquids.

196. A core-shell particle of any of embodiments 166-195, wherein the core-shell particle is prepared by removing water and/or other liquids from the suspension.

197. A core-shell particle of any of embodiments 166-196, wherein water and/or other liquids are removed by evaporation, lyophilization, or spray drying.

198. A pressure sensitive adhesive coating comprising one or more core-shell particles of any one of embodiments 195 to 197.

199. A pressure sensitive adhesive coating prepared by applying the suspension of any one of embodiments 166-194, or one or more core-shell particles of any one of embodiments 195-197 to all or part of a surface of a substrate followed by optionally heating the substrate.

200. The pressure sensitive adhesive coating of embodiment 199, wherein the substrate is heated to a temperature in a range selected from the group consisting of about 60° C. to about 220° C., about 60° C. to about 100° C., about 100° C. to about 150° C., about 150° C. to about 200° C., and about 200° C. to about 220° C.

201. A method of coating all or part of an object, a surface, an interface between two substrates, or a composite, comprising contacting the object, surface, interface, or composite with a suspension of any one of embodiments 166-194, or one or more core-shell particles of any one of embodiments 195 to 197 followed by optionally heating the object, surface, interface between two substrates, or composite.

202. A method of preparing an adhesive tribological material, the method comprising contacting all or part of a surface of the material with a suspension of any one of embodiments 166-194, or one or more core-shell particles of any one of embodiments 195 to 197, followed by optionally heating the material, thereby forming an adhesive surface on the tribological material.

203. The method of embodiment 202, wherein the material is a film, sheet, or ribbon of tribological material, and the suspension or core-shell particles are applied to all or part of one surface of the sheet or ribbon.

204. The method of any one of embodiments 202 to 203, wherein the material comprises a fluoropolymer or perfluoropolymer.

205. The method of any one of embodiments 202-204, wherein the material comprises one or more of: perfluoroalkoxy alkanes; polytetrafluoroethylenes (PTFE); fluorinated ethylene propylenes (FEP) and their copolymers; expanded polytetrafluoroethylenes (ePTFE or EPTFE); expanded fluorinated ethylene propylenes (eFEP or EFEP); perfluoromethylvinylethers (PMVE); perfluoro elastomers. ethylene tetrafluoroethylene (ETFE); polyvinylidene fluoride (PVDF); vinylidene fluoride-hexafluoropropylene fluoroelastomer; vinylidene fluoride-hexafluoropropylene/tetrafluoro ethylene/hexa-fluoropropylene fluoroelastomer and or combinations thereof.

206. The method of any one of embodiments 202 to 205, wherein the material is heated to a temperature in a range selected from the group consisting of about 60° C. to about 220° C., about 60° C. to about 100° C., about 100° C. to about 150° C., about 150° C. to about 200° C., and about 200° C. to about 220° C.

207. A method of forming a tribological bearing, the method comprising contacting at least a portion of the adhesive surface of any one of embodiments 202 to 205 with a substrate and applying sufficient heat and pressures to bind the material to the substrate.

208. The method of embodiment 207, wherein the substrate comprises a metal, metal alloy, glass, ceramic, non-fluorinated polymer or fluorinated polymer.

209. The method of embodiment 207, wherein the adhesive surface is formed on a material that is in the form of a film sheet or ribbon.

210. The method of embodiment 207, wherein the adhesive surface is formed on a material that is not in the form of a film, sheet or ribbon.

211. A method of preparing a core-shell polymeric particle having a shell comprising a polydopamine polymer, the method comprising:
preparing a basic buffer aqueous solution comprising a monomeric and or vinylic carboxylic acid; and
incrementally introducing into the basic buffer either dopamine or a dopamine salt while incrementally introducing a suspension of core particles into the basic buffer solution.

212. The method of embodiment 211, wherein the buffer is an amine buffer.

213. The method of embodiment 211, wherein the buffer is TRIS.

214. The method of any one of embodiments 211 to 213, wherein the buffer has a pH greater than 8.0

215. The method of any one of embodiments 211 to 213, wherein the buffer has a pH in a range from 8.0 to 10.0 or from 8.0 to 9.0.

216. The method of any one of embodiments 211 to 215, wherein the dopamine or dopamine salt is introduced as a solution.

217. The method of embodiment 216, wherein a volume of dopamine or dopamine salt solution is introduced into the buffer at rate such that the volume of dopamine or dopamine salt solution introduced per hour is no more than one-half (0.5) of the initial volume of the buffer solution.

218. The method of embodiment 217, wherein a volume of dopamine or dopamine salt solution is introduced into the buffer at rate such that the volume of dopamine or dopamine salt solution introduced per hour is no more than two-fifths (0.4) of the initial volume of the buffer solution.

219. The method of embodiment 216 or 217, wherein the suspension of core particles is introduced over a period of time that is from one-half (0.5) to three-fourths (0.75) of the time required to introduce the dopamine or dopamine salt.

220. The method of any one of embodiments 211 to 219, wherein the core particles are comprised of one or more polymers or the core is an inorganic particle comprised of one or more non-metallic inorganic materials.

221. The method of any one of embodiments 211 to 220, wherein the core particles are comprised of a thermoplastic.

222. The method of any one of embodiments 211 to 221, wherein the core particles are comprised of a fluoropolymer.

223. The method of any one of embodiments 211 to 222, wherein the core particles are comprised of a polytetrafluoroethylene (PTFE).

IV. Examples

A. General Considerations

Using a sample of the polymeric particles as the core of the core-shell particles, dopamine and/or dopamine analogs are polymerized by an emulsion polymerization process. Polymerization may be carried under aerobic aqueous conditions catalyzed by ambient oxygen present at the dissolved aqueous concentration of about 1 to about 20 mg/L. The process involves the emulsification of the dopamine hydrochloride monomer, which is soluble in distilled water. A small sample of β-cyclodextrin is added to the core polymeric particles, which are slowly stirred to ensure the uniform distribution of the additive. A sample of the initiator solution, which consists of a buffered 8.5 pH solution of tris(hydroxymethyl)aminomethane (TRIS) and carboxylic acid is prepared. The emulsified solution of dopamine is gradually added to the buffer solution at the addition rate of 60-140 ml/hr. The presence of the carboxylic acid facilitates the protonation of the amine group, which generates an electrophile that reacts with the electron rich 1,2-dihydroxylbenzene-ethyl amine (which also undergoes oxidation to form poly(1,2-benzoquinone-ethyl amine) and poly(1,2-hydroxybenzoquinone-ethyl amine) The core polymeric particles are gradually added to the buffer solution at the addition rate of 60-200 ml/hr. At the end of the reaction, the pH is adjusted to 8.5 and the reactor is allowed to stand undisturbed for a minimum of two hours at ambient conditions (1 atmosphere of pressure and a temperature of about 20° C.). The resulting particles were sampled, and the size distribution determined by a particle size analyzer (Beckman Coulter Counter LS230 Multisite ICE particle size analyzer). Laser diffraction size range measurements (from 0.4 to 2000 μm) using ISO13320-2009 were conducted and the sample(s) were found to have dimeters in the range from 0.25 μm to 40 μm with an average size of 0.25 μm to 10.0 μm. Further analysis indicates the particle size distribution can be bimodal with a peak in the range of 0.25 μm to 10 μm, and a peak in the range of 10 μm to 40.0 μm. When heated (e.g., to a temperature less than about 220° C.), one or more of the components of the polydopamine polymer shell (e.g., poly(1,2-hydroxybenzoquinone-ethyl amine) undergoes esterification to form poly(1,2-methyl acetate benzoquinone-ethyl amine) (see, e.g., FIG. 3).

The polymerization of dopamine in the presence of a carboxylic acid (e.g., acetic acid) in the presence of fluoropolymer core particles (e.g., polytetrafluoroethylene (PTFE) particles) forms a shell polymer comprising, e.g., poly(1, 2-benzoquinone acetate-amine), which is grafted onto the backbone of the fluoropolymer. However, neither the fluoropolymer particles (e.g., PTFE particles), nor the reaction product (poly(1, 2-benzoquinone acetate-amine) formed from acetic acid and dopamine hydrochloride) form uniform films, i.e., free from surface imperfections, such as holes, when spread on low surface energy surfaces such as PTFE sheets due to the differences in surface tension. In contrast, an aqueous suspension or colloidal suspension of core-shell polymeric particles can readily be coated onto polar and non-polar surfaces with an absence of surface defects. Drying of the aqueous composition to remove most (e.g., substantially all) of the bulk water provides an adhesive coating comprising the core-shell particles.

B. Exemplary Compositions

1. Composition 1

Figure 8:
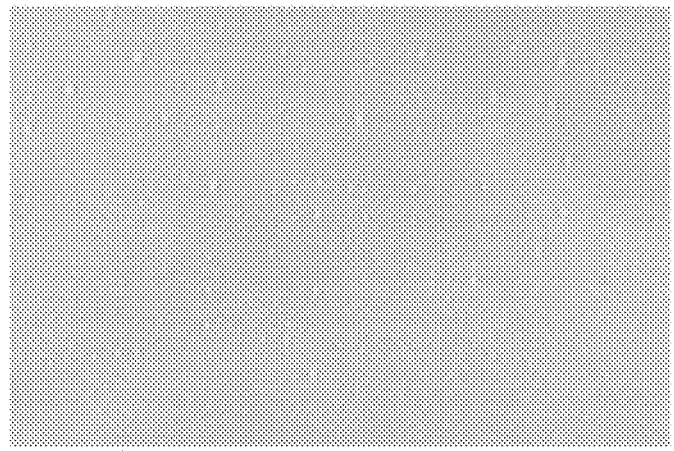
FIG. 8 shows an optical image of droplets of an aqueous polydopamine acetate that formed on a PTFE film after spreading an aqueous polydopamine acetate sample.

An emulsion prepared from PTFE aqueous colloid of 35% by weight of solid content is applied to a 150 mm wide PTFE film. The liquid is then drawn with a size 10 wire rod (12.7 mm diameter laboratory metering rod from Diversified Enterprise Claremont NH USA) to yield an approximate wet film thickness of 25.4 μm. The drawn film immediately separates into numerous droplets over the entire surface of the PTFE film. As shown in FIG. 8, a coating is not obtained from the solution.

2. Composition 2

Figure 9:
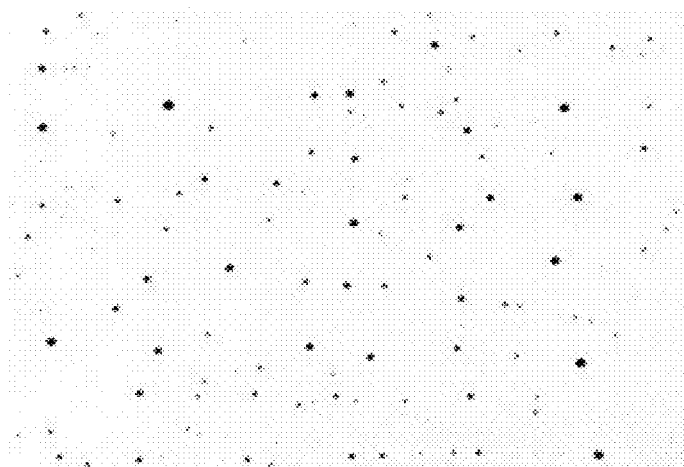
FIG. 9 shows an optical image of PTFE colloid droplets on PTFE film.

To a one-liter beaker is added 150 ml of distilled water. 18.2 grams of TRIS is added to the beaker which is stirred until the TRIS salt dissolves to yield a clear solution of 0.5 M TRIS buffer. To this solution is added 9.0 ml of 25% acetic acid and the entire solution is stirred to ensure complete dissolution. The pH of the solution is adjusted by the addition in increments of 1 gram of 25% acetic acid to yield a final pH of 8.5 units. A separate solution of dopamine is then prepared by the addition of 14.2 grams of dopamine to a beaker that contains 150 ml of distilled water and the mixture is stirred for five minutes until the dopamine is completely dissolved. To this solution is added another 14.2 grams of dopamine salt and the mixture is stirred for 5 minutes until the dopamine salt is completely dissolved. The aqueous dopamine solution is charged to a 250 ml reservoir from which it is metered to the one-liter beaker that contains the TRIS acetate buffer (pH 8.5) solution at a rate of 60 ml/hr. During the reaction the mixture is sparged with 1.57 cc/sec of air. At the end of 60 minutes and through the reaction schedule, a sample is collected at 60-minute intervals and quenched in an ice bath prior to evaluation of UV/Vis spectra. During the reaction the pH of the batch is recorded every hour and the reaction mixture is stirred at a rate of 125 rpm over the 24-hour duration of the reaction. A sample of the aqueous solution is placed on a 150 mm wide PTFE film and drawn with a size 10 wire rod. The drawn film immediately separates into numerous droplets over the entire surface of the PTFE film. As shown in FIG. 9, a coating is not obtained from the solution.

3. Composition 3

Figure 10:
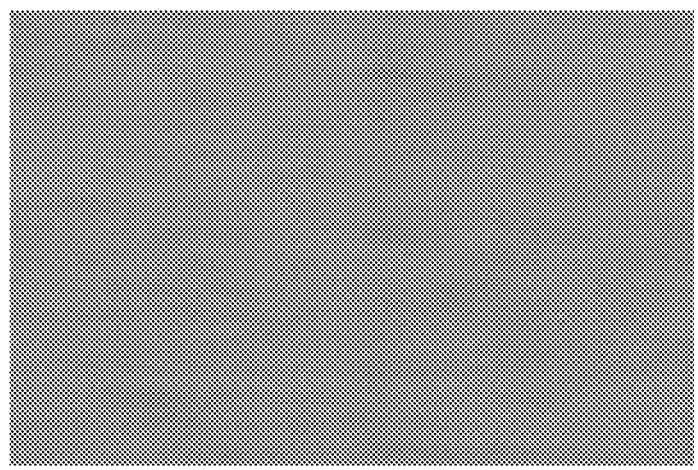
FIG. 10 shows an optical image of a uniform coating of an aqueous FluoroAdhesive composition comprising core-shell particles (PTFE core and polydopamine acetate shell) on a PTFE film.
Figure 11:
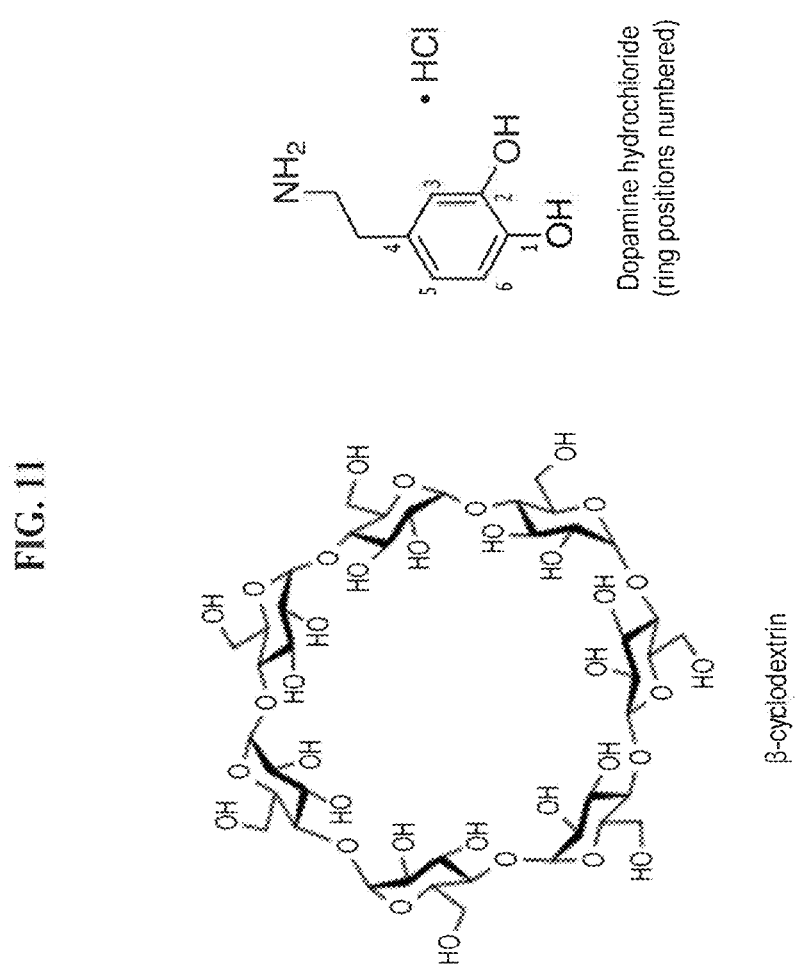
FIG. 11 shows the structure of β-cyclodextrin and dopamine hydrochloride having a pendant primary amine, shown with its ring positions numbered.

To a one-liter beaker is added 150 ml of distilled water. 18.2 grams of TRIS is added to the beaker which is stirred until the TRIS salt dissolves to yield a clear solution. To this solution is added 9.0 ml of 25% acetic acid and the entire solution is stirred to ensure complete dissolution. The pH of the solution is adjusted by the addition in increments of 1 ml of 25% acetic acid to yield a final pH of 8.5 units. A separate solution of dopamine is then prepared by the addition of 28.4 grams of dopamine to a beaker that contains 150 ml of distilled water and the mixture is stirred for five minutes until the dopamine is completely dissolved. To this solution is added another 28.4 grams of dopamine salt and the mixture is stirred for 30 minutes until the dopamine salt is completely dissolved. The aqueous dopamine solution is charged to a 250 ml reservoir from which it is metered to the one-liter beaker that contains the TRIS acetate buffer (pH 8.5) solution at a rate of 60 ml/hr. Simultaneously, 200 milliliters (mls) of a 35% aqueous dispersion of PTFE is delivered to the reaction vessel at 100 ml/hour. During the reaction, the pH of the batch is periodically recorded, and the reaction mixture is stirred at a rate of 125 rpm over the 24-hour duration of the reaction. At the end of the process, the core-shell particle (PTFE core particle with a polydopamine acetate shell) is sampled for coating onto a PTFE substrate. As shown in FIG. 10, a uniform defect free coating is obtained from the suspension of core-shell particles.

4. Composition 4

To a one-liter beaker is added 150 ml of distilled water. 18.2 grams of TRIS is added to the beaker which is stirred until the TRIS salt dissolves to yield a clear solution. To this solution is added 9.0 ml of 25% acetic acid and the entire solution is agitated to ensure complete dissolution. The pH of the solution is adjusted by the addition in increments of 1 gram of 25% acetic acid to yield a final pH of 8.5 units. A separate solution of dopamine is then prepared by the addition of 14.2 grams of dopamine to a beaker that contains 150 ml of distilled water and the mixture is stirred for five minutes until the dopamine is completely dissolved. To this solution is added another 14.2 grams of dopamine salt and the mixture is stirred for 30 minutes until the dopamine salt is completely dissolved. The aqueous dopamine solution is charged to a 250 ml reservoir from which it is metered into the one-liter beaker that contains the TRIS acetate buffer (pH 8.5) solution at a rate of 60 ml/hr. 200 mls of a 35% aqueous dispersion of PTFE is delivered to the reaction vessel at 100 ml/hour. During the reaction, the pH of the batch is recorded periodically and the reaction mixture is stirred at a rate of 125 rpm over the 24 hour duration of the reaction. At the end of the process, the PTFE-particle is sampled for coating onto a PTFE substrate. A uniform coating on PTFE is obtained from the solution.

5. Composition 5

To a one-liter beaker is added 150 ml of distilled water. 18.2 grams of TRIS is added to the beaker which is stirred until the TRIS salt dissolves to yield a clear solution. To this solution is added 9.0 ml of 25% acetic acid and the entire solution is agitated to ensure complete dissolution. The pH of the solution is adjusted by the addition in increments of 1 gram of 25% acetic acid to yield a final pH of 8.5 units. A separate solution of dopamine is then prepared by the addition of 14.2 grams of dopamine to a beaker that contains 150 ml of distilled water and the mixture is stirred for five minutes until the dopamine is completely dissolved. The aqueous dopamine solution is charged to a 250 ml reservoir from which it is metered into the one-liter beaker that contains the TRIS acetate buffer (pH8.5) solution at a rate of 60 ml/hr. 200 mls of a 35% aqueous dispersion of PTFE is delivered to the reaction vessel at 100 ml/hour. During the reaction, the pH of the batch is recorded periodically, and the reaction mixture is stirred at a rate of 125 rpm over the 24 hour duration of the reaction. At the end of the process, the PTFE-particle is sampled for coating onto a PTFE substrate. A uniform coating on PTFE is obtained from the solution.

C. Examples

1. Example-1

A coating of composition 3, wherein the coating is applied via Mayer rod to 80 vol % PTFE tape comprising 20 vol % calcium fluoride having a thickness of 0.38 mm. The coating having a thickness of 25.4 µm is dried in an oven at 220° C. for 30 minutes followed by lamination onto a steel substrate under conditions of 32 MPa pressure and 345° C. yielding a laminated structure for evaluation by the ASTM D6862 procedure.

2. Example-2

A coating of composition 3, wherein the coating applied via Mayer rod to 80 vol % PTFE tape comprising 20 vol % calcium fluoride having a thickness of 0.38 mm. The coating having a thickness of 25.4 µm is dried in an oven at 220° C. for 30 minutes followed by lamination onto an aluminum substrate under conditions of 32 MPa pressure and 345° C. yielding a laminated structure for evaluation by the ASTM D6862 procedure.

3. Example-3

A coating of composition 3, wherein the coating is applied via Mayer rod to PTFE+polyimide tape having a thickness of 0.38 mm. The coating having a thickness of 25.4 µm is dried in an oven at 220° C. for 30 minutes followed by lamination onto a steel substrate under conditions of 32 MPa pressure and 345° C. yields a laminated structure for evaluation by the ASTM D6862 procedure.

4. Example-4

A coating of composition 3, wherein the coating is applied via Mayer rod to PTFE/polyimide tape having a thickness of 0.38 mm. The coating having a thickness of 25.4 µm is dried in an oven at 220° C. for 30 minutes followed by lamination onto an aluminum substrate under conditions of 32 MPa pressure and 345° C. yielding a laminated structure for evaluation by the ASTM D6862 procedure.

5. Example-5

A coating of composition 3, wherein the coating is applied via Mayer rod to 50 vol % PTFE/50 vol % polyphenylene sulfide tape having a thickness of 0.38 mm. The coating having a thickness of 25.4 µm is dried in an oven at 220° C. for 30 minutes followed by lamination onto a steel substrate under conditions of 1.3 MPa pressure and 345° C. yielding a laminated structure for evaluation by the ASTM D6862 procedure.

6. Example-6

A coating of composition 3, wherein the coating is applied via Mayer rod to 50 vol % PTFE+50 vol % polyphenylene sulfide tape having a thickness of 0.38 mm. The coating having a thickness of 25.4 µm is dried in an oven at 220° C. for 30 minutes followed by lamination onto an aluminum substrate under conditions of 1.3 MPa pressure and 345° C. yielding a laminated structure for evaluation by the ASTM D6862 procedure.

7. Example-7

A coating of composition 4, wherein coating was applied via Mayer rod to 80 vol % PTFE tape comprising 20 vol % calcium fluoride having a thickness of 0.38 mm. The coating having a thickness of 25.4 µm was dried in an oven at 220° C. for 30 minutes followed by lamination onto steel substrate under conditions of 32 MPa pressure and 345° C. yielding a laminated structure for evaluation by the ASTM D6862 procedure.

8. Example-8

A coating of composition 4, wherein coating was applied via Mayer rod to 80 vol % PTFE tape comprising 20 vol % calcium fluoride having a thickness of 0.38 mm. The coating having a thickness of 25.4 µm was dried in an oven at 220° C. for 30 minutes followed by lamination onto aluminum substrate under conditions of 32 MPa pressure and 345° C. yielding a laminated structure for evaluation by the ASTM D6862 procedure.

9. Example-9

A coating of composition 4, wherein coating was applied via Mayer rod to PTFE/Polyimide tape having a thickness of 0.38 mm. The coating having a thickness of 25.4 µm was dried in an oven at 220° C. for 30 minutes followed by lamination onto steel substrate under conditions of 32 MPa pressure and 345° C. yielding a laminated structure for evaluation by ASTM D6862 procedure.

10. Example-10

A coating of composition 4, wherein coating was applied via Mayer rod to PTFE/Polyimide tape having a thickness of 0.38 mm. The coating having a thickness of 25.4 μm was dried in an oven at 220° C. for 30 minutes followed by lamination onto aluminum substrate under conditions of 32 MPa pressure and 345° C. yielding a laminated structure for evaluation by the ASTM D6862 procedure.

11. Example-11

A coating of composition 4, wherein coating was applied via Mayer rod to 50 vol % PTFE/50 vol % Polyphenylene Sulfide tape having a thickness of 0.38 mm. The coating having a thickness of 25.4 μm was dried in an oven at 220° C. for 30 minutes followed by lamination onto steel substrate under conditions of 1.3 MPa pressure and 345° C. yielding a laminated structure for evaluation by the ASTM D6862 procedure.

12. Example-12

A coating of composition 4, wherein coating was applied via Mayer rod to 50 vo % PTFE/50 vol % Polyphenylene Sulfide tape having a thickness of 0.38 mm. The coating having a thickness of 25.4 μm was dried in an oven at 220° C. for 30 minutes followed by lamination onto aluminum substrate under conditions of 1.3 MPa pressure and 345° C. yielding a laminated structure for evaluation by ASTM D6862 procedure.

13. Example-13

A coating of composition 5, wherein coating was applied via Mayer rod to 80 vol % PTFE taper comprising 20 vol % calcium fluoride having a thickness of 0.38 mm and coating having a thickness of 25.4 μm was dried in an oven at 220° C. for 30 minutes followed by lamination onto steel substrate under conditions of 32 MPa pressure and 345° C. yielded a laminated structure for evaluation by the ASTM D6862 procedure.

14. Example-14

A coating of composition 5, wherein coating was applied via Mayer rod to 80 vol % PTFE tape comprising 20 vol % calcium fluoride having a thickness of 0.38 mm. The coating having a thickness of 25.4 μm was dried in an oven at 220° C. for 30 minutes followed by lamination onto aluminum substrate under conditions of 32 MPa pressure and 345° C. yielding a laminated structure for evaluation by the ASTM D6862 procedure.

15. Example-15

A coating of composition 5, wherein coating was applied via Mayer rod to PTFE/Polyimide tape having a thickness of 0.38 mm. The coating having a thickness of 25.4 μm was dried in an oven at 220° C. for 30 minutes followed by lamination onto steel substrate under conditions of 32 MPa pressure and 345° C. yielding a laminated structure for evaluation by the ASTM D6862 procedure.

16. Example-16

A coating of composition 5, wherein coating was applied via Mayer rod to PTFE/Polyimide tape having a thickness of 0.38 mm. The coating having a thickness of 25.4 μm was dried in an oven at 220° C. for 30 minutes followed by lamination onto aluminum substrate under conditions of 32 MPa pressure and 345° C. yielding a laminated structure for evaluation by ASTM D6862 procedure.

17. Example-17

A coating of composition 5, wherein coating was applied via Mayer rod to 50 vol % PTFE/50 vol % Polyphenylene Sulfide tape having a thickness of 0.38 mm. The coating having a thickness of 25.4 μm was dried in an oven at 220° C. for 30 minutes followed by lamination onto steel substrate under conditions of 1.3 MPa pressure and 345° C. yielding a laminated structure for evaluation by the ASTM D6862 procedure.

18. Example-18

A coating of composition 5 was applied via Mayer rod to 50 vol % PTFE/50 vol % Polyphenylene Sulfide tape having a thickness of 0.38 mm. The coating having a thickness of 25.4 μm was dried in an oven at 220° C. for 30 minutes followed by lamination onto aluminum substrate under conditions of 1.3 MPa pressure and 345° C. yielding a laminated structure for evaluation by the ASTM D6862 procedure.

TABLE 1

Adhesive Strength (N) of the coatings based on the compositions as evaluated by the ASTM D6862-11 (2016) Procedure

| Composition # | Example # of the ASTM D6862 Evaluation | Adhesive Strength (N) |
| --- | --- | --- |
| 3 | 1 | 22.0-41.3 |
| 3 | 3 | 21.5-47.6 |
| 3 | 5 | 26.2-53.0 |
| 4 | 7 | 43.5-62.2 |
| 4 | 9 | 45.8-78.7 |
| 4 | 11 | 21.6-33.0 |
| 5 | 13 | 37.9-57.5 |
| 5 | 14 | 24.7-40.9 |
| 5 | 15 | 56.8-67.0 |
| 5 | 16 | 29.5-54.0 |

D. Dynamic Mechanical Analysis (DMA)

Synthesis Processes for the Preparation of Samples for DMA Characterization Polydopamine Acetate Control To a 1-liter beaker is added 150 ml of 0.5 M TRIS which is stirred until the TRIS salt dissolves to yield a clear solution. To this solution is added 9.0 grams of acetic acid and the entire solution is agitated to ensure complete dissolution. The pH of the solution is adjusted by the addition of increments of 1 gram of acetic acid to yield a final pH of 8.5 units. A separate solution of dopamine is then prepared by the addition of 14.2 grams of dopamine powder to a beaker that contains 150 ml of distilled water. The mixture is stirred for five minutes until the dopamine is completely dissolved. To this solution is added another 14.2 grams of dopamine salt and the mixture is stirred for 5 minutes until the dopamine salt is completely dissolved. The aqueous dopamine solution is charged to a 250 ml reservoir from which it is metered to the 1-liter beaker that contains the buffer solution at a rate of 60 ml/hr. During the reaction, the mixture is optionally sparged with air. At the end of 60 minutes and through the reaction schedule, a sample is collected at 60 minute intervals and quenched in an ice bath prior to evaluation of UV/Vis spectra. During the reaction the pH of the batch is recorded every hour and the reaction mixture is stirred at a rate of 125 rpm over the 24-hour duration of the reaction. At the end of the 24-hour reaction period, a sample of the colloidal dispersion is placed in an oven that was previously set at 220° C. At the end of the drying period (30 minutes), the sample is cooled to 25° C. and reduced to powder particles with the aid of a mortar and pestle. The dry powder particles are molded as described below for determination of DMA spectrogram (see FIG. 4. pDA acetate heteropolymer).

Core-Shell Particle (FluoroAdhesive)

To a 1-liter beaker is added 150 ml of distilled water. TRIS base, 18.2 grams, is added to the beaker which is stirred until the TRIS salt dissolves to yield a clear solution. To this solution is added 9.0 grams of acetic acid and the entire solution is agitated to ensure complete dissolution. The pH of the solution is adjusted by the addition of increments of 1 gram of acetic acid to yield a final pH of 8.5 units. A separate solution of dopamine is then prepared by the addition of 14.2 grams of dopamine to a beaker that contains 150 ml of distilled water and the mixture is stirred for five minutes until the dopamine is completely dissolved. To this solution is added another 14.2 grams of dopamine salt and the mixture is stirred for 30 minutes until the dopamine salt is completely dissolved. The aqueous dopamine solution is charged to a 250 ml reservoir from which it is metered to the 1-liter beaker that contains the buffer solution at a rate of 60 ml/hr. Two hundred ml (200 ml) of a 35% solid aqueous dispersion of PTFE is delivered to the reaction vessel at 100 ml/hour. During the reaction, the pH of the batch is recorded periodically, and the reaction mixture is stirred at a rate of 125 rpm over the 24-hour duration of the reaction. At the end the process, the colloidal dispersion is sampled for drying in an oven at 220° C. At the end of the drying period (30 minutes), the sample is cooled to 25° C. and reduced to powder particles with the aid of a mortar and pestle. The dry powder particles are molded as described below for determination of DMA spectrogram (see FIG. 4. FluoroAdhesive).

DMA Characterization

The DMA was done using ASTM D4065-12 measuring conditions and the data presented in the document were derived from measurements of the transitions associated with the movements of the polymer chains under conditions that induce thermal and mechanical stresses. The measurement technique defined as Dynamic Mechanical Analysis (DMA) records the resonant frequency and mechanical damping of a strip of polymeric material constrained to flex at a rate of 1 Hz. The test samples were prepared by compression molding of granulated powder particles of the samples exemplified in the examples. The mold is in the form of a hollow stainless-steel parallelepiped cavity of dimension: length=3.81 cm and area of base: 0.4 cm2 and curved edges of 0.2 cm radius. A lid of the same shape as the cavity is inserted into the upper surface of the cavity for the purpose of compressing the material inserted into the hollow cavity. For the preparation of a molded test piece, a copper plate is placed under the lower surface of the mold which is then filled with an excess of the powder particles prepared from the sample. The lid is then inserted above the cavity and the mold is placed in a Carver Press which is maintained at a temperature of 348° C. This is followed by the application of 1000 pound force of pressure for a duration of five minutes.

The data recorded from this measurement quantifies, by known mechanical damping, the amount of energy dissipated by the sample as it oscillates, while the resonant frequency yields the value of the Youngs Modulus (elastic) or stiffness. From the DMA measurements, the loss modulus and storage modulus are recorded. The ratio of loss modulus to storage modulus (or elastic modulus) is expressed as tan($\delta$). Tan($\delta$) is a measurement of the glass transition temperature of the core-shell polymer.

The DMA data reveal the influence that the shell polymer has on the thermal properties of the core-shell polymer particle composite. In the case of the esterified dopamine copolymer—PTFE system, the recorded data shows that the PTFE, which forms the core of the composite, is significantly enhanced in elastic modulus by apparent covalent coupling with the poly(esterified dopamine) copolymer.

What is claimed is:

1. A pressure sensitive adhesive coating comprising one or more core-shell particles, wherein
   (a) the core is a polymeric particle comprised of one or more polymers or the core is an inorganic particle comprised of one or more non-metallic inorganic materials,
   (b) the shell comprises a thermoplastic polydopamine polymer comprised of dopamine monomers polymerized with one or more carboxylic acids and/or carboxylic acid anhydrides, and
   (c) 0 to 100 percent of the shell polydopamine polymer is grafted onto the core; and
   wherein the core-shell particles are substantially free of water or liquids.

2. The pressure sensitive adhesive coating of claim 1 prepared by applying a suspension of the one or more core-shell particles or one or more core-shell particles to all or part of a surface of a substrate followed by optionally heating the substrate.

3. The pressure sensitive adhesive coating of claim 1, wherein the core is a polymeric particle comprised of one or more non-fluorinated or fluorinated thermoset plastics, or non-fluorinated or fluorinated thermoplastics.

4. The pressure sensitive adhesive coating of claim 3, wherein the coating is formed by applying the core-shell particles substantially free of water or liquids or applying an aqueous dispersion of the core shell particles optionally comprising an organic solvent miscible with water on a surface followed by drying.

5. The pressure sensitive adhesive coating of claim 4, wherein the coating is heated to a temperature from about 60° C. to about 220° C.

6. The pressure sensitive adhesive coating of claim 5, wherein the surface is the surface of a low surface energy material.

7. The pressure sensitive adhesive coating of claim 6, wherein the low surface energy material is polytetrafluoroethylene.

8. The pressure sensitive adhesive coating of claim 7, wherein the adhesive coating is formed on all or part of the surface.

9. The pressure sensitive adhesive coating of claim 4, wherein the adhesive coating is formed on all or part of the surface.

10. The pressure sensitive adhesive coating of claim 3, wherein the core particle consists of one or more non-fluorinated thermoset plastics, one or more fluorinated thermoset plastics, one or more non-fluorinated thermoplastics, or one or more fluorinated thermoplastics.

11. The pressure sensitive adhesive coating of claim 3, wherein the core particle consists of one or more fluorinated thermoset plastics or one or more fluorinated thermoplastics.

12. The pressure sensitive adhesive coating of claim 3, wherein the adhesive strength as determined by ASTM D6862-11 ranges from about 20 to about 89 Newtons (N).

13. The pressure sensitive adhesive coating of claim 1, wherein the core is a polymeric particle comprised of one or more polymers selected from the group consisting of:
i) butadiene-styrene methyl methacrylate and homopolybutadienes,
ii) polyvinyl chloride and vinyl chloride vinyl acetate copolymers,
iii) acrylic homo and copolymers,
iv) vinylidene chloride copolymers,
v) polyethylene and ethylene copolymers,
vi) polytetrafluoroethylenes,
vii) fluorinated ethylene copolymers,
viii) polyacrylamide,
ix) acrylamide copolymers,
x) polycarbonate polymers and copolymers,
xi) polysulfone polymers and copolymers,
xii) epoxy polymers and copolymers, and
xiii) polyurethane polymers and copolymers.

14. The pressure sensitive adhesive coating of claim 1, wherein the core is a polymeric particle comprised of a fluoropolymer selected from the group consisting of:
perfluoroalkoxy alkanes (PFA or PFAs when plural); polytetrafluoroethylene (PTFE); fluorinated ethylene propylene (FEP) and its copolymers; expanded-polytetrafluoroethylene (ePTFE or EPTFE); expanded-fluorinated ethylene propylene (eFEP or EFEP); perfluoromethylvinylether (PMVE); perfluoro elastomers; ethylene tetrafluoroethylene (ETFE); polyvinylidene fluoride (PVDF); fluoroelastomers; vinylidene fluoride-hexafluoropropylene fluoroelastomer (VF2/HFP); and vinylidene fluoride-hexafluoropropylene/tetrafluoro ethylene/hexafluoropropylene fluoroelastomer (VF2/tetrafluoro ethylene/HFP) terpolymer.

15. The pressure sensitive adhesive coating of claim 1, wherein the core is comprised of polytetrafluoroethylene.

16. The pressure sensitive adhesive coating of claim 1, wherein the adhesive strength as determined by ASTM D6862-11 ranges from about 20 to about 89 Newtons (N).

17. The pressure sensitive adhesive coating of claim 1, wherein the core is a polymeric particle comprising 90% or more of one or more polyolefins and one or more divinyl, trivinyl, or tetravinyl monomers or a mixture thereof in an amount up to 10% on a dry weight basis.

18. A hot-melt pressure sensitive adhesive comprising core-shell polymeric particles having a core particle and a shell of thermoplastic polydopamine polymer, wherein:
(i) the thermoplastic polydopamine polymer is made by a process comprising contacting monomers of dopamine and/or dopamine analogs with one or more carboxylic acids in the presence of the core particle and a redox initiator in a basic buffer solution, permitting the monomers to undergo a polymerization reaction thereby forming a polydopamine polymer comprising polymerized quinone, semiquinone, semiquinone ester bearing an esterified carboxylic acid, quinol, and/or quinol esters bearing one or more esterified carboxylic acids of the dopamine and/or dopamine analogs; and
(ii) the core particle is comprised of a fluorinated thermoset plastic or fluorinated thermoplastic.

19. The hot-melt pressure sensitive adhesive of claim 18, wherein the core particle comprises one or more polymers selected from the group consisting of:
perfluoroalkoxy alkanes; polytetrafluoroethylenes; fluorinated ethylene propylene and its copolymers; perfluoromethylvinylethers; perfluoro elastomers; ethylene tetrafluoroethylenes; polyvinylidene fluorides; fluoroelastomers; vinylidene fluoride-hexafluoropropylene fluoroelastomers; vinylidene fluoride-hexafluoropropylene/tetrafluoro ethylene/hexafluoropropylene fluoroelastomers; and combinations thereof.

20. The hot-melt pressure sensitive adhesive of claim 18, wherein the core particle comprises a fluoropolymer selected from the group consisting of:
perfluoroalkoxy alkanes (PFA or PFAs when plural); polytetrafluoroethylene (PTFE); fluorinated ethylene propylene (FEP) and its copolymers; expanded-polytetrafluoroethylene (ePTFE or EPTFE); expanded-fluorinated ethylene propylene (eFEP or EFEP); perfluoromethylvinylether (PMVE); perfluoro elastomers; ethylene tetrafluoroethylene (ETFE); polyvinylidene fluoride (PVDF); fluoroelastomers; vinylidene fluoride-hexafluoropropylene fluoroelastomer (VF2/HFP); vinylidene fluoride-hexafluoropropylene/tetrafluoro ethylene/hexafluoropropylene fluoroelastomer (VF2/tetrafluoro ethylene/HFP) terpolymer; and combinations thereof.

21. The hot-melt pressure sensitive adhesive of claim 18, wherein the core particle comprises a core polymer, and the polydopamine polymer resulting from the polymerization reaction that is deposited upon, binds to, or is grafted covalently onto the core polymer, forms the shell coating of the core particle.

22. The hot-melt pressure sensitive adhesive of claim 18, comprising core-shell polymeric particles wherein the core is a particle comprised of a polytetrafluoroethylene (PTFE) polymer.

23. The hot-melt pressure sensitive adhesive of claim 18, comprising core-shell polymeric particles, wherein the shell comprises a polydopamine acetate polymer with a melting point from about 95° C. to about 115° C. and the core comprises a PTFE polymer with a melting point from about 335° C. to about 360° C.; and wherein the melting point of the core-shell polymeric particle is from about 335° C. to about 360° C.

24. The hot-melt pressure sensitive adhesive comprising the core-shell particles of claim 18, wherein the adhesive forms a uniform coating on a PTFE sheet at 20° C. when the PTFE sheet is oriented horizontally and no holes in the coating expose an area of the sheet more than 0.1 mm square.

25. The hot melt pressure sensitive adhesive of claim 18, wherein the core particle consists of one or more fluorinated thermoset plastics.

26. The hot-melt pressure sensitive adhesive of claim 18, wherein the adhesive strength as determined by ASTM D6862-11 ranges from about 20 to about 89 Newtons (N).

27. The hot-melt pressure sensitive adhesive of claim 18, wherein the one or more carboxylic acids comprise a carboxylic acid of the following formula: R1C(O)OH or the formula R1R2CHC(O)OH, wherein R1 and R2 are each selected independently from the group consisting of —H; phenyl; benzyl; —$(CH_2)_n CH_3$ where n is 0-16; ethylenically unsaturated carboxylic acids;
and vinyl carboxylic acids; and wherein any one or more of the esterified carboxylic acids may be substituted with one or more functionalities selected from the group consisting of: —F, —Cl, —Br, —OH, carboxy, amino, nitro, methyl, ethyl, and propyl.

* * * * *